(12) United States Patent
Zimmerman et al.

(10) Patent No.: US 12,711,711 B1
(45) Date of Patent: Aug. 18, 2026

(54) TECHNIQUES FOR USING COMPUTER VISION AND GEOLOCATION DATA TO ENFORCE VIRTUAL RESTRICTED-USE ZONES FOR IMAGING DEVICES

(71) Applicant: Meta Platforms Technologies, LLC, Menlo Park, CA (US)

(72) Inventors: Jared Zimmerman, San Francisco, CA (US); Tae Wan An, Lexington, MA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 280 days.

(21) Appl. No.: 18/353,826

(22) Filed: Jul. 17, 2023

Related U.S. Application Data

(60) Provisional application No. 63/390,267, filed on Jul. 18, 2022.

(51) Int. Cl.

| | |
|---|---|
| ***G06T 19/00*** | (2011.01) |
| ***G02B 27/01*** | (2006.01) |
| ***G06F 3/01*** | (2006.01) |
| ***G06F 3/14*** | (2006.01) |
| ***G06F 3/16*** | (2006.01) |
| ***G06V 10/74*** | (2022.01) |

(52) U.S. Cl.
CPC ........ *G06T 19/006* (2013.01); *G02B 27/0172* (2013.01); *G06F 3/016* (2013.01); *G06F 3/14* (2013.01); *G06F 3/16* (2013.01); *G06V 10/761* (2022.01); *G02B 2027/0178* (2013.01)

(58) Field of Classification Search
CPC ........................... G06T 19/006; G06V 10/761; G02B 27/0172; G06F 3/016; G06F 3/14
USPC ........................................................ 345/633
See application file for complete search history.

(56) References Cited

U.S. PATENT DOCUMENTS 9,264,803 B1 * 2/2016 Johnson ............... G02B 27/017
9,380,296 B2 * 6/2016 Hyun .................. H04N 23/631
9,575,321 B2 * 2/2017 Osterhout ............ H04L 51/222
11,443,608 B2 * 9/2022 Williams ........... G08B 21/0261
2005/0007456 A1 * 1/2005 Lee .................... H04N 1/00973 348/207.99
2014/0162692 A1 * 6/2014 Li ........................ H04L 67/133 455/456.3
2020/0388056 A1 * 12/2020 Glazberg .............. G06F 21/629
2022/0044533 A1 * 2/2022 Branscomb ............. H04L 9/088
2022/0179665 A1 * 6/2022 Rathod .................. G06F 9/451
2022/0229302 A1 * 7/2022 Tsai ....................... G02F 1/137

* cited by examiner

*Primary Examiner* — Thomas J Lett
(74) *Attorney, Agent, or Firm* — Morgan, Lewis & Bockius LLP

(57) ABSTRACT

Systems and methods are provided for enforcing virtual restricted-use zones for imaging devices communicatively coupled with a head-wearable device. One example method includes identifying a virtual restricted-use zone based on presence of one or more restricted-use zone markers in a physical area. The virtual restricted-use zone is used to enforce a restriction on use of an imaging device within the physical area. The imaging device is communicatively coupled with the head-wearable device. The method further includes, in accordance with a determination that the imaging device is within the virtual restricted-use zone, automatically without human intervention disabling the imaging device communicatively coupled with the head-wearable device.

20 Claims, 40 Drawing Sheets

108
116-1
113-1
114-1
112
Warning: You are approaching a restricted use zone based on a visual cue.
309
110
111

810
Identify a virtual restricted-use zone based on presence of one or more restricted-use zone markers in a physical area 812
The virtual restricted-use zone is used to enforce a restriction on use of an imaging device within the physical area, the imaging device communicatively coupled with heard-wearable device 814
The one or more restricted-use zone markers comprise a restricted-use zone geofence defined for the physical area, a restricted-use zone visual cue present for the physical area, and a restricted-use zone audio cue present for the physical area 816-A
Receive a user input configured to initiate the imaging device communicatively coupled with the head-wearable device, and 816-B
Responsive to the user input, capturing image data using the imaging device communicatively coupled with the head-wearable device, 816-C
The one or more restricted-use zone markers include a restricted-use zone visual cue, and the determination that the imaging device is within the restricted-use zone is based on detection of the restricted-use zone visual cue within the image data 818
Cause presentation of a notification to the user that informs the user of the virtual restricted-use zone in accordance with a determination that the imaging device is within a predetermined distance from the virtual restricted-use zone 820
The notification presented to the user includes one or more of a haptic cue, audio cue, and a message displayed on a display of the head-wearable device

Figure 8A

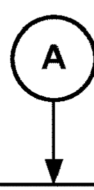

822
Automatically, without human intervention, disabling the imaging device communicatively coupled with the head-wearable device in accordance with a determination that the imaging device is within the virtual restricted-use zone 824
Cause presentation of another notification in conjunction with disabling the imaging device, the other notification informing the user that the imaging device is disabled 826
Automatically without human intervention disable imaging devices on additional devices communicatively coupled to the head-wearable device, in accordance with the determination that the imaging device is within the virtual restricted-use zone 828-A
Identify another virtual restricted-use zone based on presence of the one or more restricted-use zone markers in the physical area. The other virtual restricted-use zone is used to enforce a restriction on use of a microphone within the physical area, the microphone communicatively coupled with the head-wearable device, and 828-B
Automatically, without human intervention, disable the microphone communicatively coupled with the head-wearable device, in accordance with a determination that the imaging device is within the other virtual restricted-use zone.

Figure 8B

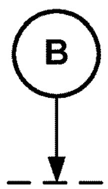

830-A
The virtual restricted-use zone includes a first virtual restricted-use zone and a second virtual restricted-use zone, the second virtual restricted-use zone at least partially overlapping the first virtual restricted-use zone 830-B
Cause presentation of a notification to the user that informs the user of the first virtual restricted-use zone in accordance with the determination that the imaging device is within a predetermined distance from and/or within the first virtual restricted-use zone 830-C
Automatically, without human intervention, disabling the imaging device communicatively coupled with the head-wearable device in accordance with the determination that the imaging device is within the second virtual restricted-use zone

Figure 8C

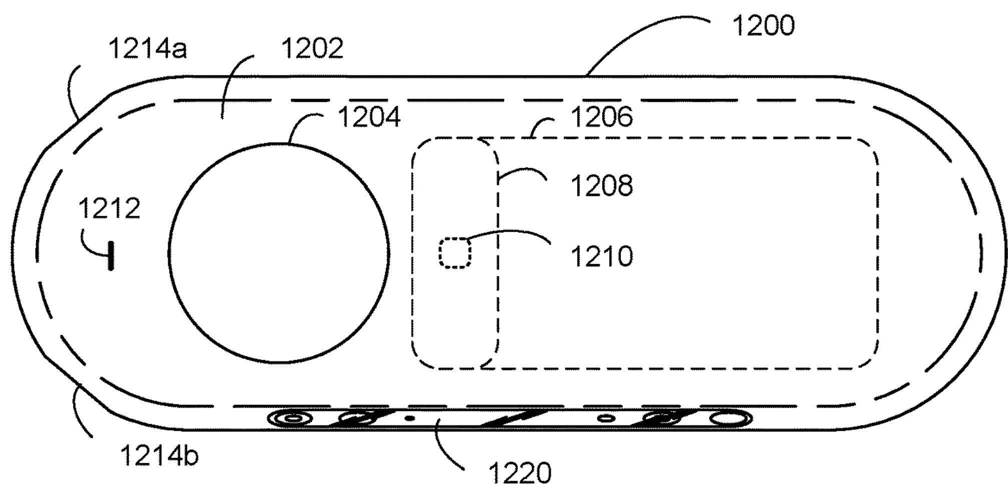
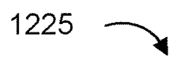
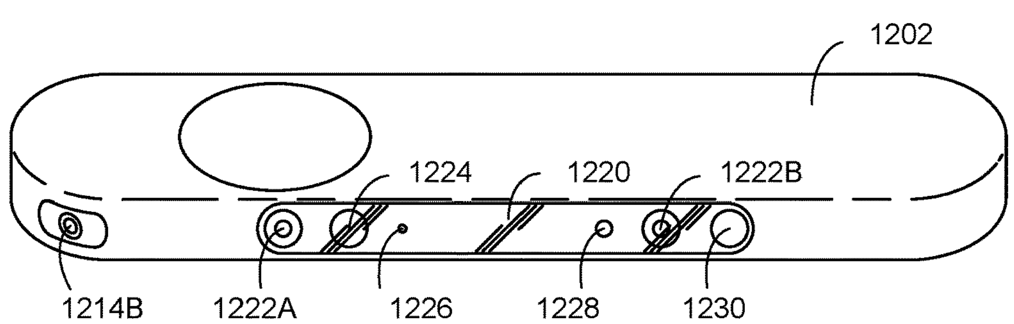
Figure 12A

TECHNIQUES FOR USING COMPUTER VISION AND GEOLOCATION DATA TO ENFORCE VIRTUAL RESTRICTED-USE ZONES FOR IMAGING DEVICES

RELATED APPLICATION

This application claims priority to U.S. Provisional Patent Application No. 63/390,267, filed Jul. 18, 2022, titled "Techniques For Using Computer Vision And Geolocation Data To Enforce Virtual Restricted-Use Zones For Imaging Devices," which is hereby incorporated by reference in its entirety.

TECHNICAL FIELD

The present disclosure relates generally to head-wearable device and methods for enforcing virtual restricted-use zones for imaging devices communicatively coupled with a head-wearable device, more particularly, to detecting the presence of virtual restricted-use zones based on one or more restricted-use zone markers in a physical area and restricting the use of an imaging device based on a determination that the imaging device is within a virtual restricted-use zone (e.g., disabling an imaging device such that image data cannot be captured while the imaging device is within a virtual restricted-use zone).

BACKGROUND

Consumer adoption of artificial-reality systems (e.g., head-wearable devices) is dependent on trust. Artificial-reality systems can be coupled with imaging devices (e.g., cameras) and/or microphones that are capable of capturing image data and/or audio data in a variety of locations including sensitive and private locations. Lack of restrictions in the capture of image data and/or audio data using artificial-reality systems can result in user distrust. Similarly, too many restrictions and/or stringent restrictions can take away from a user's experience.

As such, there is a need for methods and systems for enforcing restrictions on the use of imaging devices communicatively coupled with head-wearable devices that protects the privacy of others, while also providing users with the freedom to use the imaging devices communicatively coupled with head-wearable devices without feeling constrained.

SUMMARY

To avoid one or more of the drawbacks or challenges discussed above, a head-wearable device worn by a user, a wrist-wearable device worn by the user, and/or an intermediary device communicatively coupled with the head-wearable device and/or wrist-wearable device detect the presence of one or more virtual restricted-use zones. The one or more virtual restricted-use zone can include warning zones and/or enforcement zones. Warning zones, in some embodiments, are configured such that, when an imaging device communicatively coupled with the head-wearable device, the wrist-wearable device, and/or the intermediary device is within a warning zone, a notification is presented to the user that informs the user of an approaching enforcement zone. Alternatively, enforcement zones, in some embodiments, are configured such that, when an imaging device communicatively coupled with the head-wearable device, the wrist-wearable device, and/or the intermediary device is within an enforcement zone, the imaging device is temporarily disabled to prevent the user from capturing image data. The head-wearable device, the wrist-wearable device, and/or the intermediary device can also determine a position or location of the imaging device with respect to one or more virtual restricted-use zones and, in accordance with a determination that the imaging device is within an (enforcement) virtual restricted-use zone, automatically without human intervention disable the imaging device.

By automatically disabling an imaging device, the systems and methods disclosed herein provide improved techniques for maintaining the privacy of a user and those around the user, preventing the capture of owner and/or administrator protected property (e.g., museum exhibits, movie films, private property, etc.), preventing the capture of special events, and preventing the capture of protected locations and/or protected objects. In other words, the wrist-wearable devices and/or head-wearable devices described herein provide improved techniques for maintaining privacy in virtual restricted-use zones.

While the primary examples discussed herein relate to disabling an imaging device communicatively coupled with a head-wearable device, a wrist-wearable device, and/or an intermediary device, it is also contemplated that disabling other devices within virtual restricted-use zones and communicatively coupled with the communicatively coupled with the head-wearable device, the wrist-wearable device, and/or the intermediary device within virtual restricted-use zone could also improve the user's experience. For example, a microphone communicatively coupled with the head-wearable device, the wrist-wearable device, and/or the intermediary device can also be disabled within a virtual restricted-use zone.

BRIEF DESCRIPTION OF THE DRAWINGS

So that the present disclosure can be understood in greater detail, a more particular description may be had by reference to the features of various embodiments, some of which are illustrated in the appended drawings. The appended drawings, however, merely illustrate pertinent features of the present disclosure. The description may admit to other effective features as the person of skill in this art will appreciate upon reading this disclosure.

FIG. 7 illustrates a flow diagram of a method of enforcing virtual restricted-use zones for imaging devices and/or microphones communicatively coupled with a head-wearable device, in accordance with some embodiments.

FIGS. 8A-8C illustrates a detailed flow diagram of a method of enforcing virtual restricted-use zones for imaging devices communicatively coupled with a head-wearable device, in accordance with some embodiments.

FIGS. 12A-12B illustrate an example handheld intermediary processing device, in accordance with some embodiments.

Figures 1A, 1B:
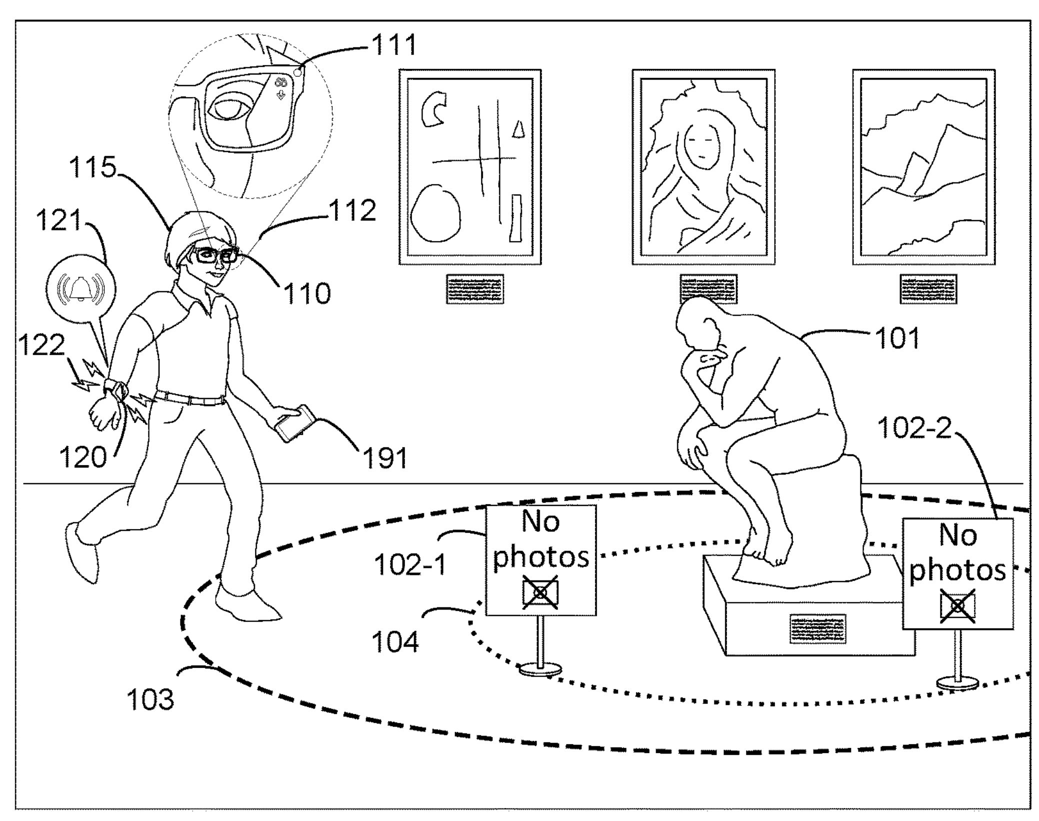
FIG. 1A-1K illustrate a system for enforcing virtual restricted-use zones for imaging devices communicatively coupled with a head-wearable device, in accordance with some embodiments.

In accordance with common practice, the various features illustrated in the drawings may not be drawn to scale. Accordingly, the dimensions of the various features may be arbitrarily expanded or reduced for clarity. In addition, some of the drawings may not depict all of the components of a given system, method, or device. Finally, like reference numerals may be used to denote like features throughout the specification and figures.

DETAILED DESCRIPTION

Numerous details are described herein to provide a thorough understanding of the example embodiments illustrated in the accompanying drawings. However, some embodiments may be practiced without many of the specific details, and the scope of the claims is only limited by those features and aspects specifically recited in the claims. Furthermore, well-known processes, components, and materials have not necessarily been described in exhaustive detail so as to avoid obscuring pertinent aspects of the embodiments described herein.

FIG. 1A-1I illustrate a system for enforcing virtual restricted-use zones for imaging devices communicatively coupled with a head-wearable device 110, in accordance with some embodiments. The system is configured to protect a user 115's privacy, as well as the privacy of others, by preventing the capture of images and video (referred to as image data) and/or audio data in restricted-use zones. In some embodiments, the system includes a head-wearable device 110 including one or more imaging devices 111 for capturing image data, microphones for capturing audio data, speakers for presenting an audio representation of data, displays 130 for presenting a visual representation of data (e.g., a heads-up display, a built-in or integrated monitor or screen, a projector, and/or similar device), and/or one or more sensors (e.g., sensors 1123A; FIG. 11C). In some embodiments, the system includes a wrist-wearable device 120 communicatively coupled with the head-wearable device 110 (e.g., by way of a Bluetooth connection between the two devices, and/or the two devices can also both be connected to an intermediary device that provides instructions and data to and between the devices). The wrist-wearable device 120 can include one or more displays (e.g., a touch screen 124), speakers, microphones, imaging devices 111, and sensors. In some embodiments, the head-wearable device 110 is communicatively coupled to an intermediary device (e.g., a, handheld intermediary processing device 1200, a server 930, a computer 940, a smartphone and/or other devices described below in reference to FIGS. 9A-12B) that is configured to provide data and/or instructions to and between the head-wearable device 110 and another device (and/or the wrist-wearable device 120). The data and/or instructions are configured to cause performance of one or more operations in conjunction to the operations performed by the head-wearable device 110 and/or the wrist-wearable device 120.

In some embodiments, the head-wearable device 110 is a pair of smart glasses, augmented reality (AR) goggles (with or without a heads-up display), AR glasses (with or without a heads-up display), smart contact (or other eye-wearable devices), other head-mounted displays, or head-wearable device 110). In some embodiments, the one or more components of the head-wearable device 110 described above are coupled with the housing and/or lenses of the head-wearable device 110. The head-wearable device can be used in real-world environments and/or in artificial reality (AR) environments, which include, but are not limited to, virtual-reality (VR) environments (including non-immersive, semi-immersive, and fully-immersive VR environments), augmented-reality environments (including marker-based augmented-reality environments, markerless augmented-reality environments, location-based augmented-reality environments, and projection-based augmented-reality environments), hybrid reality, and other types of mixed-reality environments. For example, the system can detect a virtual restricted use zone (such as a stadium or a restroom) and disable imaging device on the head-wearable device while the user is inside of the virtual restricted-use zone. In some embodiments, the head-wearable device 110 is configured to capture audio data via a microphone and/or present a representation of the audio data via speakers.

In some embodiments, the wrist-wearable device 120 is a smartwatch, wrist band, a fitness band, wristwatch, etc. In some embodiments, the one or more components of the wrist-wearable device 120 described above are coupled with a wrist-wearable structure (e.g., a band portion) of the wrist-wearable device 120, housed within a capsule portion 123 of the wrist-wearable device 120 or a combination of the wrist-wearable structure and the capsule portion.

As described in detail below, the system can determine based on image data captured by communicatively coupled imaging devices 111 whether an imaging device 111 communicatively coupled with a head-wearable device 110 worn by the user 115 is within a virtual restricted-use zone. Alternatively or in addition, in some embodiments, the system can monitor, using data obtained by one or more communicatively coupled sensors, the user 115's movement (e.g., arm movements, wrist movements, head movements, and torso movements) and/or location to determine whether the imaging device 111 communicatively coupled with the head-wearable device 110 worn by the user 115 is within a virtual restricted-use zone. For example, sensor data of a head-wearable device 110 worn by a user 115 and/or other communicatively coupled device (e.g. wrist-wearable device 120, smartphone 191, intermediary devices, etc.) can be used to detect virtual restricted-use zones that restrict the user 115's use of imaging devices 111, as well as a position of the imaging device 111 communicatively coupled with the head-wearable device 110 worn by the user 115 relative to the virtual restricted-use zones. The system, upon determining that the imaging device 111 communicatively coupled with the head-wearable device 110 worn by the user

115 is within a virtual restricted-use zone, automatically without human intervention disables the imaging device 111.

Turning to FIG. 1A, a user 115 moving into a virtual restricted-use zone is illustrated. Virtual restricted-use zones can be used to enforce one or more restrictions on the use of an imaging device and/or a microphone coupled with a head-wearable device 110 worn by the user 115 within the physical area. The physical area can be any public area (e.g., parks, beaches, amusement parks, etc.), private area (e.g., bedrooms, military bases, office spaces, etc.), or user defined region. For example, as shown in FIG. 1A, one or more virtual restricted-use zones (e.g., a first virtual restricted-use zone 103 and a second virtual restricted-use zone 104) can be associated with a museum and/or museum exhibit 101. In some embodiments, one or more virtual restricted zones can be at least partially overlapping. For example, the second virtual restricted-use zone 104 is at least partially overlapping the first virtual restricted-use zone 103. In additional embodiments, there can be one or more regions (or areas) included in the virtual restricted-use zones. Additionally, the one or more regions (or areas) can surround one another or be next to each other. For example, in FIG. 1A, the second virtual restricted-use zone 104 is nested inside of the first virtual restricted-use zone 103. In other embodiments, a plurality of virtual restricted-use zones could be next to each other or there could be multiple virtual restricted-use zones nested inside of a first virtual restricted-use zone. Each virtual restricted-use zone can have a respective predetermined size (e.g., a radius of 1 meter, 5 meters, 10 meters, etc.).

In some embodiments, a virtual restricted-use zone is used to enforce a restriction on the use of an imaging device 111 and/or a microphone coupled with a head-wearable device 110 within the physical area. In some embodiments, a virtual restricted-use zone acts as a warning zone indicating to the user that they are approaching another virtual restricted-use zone in which the functionality of an imaging device or microphone may not be disabled. In some embodiments, a virtual restricted-use zone is used to enforce a restriction on the use of an imaging device 111 and/or microphone coupled with a head-wearable device 110, by disabling the imaging device 111 and/or microphone. As discussed below, FIGS. 1A and 1B show the user 115 entering a warning zone (e.g., the first virtual restricted-use zone 103) allowing the user to retain the use of their imaging devices, and FIGS. 1C-1I discussed below, show the user entering an enforcement zone (e.g., the second virtual restricted-use zone 104) where the user is unable to use an imaging device 111 of the head-wearable device 110 and/or imaging device coupled with the head-wearable device 110.

In some embodiments, the virtual restricted-use zones are associated with one or more restricted-use zone markers. The one or more restricted-use zone markers can include restricted-use zone geofence markers, restricted-use zone visual cues, and restricted-use zone audio cues. In some embodiments the user 115 can define their own restricted-use zone as described below in FIGS. 4A-4F.

In some embodiments, a restricted-use zone visual cue associated with a virtual restricted-use zone can include a symbol, a sign, and/or an indicator that is identifiable via image data captured by an imaging device 111 communicatively coupled with the head-wearable device 110. For example, in FIG. 1A, the second virtual restricted-use zone 104 is associated with a restricted-use zone visual cue (e.g., sign 102-1 and 102-2 that include text "no photos" and images of a camera with an X through the center. A non-exhaustive list of restricted-use zone visual cues includes restroom signs, camera symbols with a strike through, text ("e.g., no photos allowed"), and/or objects typically associated with privacy (e.g., a toilet, a bathroom door, a shower, a locker room, a bedroom, etc.).

In some embodiments, a restricted-use zone geofence marker associated with a virtual restricted-use zone is located at a public area, private area, and/or user defined region and covers a predetermined area (e.g., a 1 meter radius, a 3 meter radius, a 5 meter radius, etc.), such that the restricted-use zone geofence marker is identifiable by the system when the imaging device 111 communicatively coupled with the head-wearable device 110 is within the predetermined area of the restricted-use zone geofence marker. For example in FIG. 1A, first virtual restricted-use zone 103 is associated with a restricted-use zone geofence marker (which may not be visible to the user 115). In some embodiments, the head-wearable device 110 presents to the user 115, via its display 13, an outline of the restricted-use zone geofence marker (e.g., represented by a broken lines). In some embodiments, the system (e.g., the head-wearable device 110) receives and stores one or as the user 115 moves to various locations.

In some embodiments, a restricted-use zone audio cue associated with a virtual restricted-use zone can include voice commands (of the user 115 or others near the user 115 (e.g., within two meters)), such as "stop recording," "don't record me," "no cameras allowed," etc. In some embodiments, a restricted-use zone audio cue associated with a virtual restricted-use zone can include audio triggers in a physical area (e.g., a museum loudspeaker indicating that photography is not allowed). The restricted-use zone audio cue is identifiable by processing audio data captured by a microphone communicatively coupled with the head-wearable device 110. Examples of the restricted-use zone audio cues are described below in reference to FIGS. 5C-5D.

The system 100 can identify one or more virtual restricted-use zones based on sensor data received from one or more sensor communicatively coupled with the head-wearable device 110 and/or the presence of the one or more restricted-use zone markers in the physical area. In some embodiments, the physical area is proximate to the user 115 (e.g., same room, within 5 meters, 15 meters, 30 meters, etc.). In some embodiments, the one or more restricted-use zone markers in a physical area can be determined based on location information, image data, and/or audio data provided by the head-wearable device 110. Alternatively or in addition, in some embodiments, the one or more restricted-use zone markers in a physical area can be determined based on location information, image data, and/or audio data provided by the wrist-wearable device 120 and/or other intermediary device communicatively coupled with the head-wearable device 110, which saves the head-wearable device 110's power as the head-wearable device 110 would not have to process all of the sensor data. In some embodiments, image data contains location data indicative of the user's 115 location. For example, while the user 115 is inside of the first virtual restricted-use zone 103, location information from smartphone 191 communicatively coupled to the head-wearable device 110, could be used to identify the user 115 is inside of the first virtual restricted-use zone 103.

For example, as shown in FIG. 1A, the system 100 identifies the first virtual restricted-use zone 103 based on presence of one or more restricted-use zone markers in a physical area using sensor data of one or more devices, such as the head-wearable device 110, wrist-wearable device 120, and/or smartphone 191. In particular, in FIG. 1A, the user 115 (wearing the head-wearable device 110 and/or wrist-wearable device 120) is viewing a museum exhibit 101 at a museum, and the head-wearable device 110, wrist-wearable device 120, and/or other intermediary device monitor sensor data that is used by the system 100 to determine whether the user 115 is approaching or inside the first virtual restricted-use zone 103. The system 100 can determine, based on the sensor data of the head-wearable device 110; wrist-wearable device 120; and/or smartphone 191, location information of the user 115 wearing the head-wearable device 110, which can be used to determine the relative position of the head-wearable device 110; wrist-wearable device 120; and/or smartphone 191 with respect to a restricted-use zone geofence marker associated with the first virtual restricted-use zone 103. The sensor data can include positional data obtained by one or more inertial measurement units (IMU) s, location data from a location sensing device (e.g., GPS), movement information from one or more infrared sensors, and/or other data obtained from the sensors described below in reference to FIGS. 10B and 11C.

Examples of the identification of virtual restricted-use zones based on image data and/or audio cues are provided below in reference to FIGS. 1C-1D and 5A-5D, respectively.

In some embodiments, in accordance with a determination that the imaging device 111 is within a predetermined distance from the virtual restricted-use zone, the system presents to the user 115 a notification that informs the user 115 of the virtual restricted-use zone. In some embodiments, the notification is a haptic cue notification 122 presented via a haptic generator of the head-wearable device 110 and/or other communicatively coupled device, an audio cue notification 121 presented via a speaker of the head-wearable device 110 and/or other communicatively coupled device, and a message or image displayed on a display 130 of the head-wearable device 110 and/or other communicatively coupled device. For example, the notification can be presented to the user 115 via the display 130 of the head-wearable device 110, the touch screen 124 of the wrist-wearable device 120, and/or any device communicatively coupled to the head-wearable device 110 such as the smartphone 191. The predetermined distance can be zero to 2 meters, or a distance set by the owner of the virtual restricted-use zone.

In some embodiments, the notification is presented when the user 115 is within a certain threshold distance (e.g. 0-5 m) of entering a virtual restricted-use zone. In some embodiments, the notification (e.g., a haptic cue notification 122, an audio cue notification 121, and/or a visual cue notification 108) is presented when the user 115 is within a certain threshold distance of entering a first virtual restricted-use zone 103. For example, as the user 115 approaches the first virtual restricted-use zone 103, when the user is within 0-5 m, they are notified they are approaching a virtual restricted-use zone. Additionally, in some embodiments, the system 100 presents a notification to the user 115 when the user 115 crosses into a virtual restricted-use zone. For example, in FIG. 1A the user 115 is entering the first virtual restricted-use zone 103 defined by a first restricted-use zone geofence marker (represented by a broken line), and as the user 115 crosses the first virtual restricted-use zone 103, the user 115 is notified via a haptic cue notification 122 and audio cue notification 121 on the wrist-wearable device 120 that he is entering a virtual restricted-use zone. Examples of the notification messages and/or images presented to the user 115 by the system 100 are provided below in reference to FIG. 1B.

FIG. 1B illustrates a visual cue notification 108 presented to the user 115 via the display 130 of the head-wearable device 110. The visual cue notification 108 informs the user 115 they have crossed into the first virtual restricted-use zone 103. In FIGS. 1A and 1B, the first virtual restricted-use zone 103 is a warning zone that, when entered by the user 115, causes the system 100 to present a notification that informs the user 115 of a restricted region (e.g., enforcement zone) that they are approaching. The notification informs the user 115 that there is some threshold distance before they reach the restricted region. In other words, the notification associated with a warning zone virtual restricted-use zone puts the user 115 on notice that they are close to entering a restricted region. The threshold distance to the restricted region can be defined by a restricted-use zone geofence marker associated with the (warning zone) virtual restricted-use zone or a maximum distance at which a restricted-use zone visual cue (e.g. a restroom sign) associated with the (warning zone) virtual restricted-use zone is detectable.

As described above, the first virtual restricted-use zone 103 is a warning zone and thus is intended to notify the user 115 that they are approaching an enforcement zone (defined by another virtual restricted-use zone; e.g., the second virtual restricted-use zone 104) which has the capability to shut down or disable an imaging device 111 and/or microphone communicatively coupled with the head-wearable device 110. While in a warning zone (e.g., the first virtual restricted-use zone 103), the user 115 is still able to capture audio and/or image data. For example, as shown in FIG. 1B, the user 115's imaging device 111 and microphone are still active (indicated by displayed camera icon 113-1, video icon 114-1, and microphone icon 116-1), allowing the user 115 to continue to capture image data and/or audio data. In some embodiments, the camera icon 113-1, video icon 114-1, and/or microphone icon 116-1 are presented via a display 130 of the head-wearable device 110 and/or other communicatively coupled device.

Figure 1C:
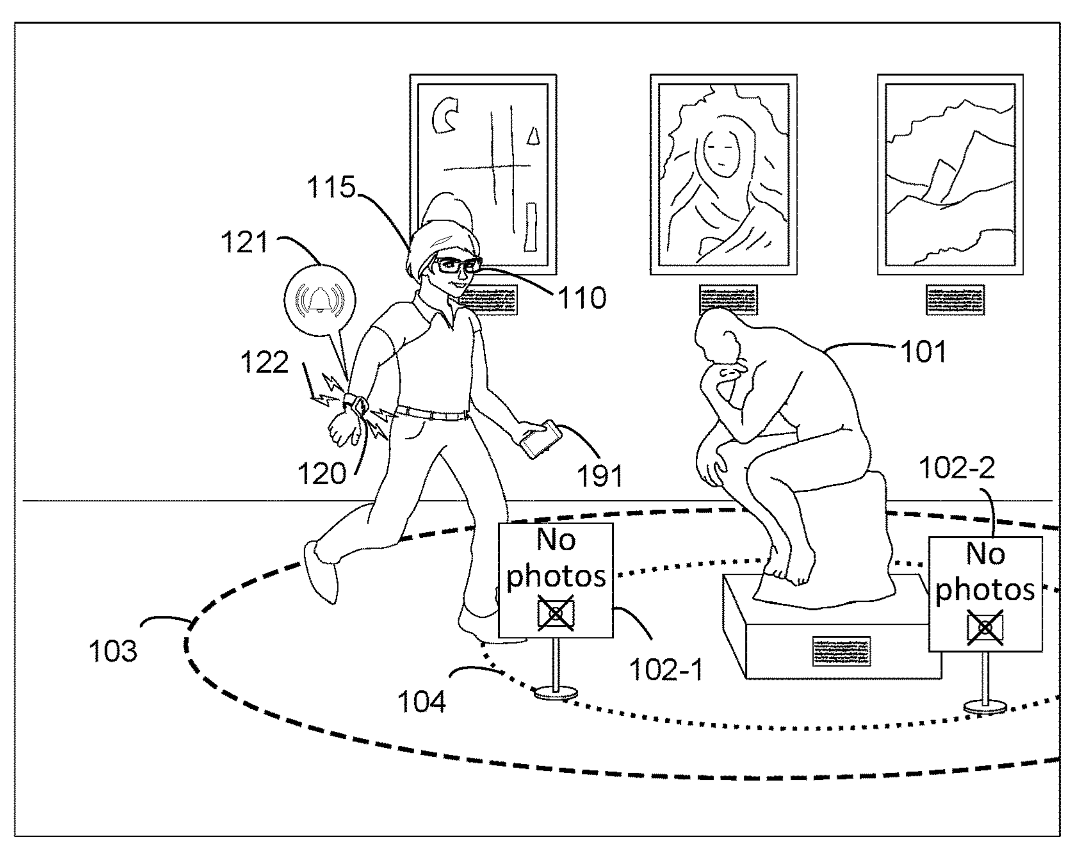

FIG. 1C illustrates a user 115 walking into a second virtual restricted-use zone 104 defined based on restricted-use zone visual cues. In particular, the system 100 identifies the second restricted-use zone 104 based on presence of the one or more restricted-use zone markers in the physical area (e.g., the museum). In FIG. 1C, the second restricted-use zone 104 (an enforcement zone) is defined by a second restricted-use zone geofence marker (represented by a dotted line) and associated with one or more restricted-use zone visual cues (e.g., first and second no photos signs 102-1 and 102-2). Although the second restricted-use zone 104 in FIG. 1C is associated with the second restricted-use zone geofence marker and the first and second no photos signs 102-1 and 102-2 (examples of the restricted-use zone visual cues), one of skill in the art will appreciate upon reading this disclosure, that a restricted-use zone can be associated with a single restricted-use zone marker or multiple restricted-use zone markers.

As described above in reference to FIGS. 1A and 1B, the system 100 can determine the presence of a restricted-use zone geofence marker associated with a virtual restricted-use zone (e.g., the second virtual restricted-use zone 104) based on location information (e.g., provided by or determined based on sensor data of the head-wearable device 110, wrist-wearable device 120, and/or intermediary device). Additionally or alternatively, in some embodiments, the system 100 can determine the presence of restricted-use zone visual cues associated with a virtual restricted-use zone (e.g., the second virtual restricted-use zone 104) based on image data provided by the head-wearable device 110, wrist-wearable device 120, and/or intermediary device. In particular, computer vision can be used on the received image data to determine the presence of restricted-use zone visual cues, which are used to determine whether the user 115 is within a predetermined distance of a virtual restricted-use zone and/or inside a virtual restricted-use zone.

In some embodiments, image data includes live video (e.g., video streams), stored video, static images, live images (e.g., sequences of images that simulate a video), etc. In some embodiments, the images captured by the head-wearable device 110, wrist-wearable device 120, and/or intermediary device are captured with low resolution, captured in environments with low lighting, and/or captured with other adverse conditions. In some embodiments, the system 100 performs one or more image processing techniques to improve the image quality, such that restricted-use zone visual cues are detectable. A non-exhaustive list of image processing techniques that can be used to improve the image quality include image restoration, linear filtering, independent component analysis, pixilation, template matching, image generation technique, and/or others known in the art. In some embodiments, the system 100 can cause one or more imaging devices 111 to capture multiple images to improve the detection of restricted-use zone visual cues (and/or the prediction of the restricted-use zone visual cues) using computer vision and/or other machine learning models. For example, the system 100 can have difficulty detecting the presence of a bathroom sign captured in the dark, and the system 100 can cause a communicatively coupled imaging device 111 to capture multiple images that are used to improve the detection of the bathroom sign (e.g., by capturing different portions of the bathroom sign, by combining multiple images to reproduce the bathroom sign, etc.).

In FIG. 1C, the system 100 can identify the second virtual restricted-use zone 104 based on presence of one or more restricted-use zone markers in a physical area using image data captured by one or more devices, such as the head-wearable device 110, wrist-wearable device 120, and/or smartphone 191. In particular, in FIG. 1C, the user 115 (wearing the head-wearable device 110 and/or wrist-wearable device 120) is approaching the museum exhibit 101, and the head-wearable device 110, wrist-wearable device 120, and/or other intermediary device capture image data that is used by the system 100 to determine whether one or more restricted-use zone visual cues are present. The system 100 uses computer vision on the captured image data to determine that signs 102-1 and 102-2 (which are associated with the second virtual restricted-use zone 104 contain the words "no photos" and a picture of a camera that has been crossed out) are present. In accordance with a determination that one or more restricted-use zone visual cues are present (e.g., signs 102-1 and 102-2), the system 100 determines whether the user 115 is approaching or inside the second virtual restricted-use zone 104.

In some embodiments, the system 100 uses computer vision on the received image data to determine a location of the user 115 with respect to a virtual restricted-use zone. In other words, the system 100 can detect one or more objects that in the captured image data that provide an anchor or reference point to determine the user 115's (and head-wearable device 110; wrist-wearable device 120; and/or smartphone 191) position relative to the virtual restricted-use zone. For example, the system 100 can detect the museum exhibit 101 and/or one or more paintings in the museum (or other exhibits or objects of interest) and determine the user 115's position within the museum (and the second virtual restricted-use zone 104).

Figure 1D:
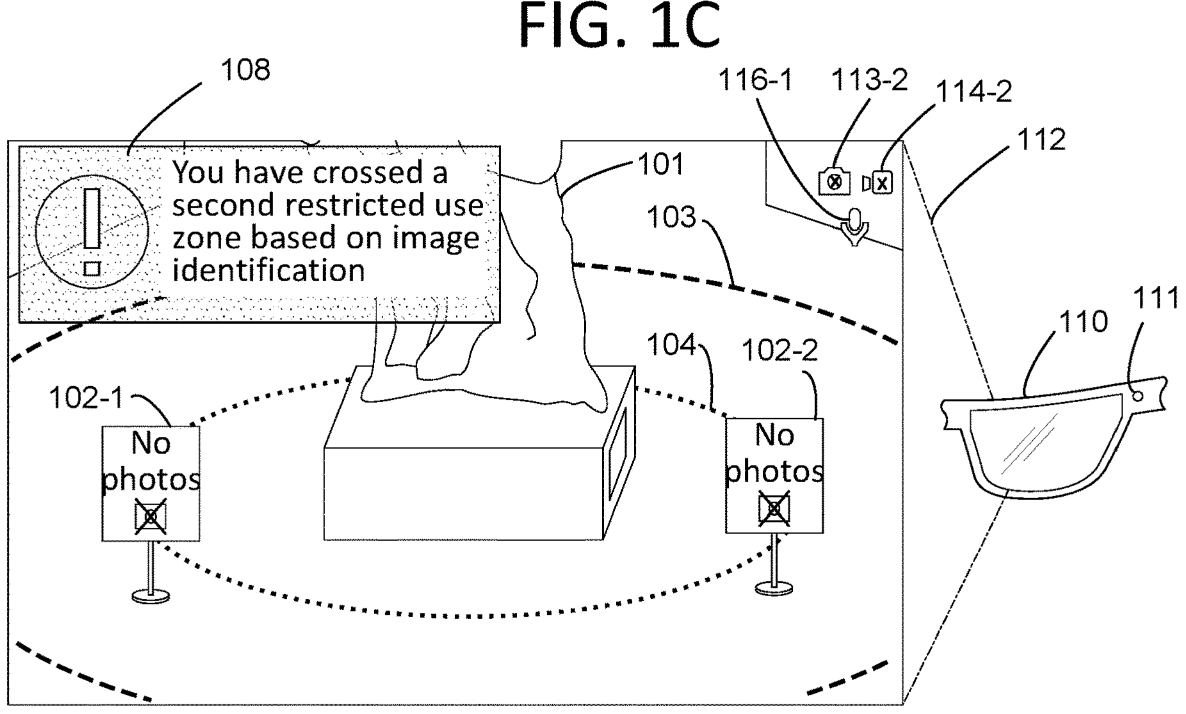

As described above in reference to FIGS. 1A and 1B, the system 100 can present one or more notifications to the user 115 when the user enters a virtual restricted-use zone. In some embodiments, the notifications presented to the user 115 when entering a warning zone (e.g., the first virtual restricted-use zone 103) are similar to the notifications presented to the user when entering an enforcement zone (e.g. the second virtual restricted-use zone 104). For example, as shown in FIGS. 1C and 1D, the system 100 can present to the user 115 a haptic cue notification 122, an audio cue notification 121, and/or a visual cue notification 108 when the user enters the second virtual restricted-use zone 104. As described above, while an imaging device 111 (or microphone) communicatively coupled with the head-wearable device 110 is determined to be within an enforcement zone, the user 115 is unable to capture image data (and/or audio data). In some embodiments, the notification associated with the enforcement zone, as further described in FIG. 1D, informs that user 115 that their imaging device 111 (or microphone) has been disabled or that they will not be allowed to capture image data (or audio data).

FIG. 1D illustrates another visual cue notification 108 presented to the user 115 via the display 130 of the head-wearable device 110. The visual cue notification 108 informs the user 115 they have crossed into the second virtual restricted-use zone 104. In FIGS. 1C and 1D, the second virtual restricted-use zone 104 is an enforcement zone that, when entered by the user 115, causes the system 100 to present a notification that informs the user 115 they will not be able to capture image data. Additionally, in some embodiments, system 100 shuts down or disables an imaging device 111 and/or microphone communicatively coupled with the head-wearable device 110 when the user 115 enters the second virtual restricted-use zone 104. In other words, the notification associated with an enforcement zone virtual restricted-use zone puts the user 115 on notice that certain features are disabled or will not be available. For example, as shown in FIG. 1D, the user 115's imaging device 111 is no longer active and the user 115 is notified via the displayed crossed-out camera icon 113-2 and crossed-out video icon 114-2 (in this example, the microphone is still active as indicated by the microphone icon 116-1). In some embodiments, the crossed-out camera icon 113-2, crossed-out video icon 114-2, and/or microphone icon 116-1 are presented via a display 130 of the head-wearable device 110 and/or other communicatively coupled device to show that the camera and video features are currently unavailable to the user. In some embodiments, the disabling of the imaging device and/or microphone is done automatically without human intervention in conjunction with the presentation of the notification via the display 130 of the head-wearable device 110 or other communicatively coupled device.

Figure 1E:
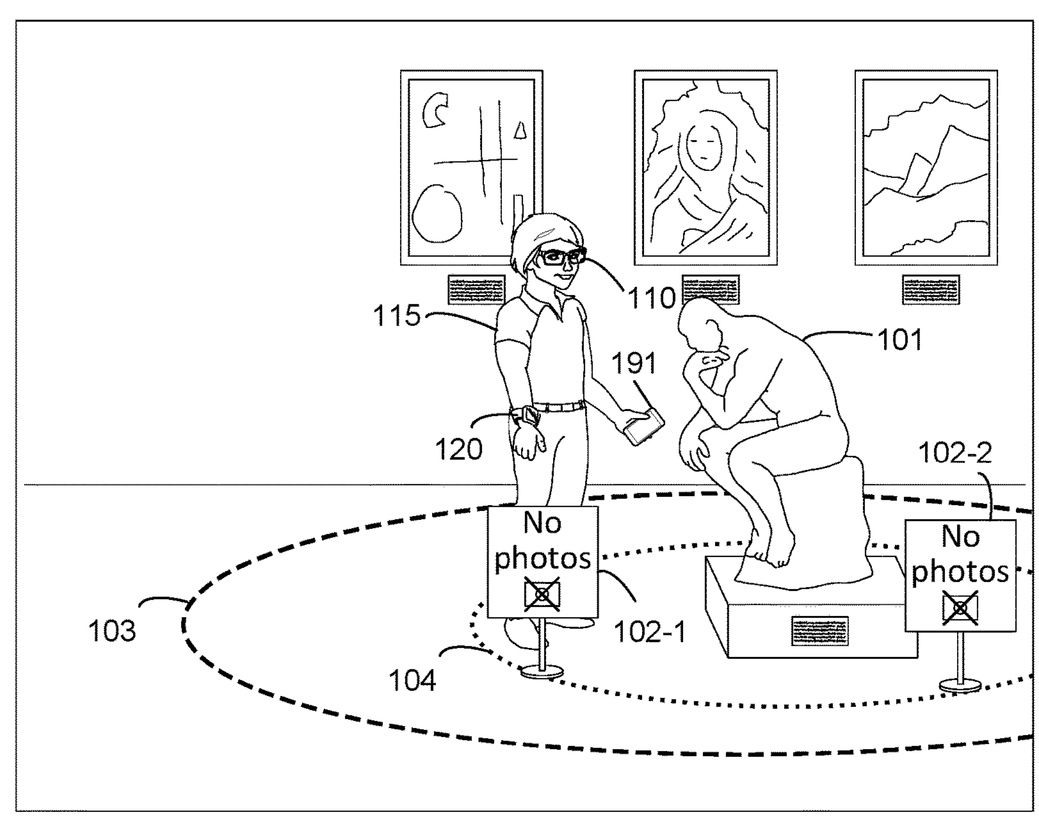

FIG. 1E illustrates the user inside the second virtual restricted-use zone 104 unable to utilize the camera or video functions of his head-wearable device 110. As described in FIG. 1C, the second virtual restricted-use zone 104 is an enforcement zone, which results in the user's 115 inability to access the imaging device 111 via the head-wearable device. In some embodiments, other devices communicatively coupled with the head-wearable device 110, such as the wrist-wearable device 120, can also be disabled. As described in FIG. 1A, the system 100 can identify the second virtual restricted-use zone 104 based on presence of one or more restricted-use zone markers in a physical area using sensor data of one or more devices, location data of the one or more devices, and/or image data captured by the one or more devices.

Figure 1F:
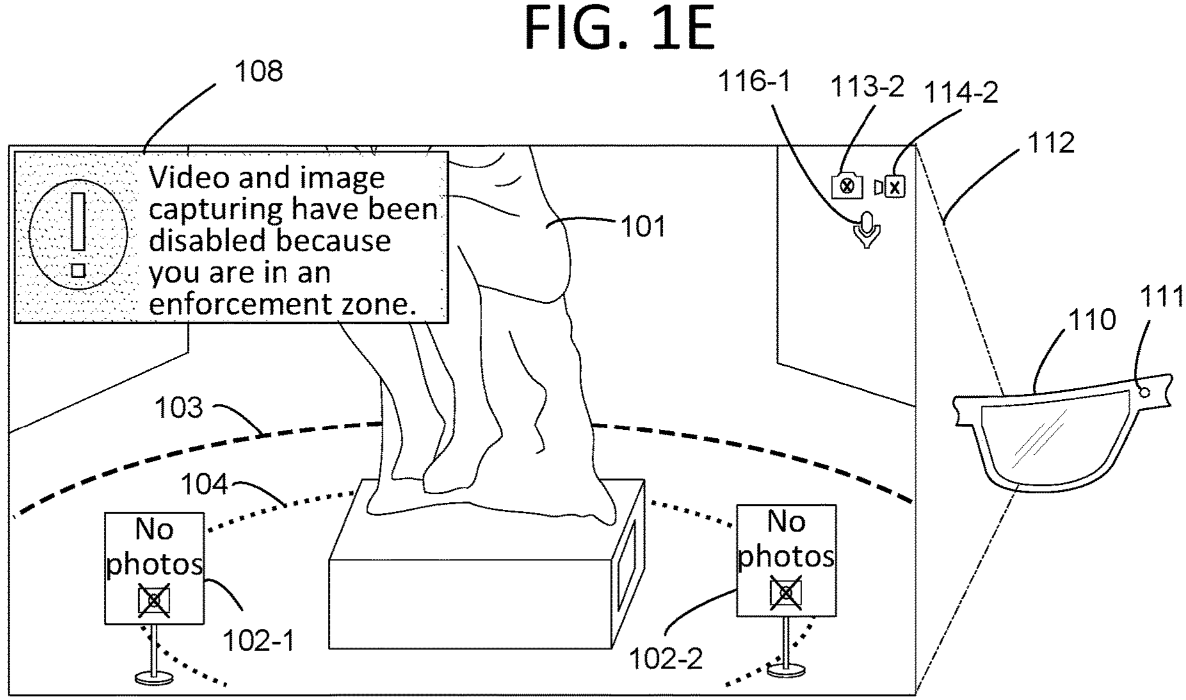

FIG. 1F illustrates a visual cue notification 108 presented to the user 115 via the display 130 of the head-wearable device 110. The visual cue notification 108 is associated with the second virtual restricted-use zone 104 and informs the user 115 that video and image capturing have been disabled because the user 115 is inside an enforcement zone. The visual cue notification 108 further informs the user 115 of the capabilities that have been disabled (e.g., video and image capturing capabilities). In FIG. 1F, similar to FIG. 1D, the user 115's imaging device 111 is no longer active (indicated by the displayed crossed-out camera icon 113-2 and crossed-out video icon 114-2), prohibiting the user from capturing image data and/or audio data. In particular, the display 130 of the head-wearable device 110 can notify the user 115 of the disabled, available, or active components via one or more icons (e.g., the crossed-out camera icon 113-2, the crossed-out video icon 114-2, and the microphone icon 116-1). In some embodiments, the one or more icons are displayed in one or more colors to inform the user 115 of a component's status (e.g., disabled, available (and inactive), or active). For example, if the microphone of the head-wearable device 110 is active and capturing audio data, the microphone icon 116-1 can be presented as red. Alternatively, if the microphone of the head-wearable device 110 is inactive and not capturing audio data, the microphone icon 116-1 dimmed (e.g., not illuminated, or visible). In some embodiments, the user 115 is notified via a haptic cue notification 122, an audio cue notification 121, and/or a visual cue notification 108 of a component's status.

Figure 1G:
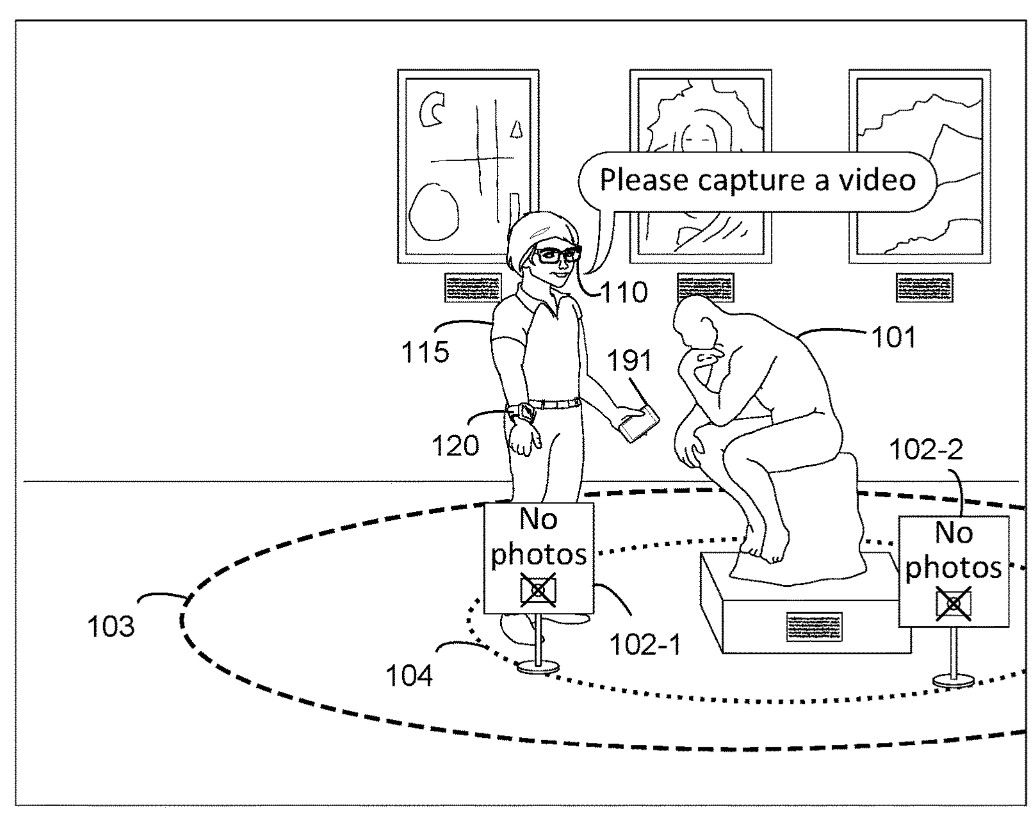

FIG. 1G illustrates the head-wearable device 110 receiving a user input configured to initiate the imaging device 111 communicatively coupled with the head-wearable device 110 and cause the imaging device 111 to capture image data. In FIG. 1G, the user 115 is inside the enforcement zone (the second virtual restricted-use zone 104), and verbally requests the head-wearable device 110 to capture image data. As discussed above in reference to FIGS. 1A-1F, while a user 115 is inside of an enforcement zone, the imaging device 111 and/or microphone communicatively coupled to the head-wearable device 110 are disabled. In conjunction with disabling the imaging device 111 and/or microphone, the head-wearable device 110 notifies (e.g. via a haptic cue notification 122, an audio cue notification 121, and/or a visual cue notification 108) the user 115 that the imaging device 111 and/or microphone have been disabled and the request to capture image data (and/or audio data) is declined. In some embodiments, user inputs to capture image data and/or audio data are declined as long as the user 115 is inside of the enforcement zone. An example of the visual cue notification 108 is provided below in reference to FIG. 1H.

In some embodiments, if the user 115 is live streaming before entering the enforcement zone, the system 100 notifies the user 115, via the display 130 of head-wearable device 110, that the imaging device 111 and/or microphone communicatively coupled to the head-wearable device 110 will be disabled or shut down when they enter the enforcement zone. When the user 115 enters the enforcement zone (such as the second virtual restricted-use zone 104), the system disables the communicatively coupled imaging device 111 and the live stream is ended. If the live stream is associated with a live chat (which is presented via a display 130 of the head-wearable device 110 or other display communicatively coupled with the head-wearable device 110), the user 115 will still be able to view the live chat even though the live stream is ended. In other words, the system 100 stops streaming imaging data but allows other streaming services to continue. In alternate embodiments, when the imaging device 111 is disabled, the live stream and live chat is ended. When a live stream is ended, the user 115 is notified via the display 130 of the head-wearable device 110 or other communicatively coupled device that the live stream has ended.

Figure 1H:
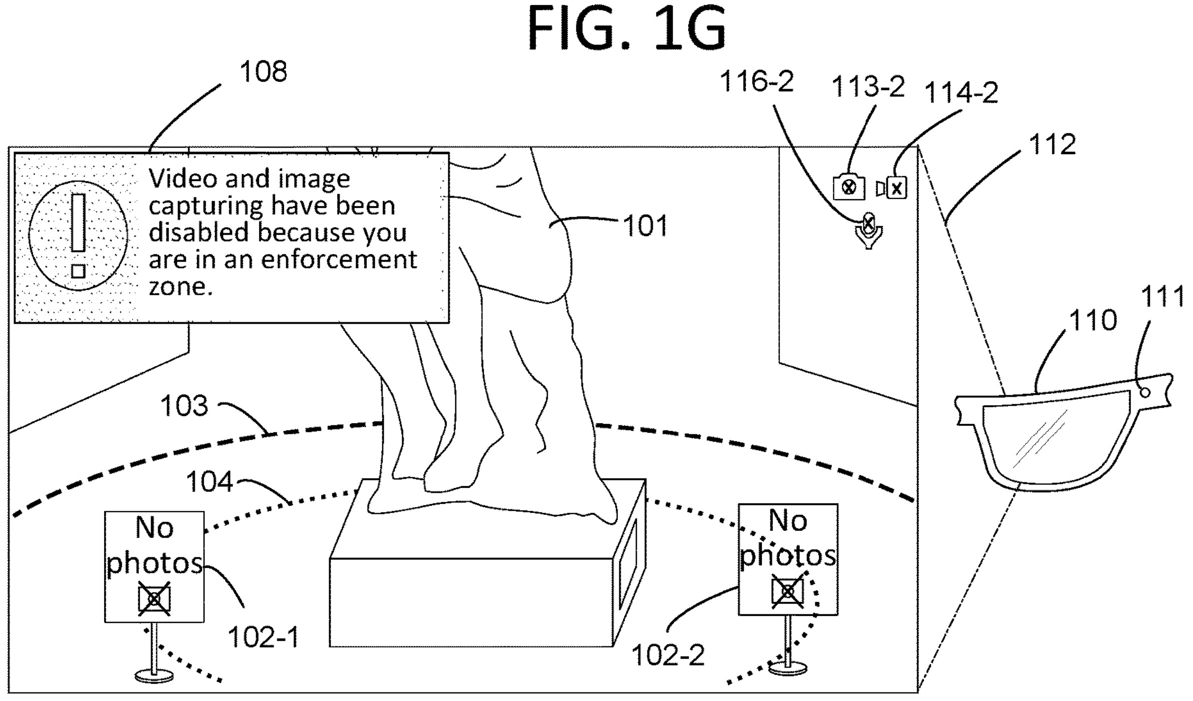

FIG. 1H illustrates a visual cue notification 108 presented to the user 115 via the display 130 of the head-wearable device 110 while the user 115 is within the second virtual restricted-use zone 104. In particular, the visual cue notification 108 is produced in response to a voice input received by the user 115 while within the second virtual restricted-use zone 104, as shown in FIG. 1G. The visual cue notification 108 informs the user 115 they are unable capture video and images because the user 115 is inside of the second virtual restricted-use zone 104, which as previously described is an enforcement zone. Additionally, in some embodiments, the visual cue notification 108 (or a haptic cue notification 122 and/or an audio cue notification 121) can provide the user 115 with information on how to enable the imaging device 111. For example, the visual cue notification 108 can instruct the user 115 to leave the enforcement zone to enable the imaging device. As described above in reference to FIGS. 1C-IF, the system 100 can notify the user 115 of the disabled, available, or active components via one or more icons presented via the display 130 of the head-wearable device 110 (e.g., the crossed-out camera icon 113-2, the crossed-out video icon 114-2, and crossed-out microphone icon 116-2).

Figure 1I:
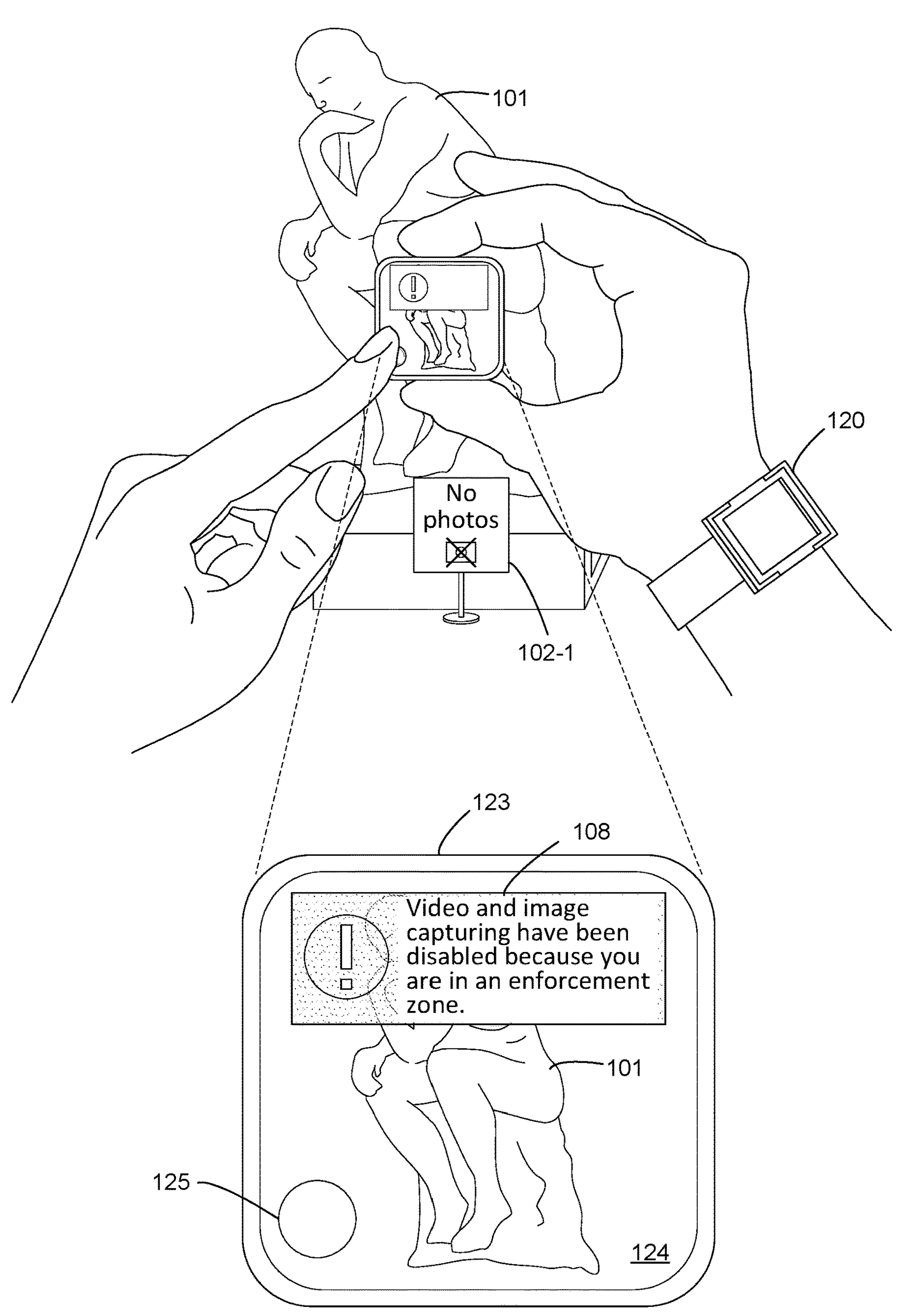

FIG. 1I illustrates the user trying to capture an image using an imaging device communicatively coupled with the head-wearable device. In particular, the user 115 attempts to capture in image using an imaging device 111 included in the removable capsule portion 123 of the wrist-wearable device 120 (instead of the imaging device 111 of head-wearable device 110) while still in the second virtual restricted-use zone 104. In FIG. 1I, the user presses button 125 on the touch sensitive screen 124 to attempt to take a photo of the museum exhibit 101. However, because the user 115 is within the second virtual restricted-use zone 104 (and the imaging device 111 of the head-wearable device 110 is disabled, as well as other communicatively coupled the imaging devices 111), the user 115 is not able to capture an image using the removable capsule portion 123 of the wrist-wearable device 120 (or other communicatively coupled imaging device 111). The system 100 can provide a notification to the user 115 of the disabled imaging device and/or the declined input to capture image data via any communicatively coupled device. For example, in FIG. 1I, when the user 115 attempts to capture an image using the removable capsule portion 123 of the wrist-wearable device 120, the user 115 is notified by a visual cue notification 108, via the display of the removable capsule portion 123 of the wrist-wearable device 120, that the video and image capturing has been disabled because the user 115 is in an enforcement zone.

Figure 1J:
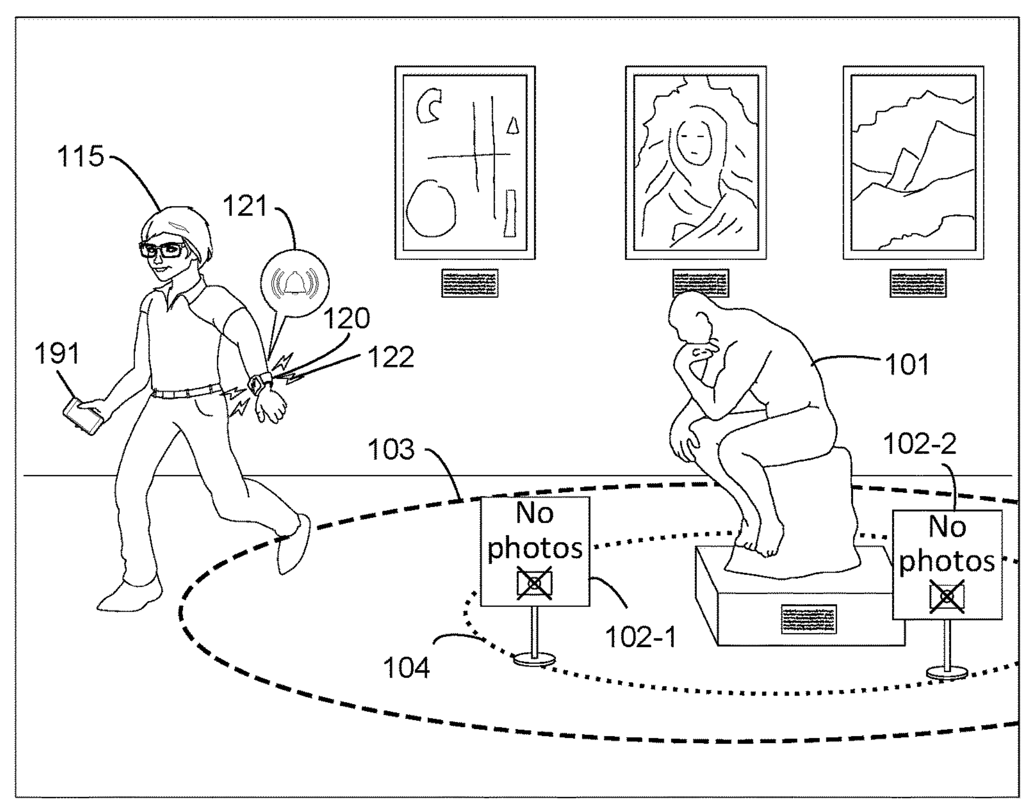

FIG. 1J illustrates the user 115 leaving both the first and second virtual restricted-use zones 103 and 104. When the user 115 leaves each of the virtual restricted-use zones, the system 100 notifies the user 115 via a haptic cue notification 122, an audio cue notification 121, and/or a visual cue notification 108 each time they leave a respective virtual restricted-use zone. In some embodiments, the notification indicates to the user 115 the capabilities that have been reenabled (e.g., imaging device 111 is now available).

Figure 1K:
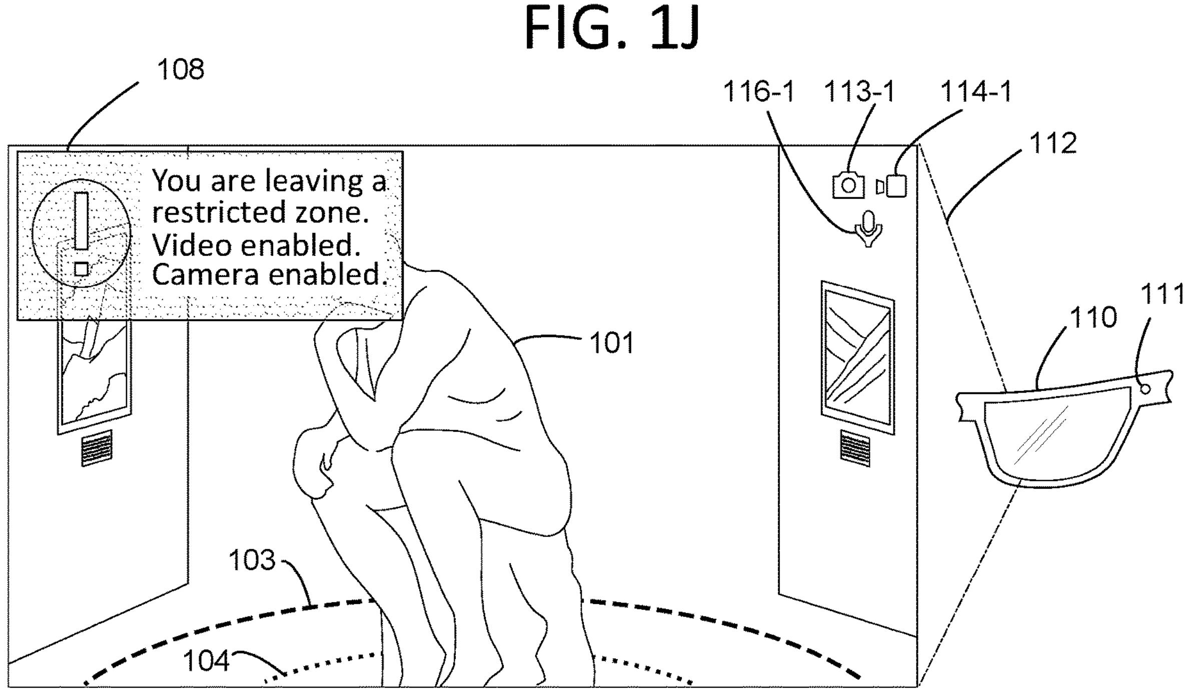

FIG. 1K illustrates a visual cue notification 108 presented to the user 115 via the display 130 of the head-wearable device 110. The visual cue notification 108 informs the user 115 they are leaving the virtual restricted-use zone and that access to the camera and video functions are now enabled. Because the user 115 is no longer in the enforcement zone, the user 115 is free to use the imaging device 111 on the head-wearable device 110 in addition to imaging devices on other communicatively coupled devices. In other words, the notification associated with leaving the second virtual restricted-use zone 104 informs the user 115 that certain features of the head-wearable device 110 and/or other communicatively coupled devices are now enabled. For example, as shown in FIG. 1K, the user 115's imaging device 111 and microphone are now active (as indicated by displayed camera icon 113-1, video icon 114-1, and microphone icon 116-1), and allow the user to capture image data and/or audio data.

Figure 2A:
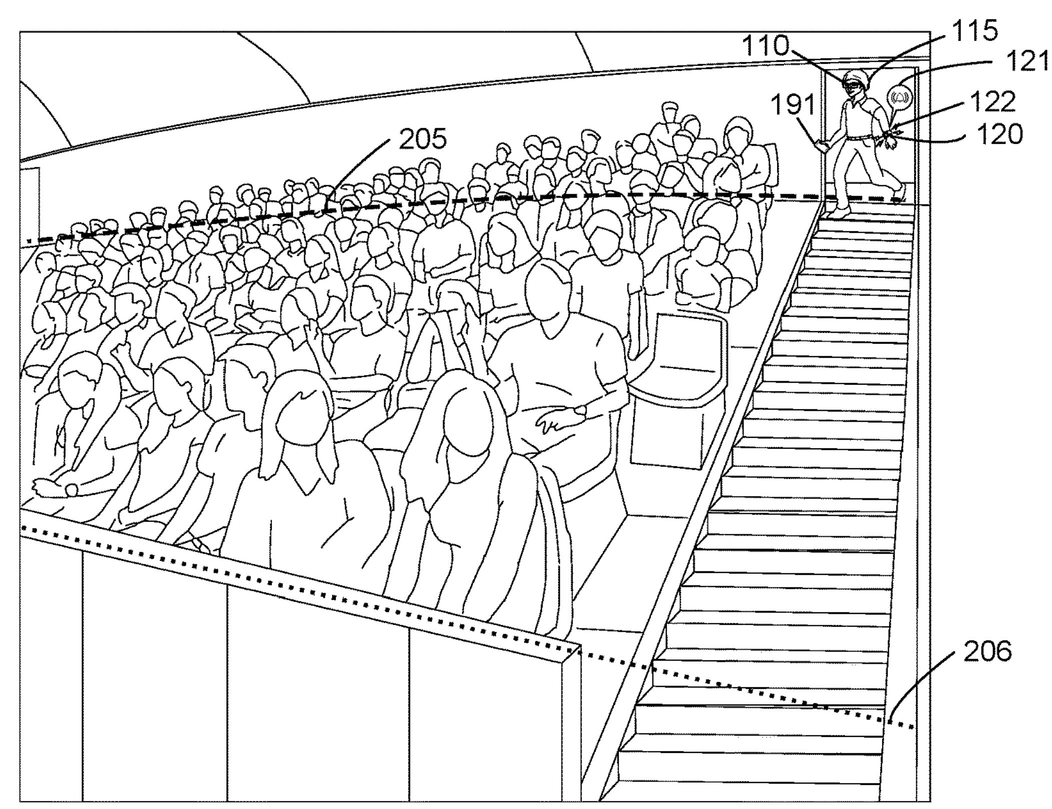
FIG. 2A-2H illustrate a system for enforcing virtual restricted-use zones for imaging devices communicatively coupled with a head-wearable device based on the presence of one or more restricted-use zone geofence markers, in accordance with some embodiments.

FIG. 2A-2H illustrate a system for enforcing virtual restricted-use zones for imaging devices communicatively coupled with a head-wearable device 110 based on the presence of one or more restricted-use zone geofence markers, in accordance with some embodiments. In FIG. 2A, a user 115 wearing the head-wearable device 110 and wrist-wearable device 120 enters a stadium including two virtual restricted-use zones, a first virtual restricted-use zone 205 and a second virtual restricted-use zone 206. The first virtual restricted-use zone 205 is defined by a first restricted-use zone geofence marker (represented by broken lines) and the second virtual restricted-use zone 206 is defined by a second restricted-use zone geofence marker (represented by dotted lines). As described above in reference to FIGS. 1A-1K, the virtual restricted-use zones can be warning zones or enforcement zones. In some embodiments, warnings and/or restrictions associated with the warning zone and/or enforcement zone are predetermined and/or configurable (e.g., by an administrator of a business, building, landmark, or other locations, and/or by the user 115 as described below in reference to FIGS. 4A-4F). In some embodiments, two or more warning zones have the same or distinct warnings and/or restrictions. Similarly, in some embodiments, two or more enforcement zones have the same or distinct warnings and/or restrictions.

Returning to FIG. 2A, as the user 115 enters the stadium, the user 115 enters the first virtual restricted-use zone 205, which is a first enforcement zone. When the user 115 enters the first virtual restricted-use zone 205, the system can notify the user 115 that he entered a virtual restricted-use zone via a haptic cue notification 122 and/or audio cue notification 121 presented by the head-wearable device 110 and/or wrist-wearable device 120. In some embodiments, as shown and described below in reference to FIG. 2B, the system can also cause the head-wearable device 110 and/or wrist-wearable device 120 to present to the user 115 a visual cue notification 108 informing him that he entered the first virtual restricted-use zone 205. Additionally or alternatively, in some embodiment, the system can cause an intermediary device, such as smartphone 191, to present a haptic cue notification 122, an audio cue notification 121, and/or a visual cue notification 108 to notify the user 115 that he entered the first virtual restricted-use zone 205.

Figure 2B:
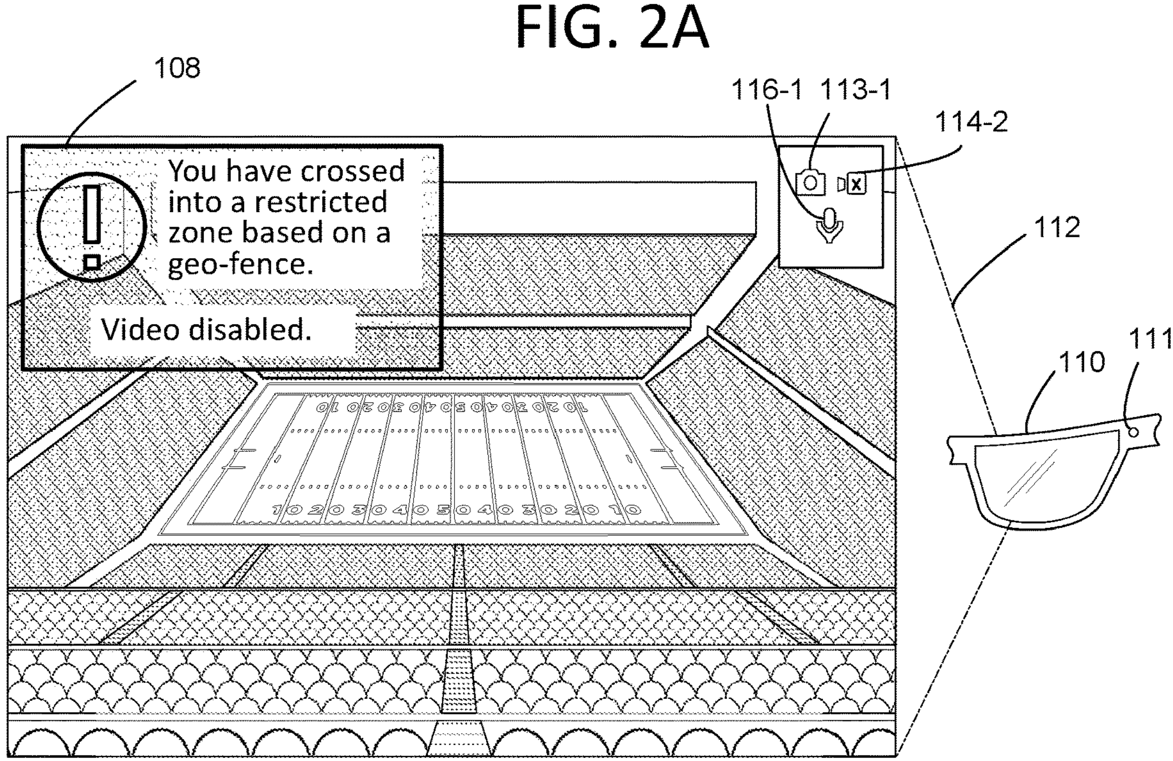

FIG. 2B illustrates the user 115's field of view while wearing the head-wearable device 110 and entering the first virtual restricted-use zone 205. The system 100, upon determining that the head-wearable device 110 is within the first virtual restricted-use zone 205 (a first enforcement zone), is configured to disable the user 115's ability to capture video data (represented by crossed out video icon 114-2) while still allowing the user to capture image data and/or audio data (represented by a camera icon 113-1 and microphone icon 116-1). For example, the system 100 can shut down or disables the video feature on imaging devices communicatively coupled with the head-wearable device 110 when the user 115 enters the first virtual restricted-use zone 205. Examples of determining the presence of the head-wearable device 110 (and/or other communicatively coupled device) within a virtual restricted-use zone are provided above in reference to FIGS. 1A-1K.

In addition, in some embodiments, the system 100 presents the visual cue notification 108 to the user 115, via the display 130 of the head-wearable device 110 (or other communicatively coupled device), when the user 115 enters the first virtual restricted-use zone 205. In particular, the visual cue notification 108 is associated with the first virtual restricted-use zone 205 and informs the user 115 they have crossed into the first virtual restricted-use zone 205. In some embodiments, the visual cue notification 108 includes information on the one or more disable devices. For example, as shown in FIG. 2B, the visual cue notification 108 includes a message notifying the user that video is disabled.

Figure 2C:
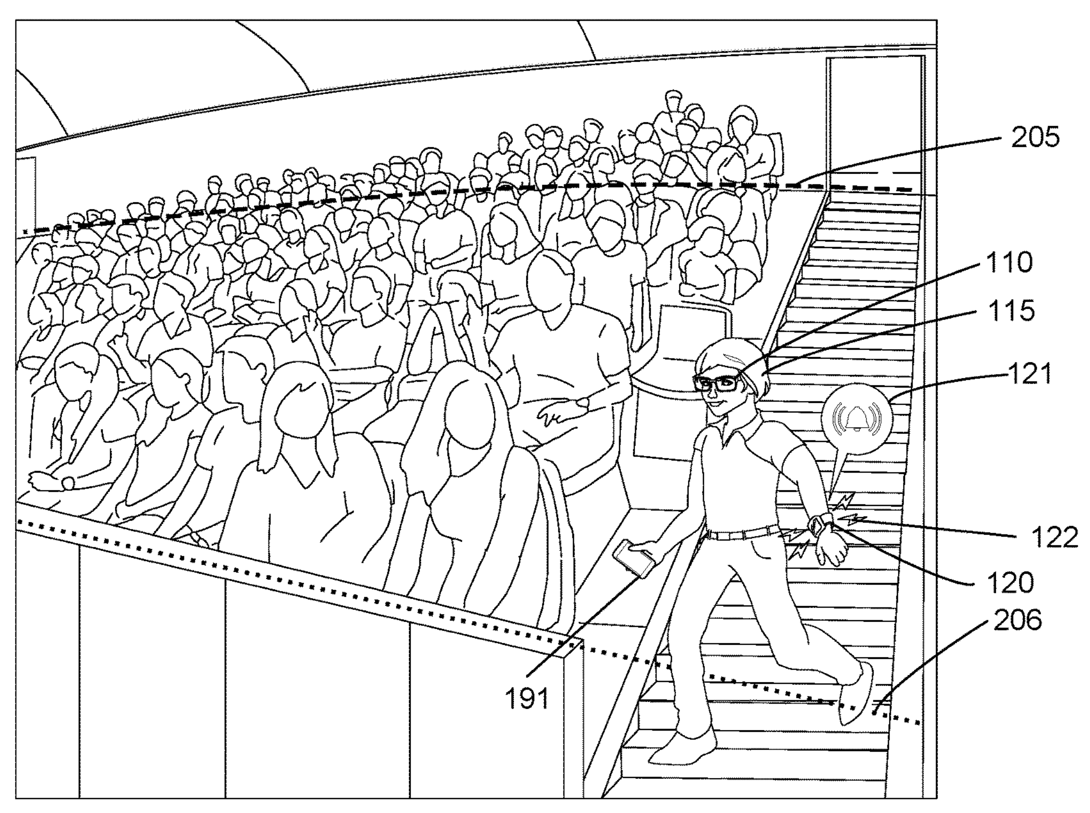

In FIG. 2C, the user 115 moves closer to the field inside of the stadium and enters the second virtual restricted-use zone 206, which is a second enforcement zone. As described above in reference to FIGS. 2A and 2B, when the user 115 enters the second virtual restricted-use zone 206, the system can notify the user 115 that he entered another virtual restricted-use zone via a haptic cue notification 122, an audio cue notification 121, and/or a visual cue notification 108 presented by the head-wearable device 110, wrist-wearable device 120, and/or communicatively coupled intermediary device.

Figure 2D:
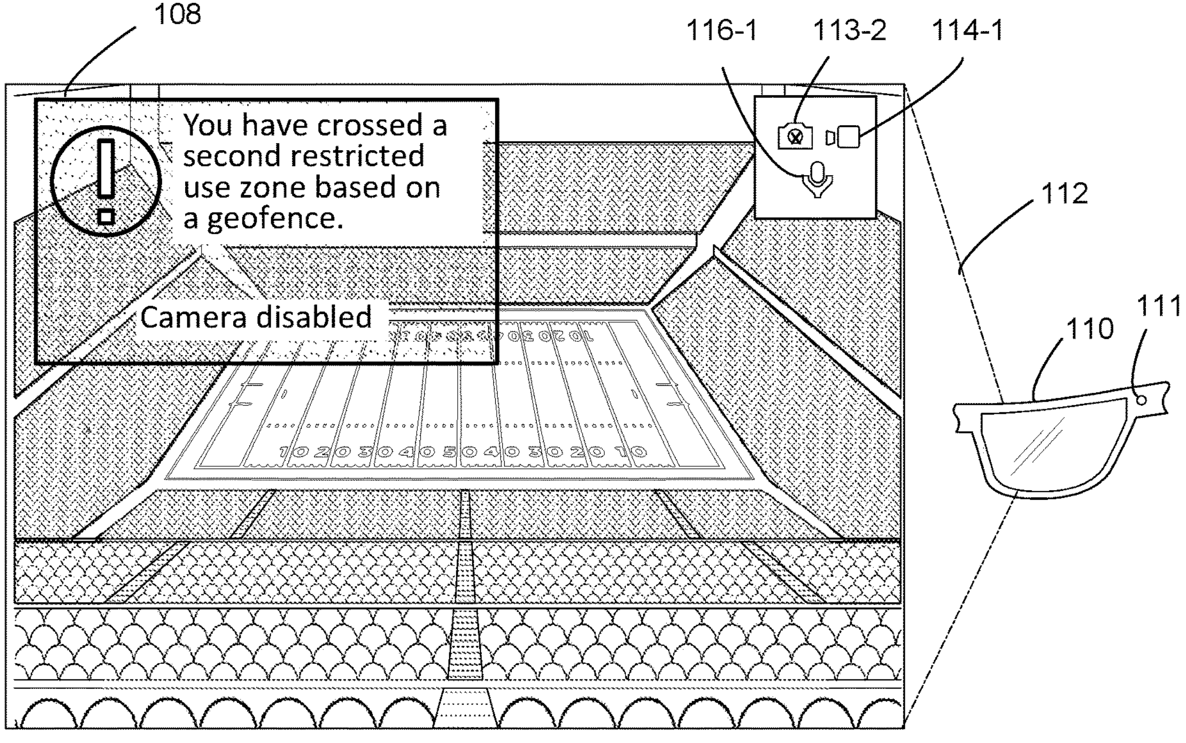

FIG. 2D illustrates the user 115's field of view while wearing the head-wearable device 110 and entering the second virtual restricted-use zone 206. The system 100, upon determining that the head-wearable device 110 is within the second virtual restricted-use zone 206 (a second enforcement zone), is configured to disable the user 115's ability to capture image data (represented by crossed-out camera icon 113-2) while still allowing the user to capture video data and/or audio data (represented by a video icon 114-1 and microphone icon 116-1). For example, the system 100 can shut down or disables the camera feature on imaging devices communicatively coupled with the head-wearable device 110 when the user 115 enters the second virtual restricted-use zone 206. A skilled artisan will appreciate that in some embodiments, virtual restricted-use zones can disable more than one device while the user 115 is within a particular virtual restricted-use zone.

In addition, in some embodiments, the system 100 presents the visual cue notification 108 to the user 115, via the display 130 of the head-wearable device 110 (or other communicatively coupled device), when the user 115 enters the second virtual restricted-use zone 206. In particular, the visual cue notification 108 is associated with the second virtual restricted-use zone 206 and informs the user 115 they have crossed into the second virtual restricted-use zone 206. In some embodiments, the visual cue notification 108 includes information on the one or more disable devices. For example, as shown in FIG. 2D, the visual cue notification 108 includes a message notifying the user that the camera is disabled.

Figure 2E:
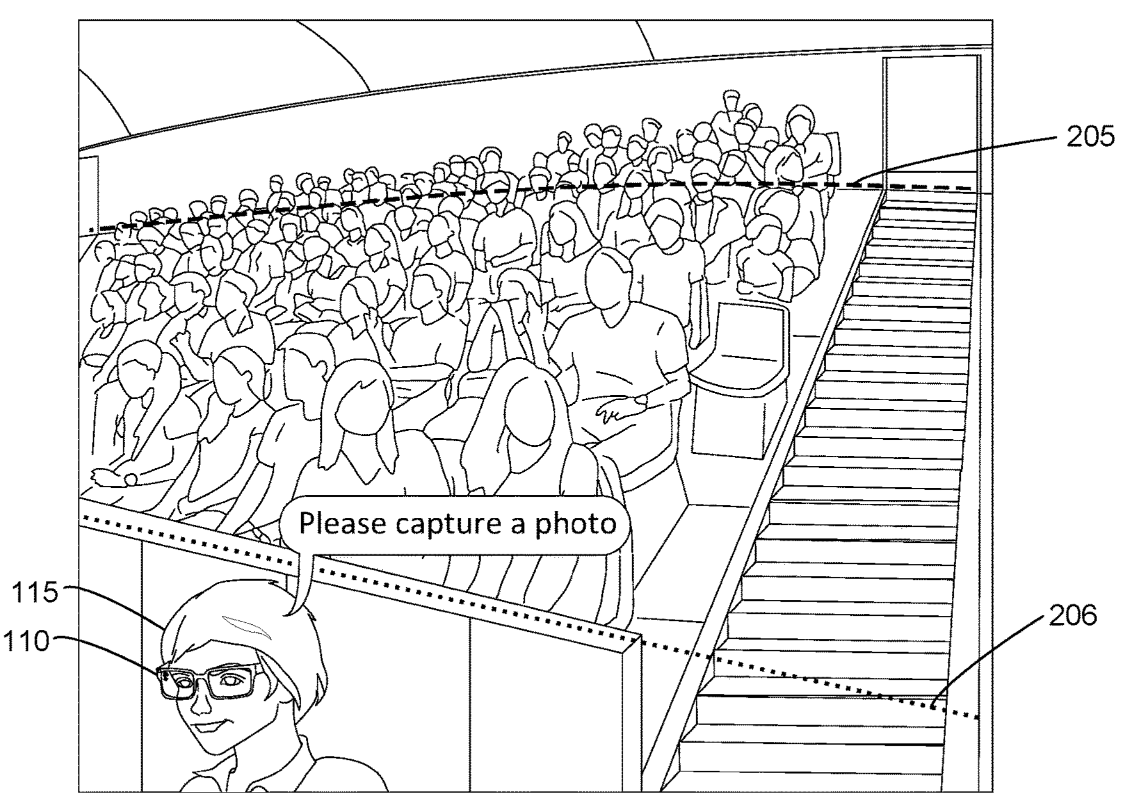

In FIG. 2E, the user 115 moves onto the field while still in the second virtual restricted-use zone 206. Further, in FIG. 2E, the user 115 provides a user input configured to cause an imaging device 111 communicatively coupled with the head-wearable device 110 to capture image data. As described in FIGS. 1G and 1H, in some embodiments, the user input is a voice input. Additionally and/or alternatively, in some embodiments, the user input is a touch command (e.g., at a display of the wrist-wearable device 120 and/or contacting a portion of the head-wearable device 110), a hand gesture, an in-air gesture, a surface-contact gesture, and or other gestures that can be detected and determined based on movements of a user's hand (e.g., gestures performed with a user's hand that is wearing/donning the wrist-wearable device 120 and/or gestures captured by an imaging device 111 and recognized as a gesture using computer vision or other image processing techniques). As discussed above in reference to FIGS. 2C-2D, while the user 115 is inside of the second virtual restricted-use zone 206, the user 115 is unable to capture image data via the imaging device 111 communicatively coupled to the head-wearable device 110. The system 100, upon receiving the user 115's request to capture image data will deny the request. As shown and described below in reference to FIG. 2F, the user 115 can be notified (e.g. via a haptic cue notification 122, audio cue notification 121, and/or a visual cue notification 108) of the denied request to capture image data.

Figure 2F:
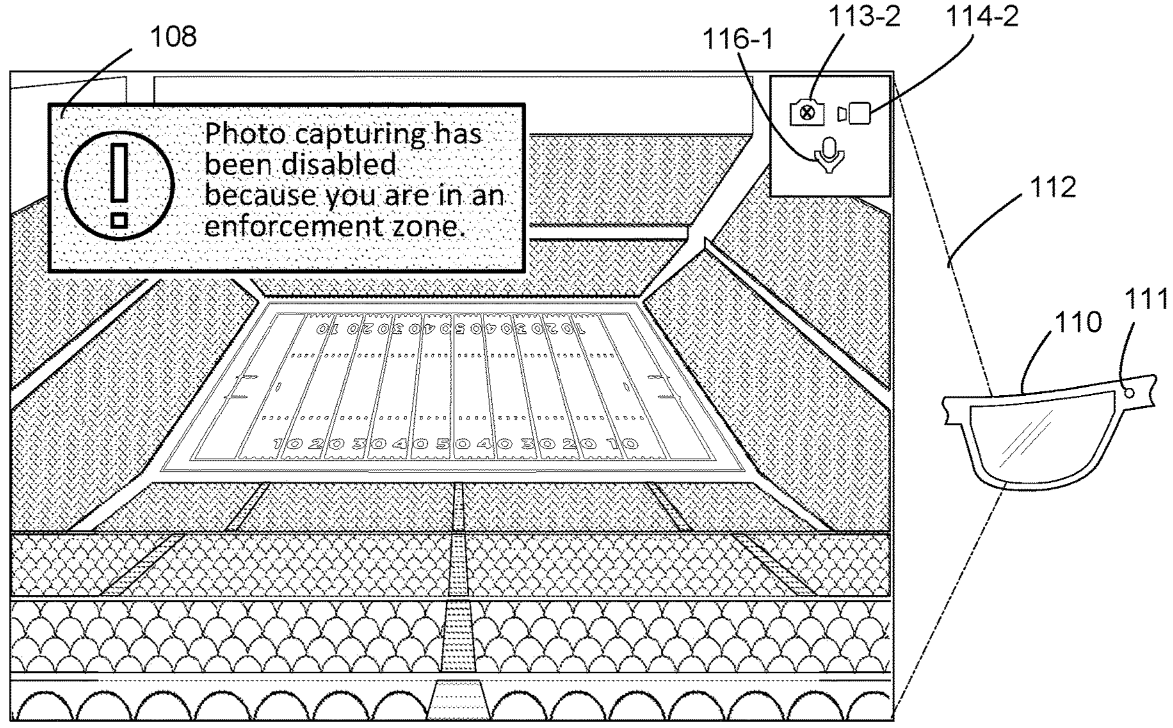

FIG. 2F illustrates the user 115's field of view while wearing the head-wearable device 110 and within the second virtual restricted-use zone 206. The system 100, upon receiving the user 115's request to capture image data and determining that the head-wearable device 110 is within the second virtual restricted-use zone 206, denies the user 115's request to capture image data (which has been disabled as shown by the crossed-out camera icon 113-2). In addition, in some embodiments, the system 100 presents, responsive to the user 115's request to capture image data, a visual cue notification 108, via the display 130 of the head-wearable device 110 (or other communicatively coupled device). The visual cue notification 108 informs the user 115 that his request to capture image data was denied because he is within the second virtual restricted-use zone 206. In some embodiments, the visual cue notification 108 also informs the user 115 of alternate methods of capturing image data if available. For example, in FIG. 2F, while capturing image data may not be available, the user 115 is still able to capture video data, and the visual cue notification 108 includes a suggestion informing the user 115 of the available video capturing features.

Figure 2G:
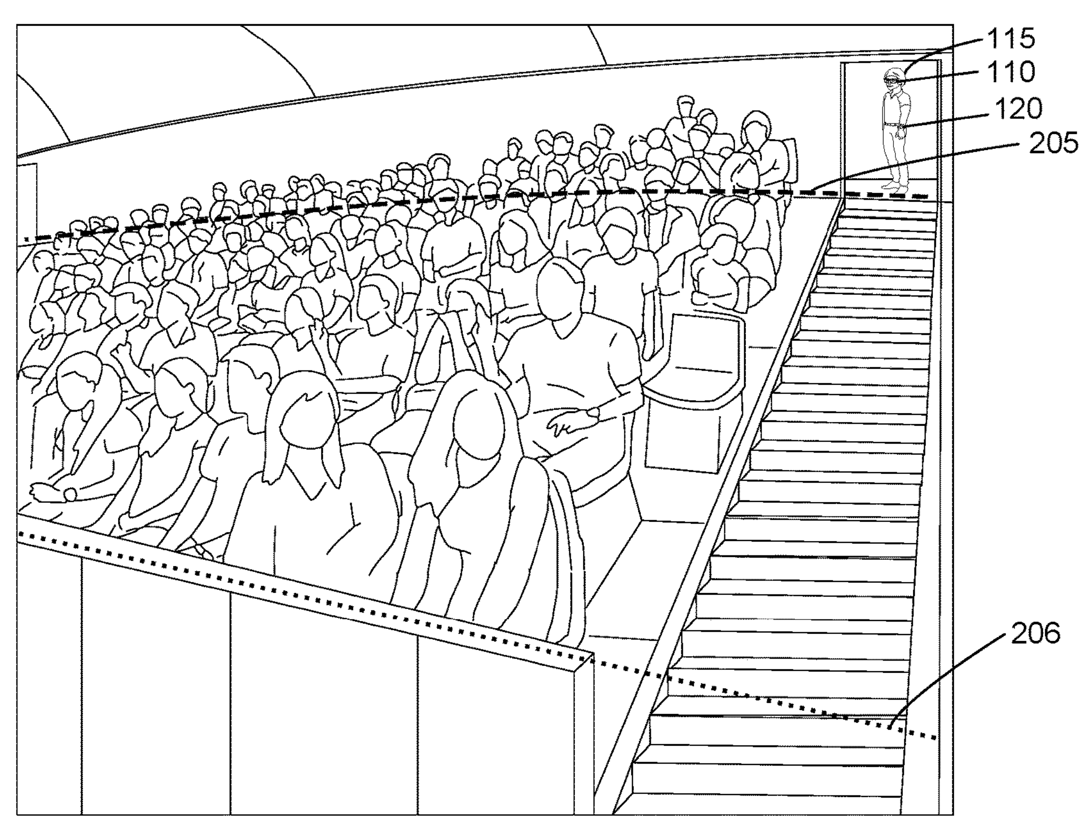

FIG. 2G illustrates the user 115 leaving the stadium and the first and second virtual restricted-use zones 205 and 206. When the user 115 leaves each of the virtual restricted-use zones, the system 100 notifies the user 115 via a haptic cue notification 122, an audio cue notification 121, and/or a visual cue notification 108 each time they leave a respective virtual restricted-use zone. Additionally, in some embodiments, the system 100 notifies the user 115 of the devices and/or device capabilities that have been reenabled, as shown and described below in reference to FIG. 2H.

Figure 2H:
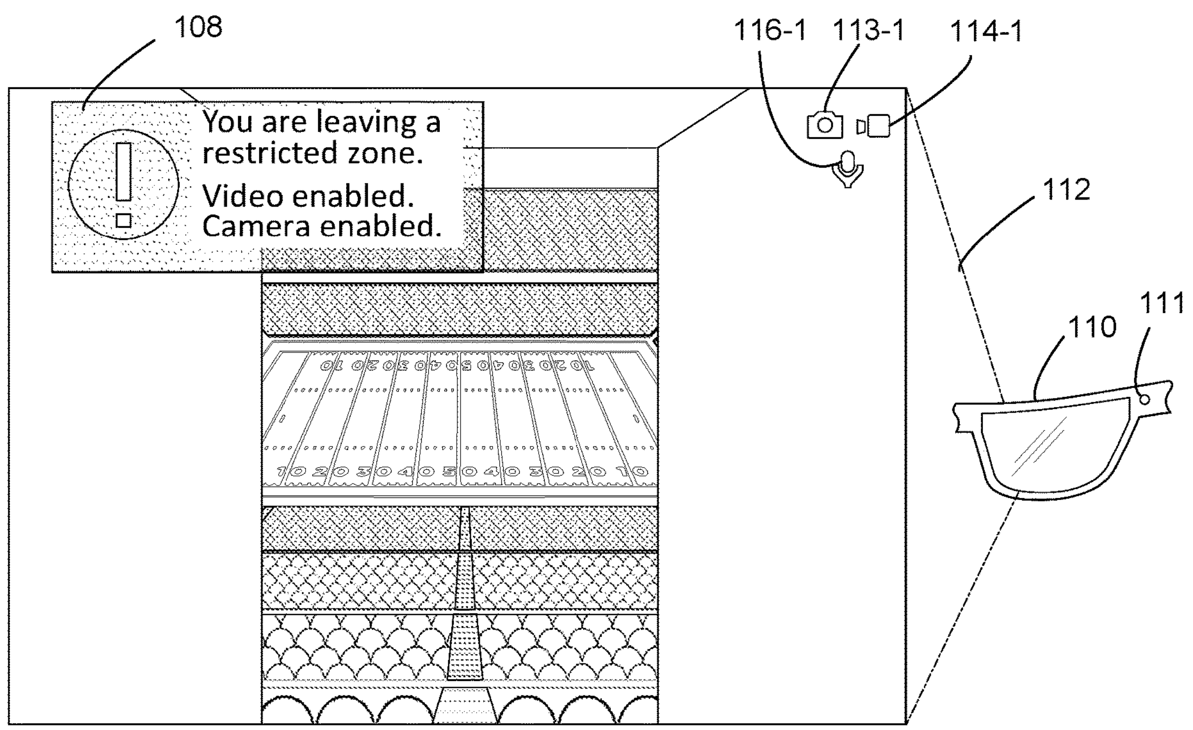

FIG. 2H illustrates the user 115's field of view while wearing the head-wearable device 110 and leaving the first and second virtual restricted-use zones 205 and 206. The system 100, upon determining that the head-wearable device 110 is outside of the first and second virtual restricted-use zones 206, is configured to reenable the user 115's ability to capture image data and/or video data (represented by camera icon 113-1 and a video icon 114-1). In addition, in some embodiments, the system 100 presents the visual cue notification 108 to the user 115, via the display 130 of the head-wearable device 110 (or other communicatively coupled device), when the user 115 leaves each virtual restricted-use zone. The visual cue notification 108 informs the user 115 they have left a respective virtual restricted-use zone and the features that have been reenabled. For example, as shown in FIG. 2H, the visual cue notification 108 includes a message notifying the user that the camera and video capabilities of an imaging device 111 are enabled. In other words, because the user 115 is no longer in the enforcement zone, the user 115 is free to use the imaging device 111 on the head-wearable device 110 in addition to imaging devices on other communicatively coupled devices.

Figure 3A:
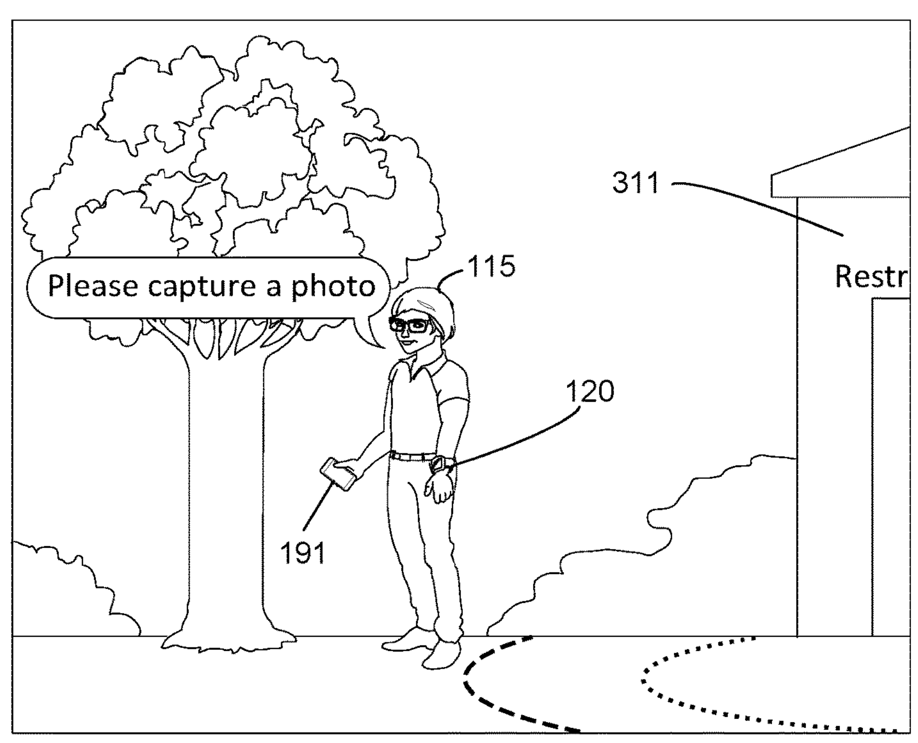
FIGS. 3A-3K illustrate a system for enforcing virtual restricted-use zones for imaging devices communicatively coupled with a head-wearable device based on the presence of one or more restricted-use zone visual cues, in accordance with some embodiments.

FIGS. 3A-3K illustrate a system for enforcing virtual restricted-use zones for imaging devices communicatively coupled with a head-wearable device 110 based on the presence of one or more restricted-use zone visual cues, in accordance with some embodiments. FIG. 3A illustrates the head-wearable device 110 receiving a user input configured to initiate the imaging device 111 communicatively coupled with the head-wearable device 110 to capture image data using the imaging device. In particular, the user 115 is outside of a virtual restricted-use zone, and verbally requests (e.g., a user input) the head-wearable device 110 to capture image data. Responsive to the user 115's request to capture image data, the head-wearable device 110 captures image data of the user 115's field of view 112 as described below in reference to FIG. 3B. In other words, the head-wearable device 110 is able to capture image data, responsive to the user 115's request, because it is not determined to be within a virtual restricted-use zone associate with enforcement zone, and, as such, no restrictions are placed on the use of an imaging device 111 communicatively coupled to the head-wearable device 110.

Figure 3B:
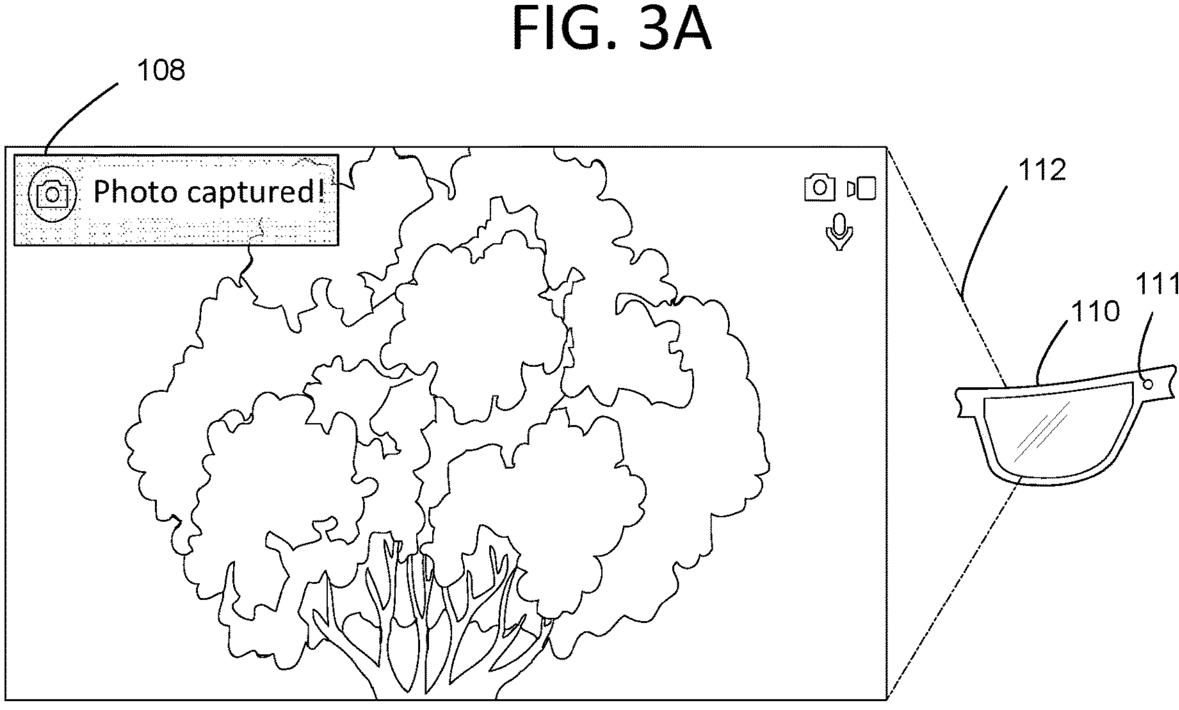

FIG. 3B illustrates the user 115's field of view when the head-wearable device 110 captures image data in response to the user 115's image data capture request. In some embodiments, after (or in conjunction with) capturing image data of the user's field of view 112, the head-wearable device 110 presents a visual cue notification 108 to the user 115 informing the user 115 that image data is captured.

Figures 3C, 3D:
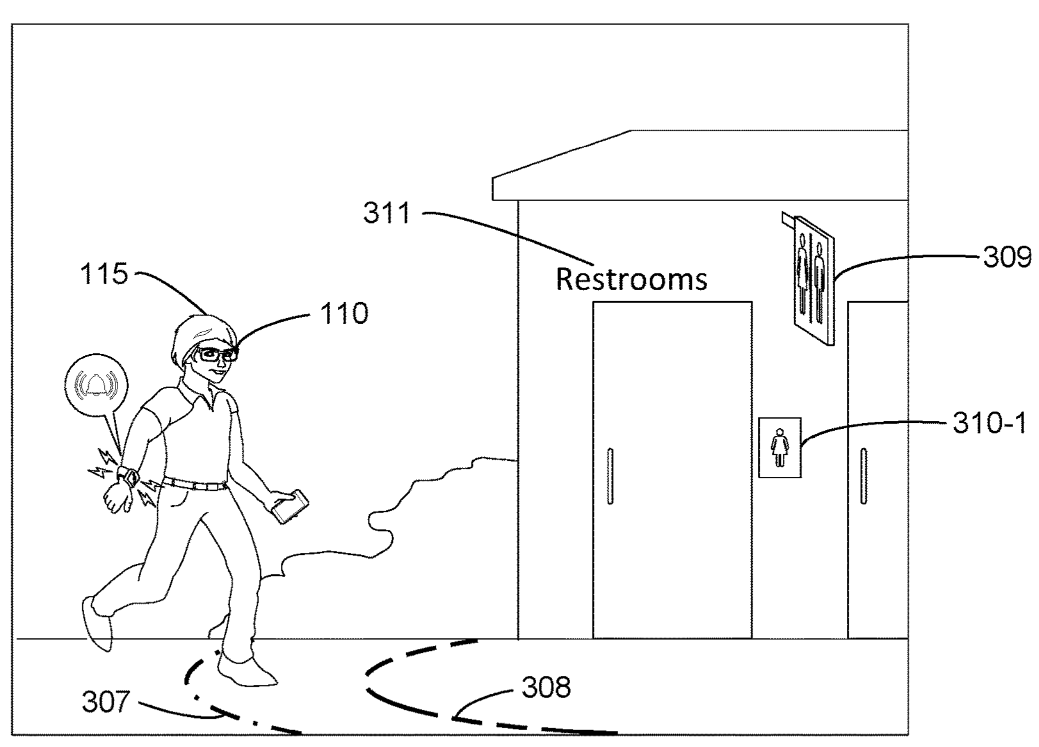

Turning to FIG. 3C, the user 115 wearing the head-wearable device 110 walks towards restroom 311. In some embodiments, the system 100 determines the presence of one or more virtual restricted-use zones based on restricted-use zone visual cues. For example, the system can process image data captured by the head-wearable device 110 to determine the presence of one or more restroom signs 309, 310, and 311 (examples of restricted-use zone visual cues), and identify one or more associated virtual restricted-use zones (e.g., a first virtual restricted-use zone 307 and a second virtual restricted-use zone 308). In FIGS. 3C-3J, the first virtual restricted-use zone 307 is a warning zone and the second virtual restricted-use zone 308 is an enforcement zone, as described above in reference to FIGS. 1A-2H. Additionally, as described above in reference to FIGS. 1A-2H, the system 100 can provide one or more notifications to the user 115 when a repetitive virtual restricted-use zone is entered or left.

In some embodiments, a virtual restricted-use zone identified based on image data is defined as a warning zone or an enforcement zone based on a predetermined distance at which the processed image data is recognized as a restricted-use zone visual cue. For example, a virtual restricted-use zone can be defined as a warning zone in accordance with a determination that the presence of an associated restricted-use zone visual cue (e.g., restroom sign 311) is at least a predetermined distance (e.g., 1 meter, 1.5 meters, 2 meters, etc.) from the imaging device 111. Similarly, a virtual restricted-use zone can be defined as an enforcement zone in accordance with a determination that the presence of an associated restricted-use zone visual cue (e.g., restroom sign 311) within the predetermined distance (e.g., 1 meter, 1.5 meters, 2 meters, etc.) from the imaging device 111. In some embodiments, the predetermined distance is based on administrator and/or user setting. Alternatively, in some embodiments, the predetermined distance is based on capabilities of the imaging device 111 (e.g., maximum image resolution, such as 1080p or greater).

FIG. 3D illustrates the user 115's field of view while wearing the head-wearable device 110 and entering the first virtual restricted-use zone 307. The system 100, upon determining, based on processed image data, that the head-wearable device 110 is within the first virtual restricted-use zone 307 (a warning zone), is configured to present to the user 115, via the head-wearable device 110, a visual cue notification 108 that informs the user 115 that he has entered into the first virtual restricted-use zone 307. In particular, the visual cue notification 108 informs the user 115 that they are approaching an enforcement zone (e.g., the second virtual restricted-use zone 308). In some embodiments, the visual cue notification 108 informs the user 115 that there is some threshold distance (e.g., 2 meters, 1 meter, etc.) before they reach the restricted region. For example, the visual cue notification 108 can notify the user 115 that he is two meters away from a restroom and that an imaging device 111 of the head-wearable device will be disabled when the user 115 is within one meter of the restroom. As described above in reference to FIGS. 1A-2H, while the user 115 is in the warning zone, the imaging device 111 and microphone communicatively coupled with the head-wearable device 110 are still enabled (as shown via the camera icon 113-1, video icon 114-1, and microphone icon 116-1).

Figure 3E:
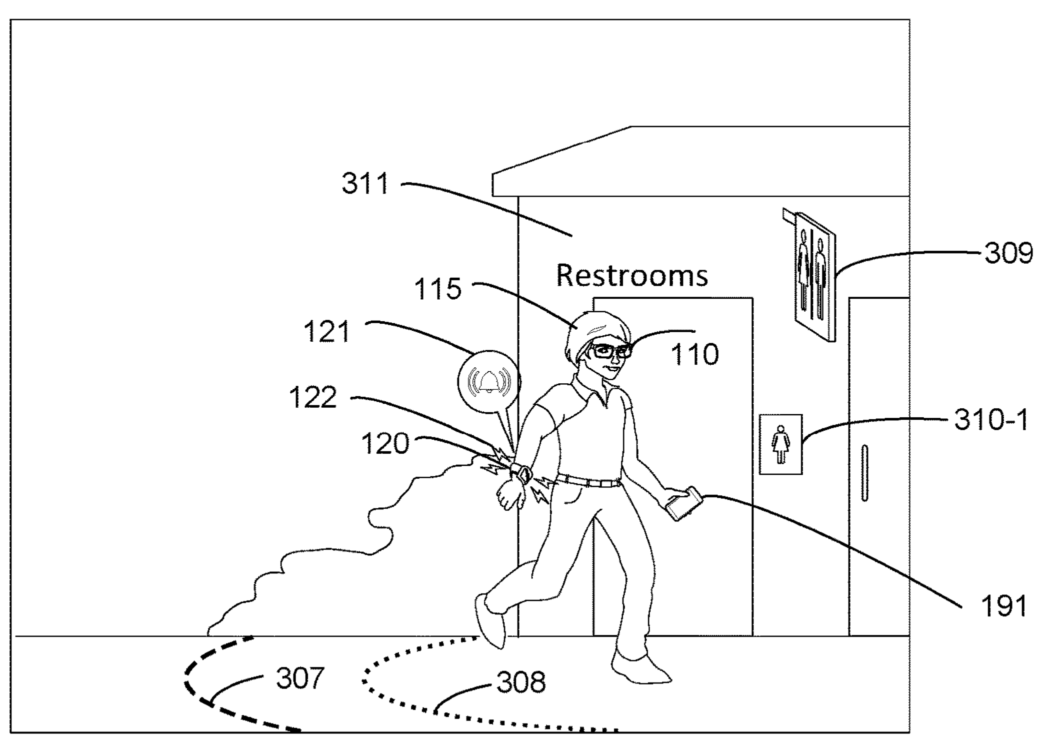

In FIG. 3E, the user 115 wearing the head-wearable device 110 walks closer to restroom 311. In some embodiments, the system 100 determines that the user 115 enters the second virtual restricted-use zone 308 based on restricted-use zone visual cues. In particular, the system 100 processes image data captured by the head-wearable device 110 to determine the user 115's proximity or location with respect to the identified virtual restricted-use zones based on the detected restricted-use zone visual cues. For example, in FIG. 3E, the system 100 determines that the head-wearable device 110 worn by the user 115 is within the second virtual restricted-use zone 308 based on bathroom signs 309, 310-1 and/or 311. For example, the system 100 can detect a change in the size the bathroom sign 309 to determine that the user 115 is closer to the restroom. Alternatively, in some embodiments, the system 100 can detect changes in image resolutions to determine that the user 115 is closer to the restroom (e.g., bathroom sign 310-1 becomes clearer such that the system 100 can differentiate from the women's restroom 310-1 and the men's restroom 310-2).

Figure 3F:
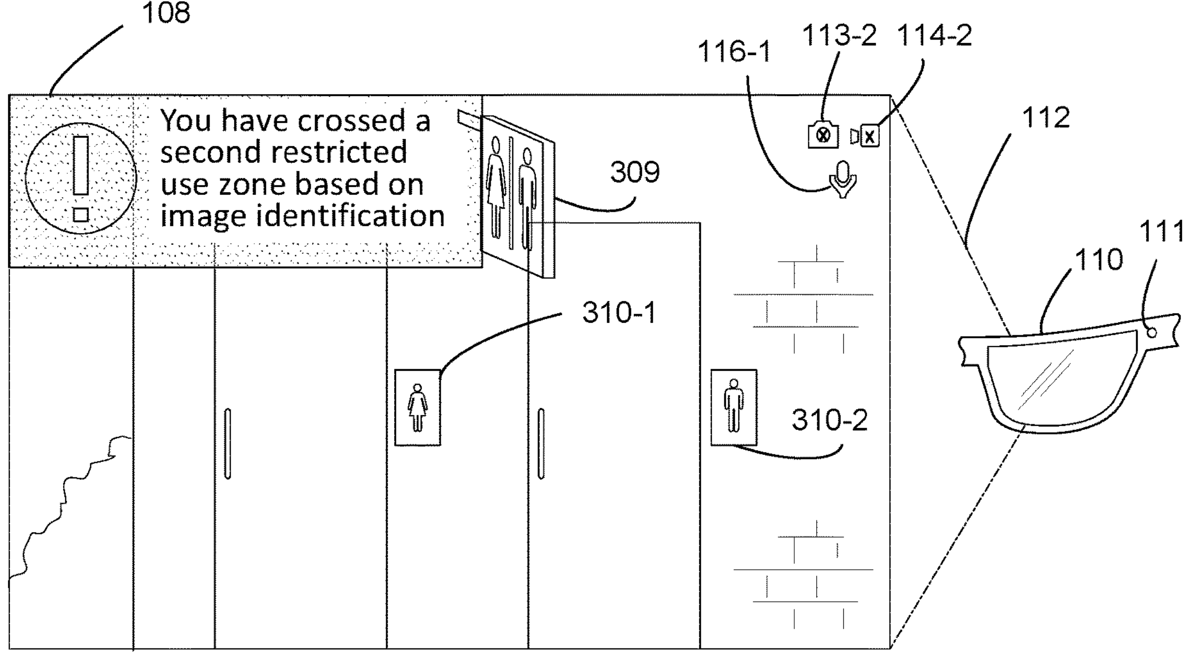

FIG. 3F illustrates the user 115's field of view 112 while wearing the head-wearable device 110 and entering the second virtual restricted-use zone 308. The system 100, upon determining, based on processed image data, that the head-wearable device 110 is within the second virtual restricted-use zone 308 (an enforcement zone), is configured to present to the user 115, via the head-wearable device 110, a visual cue notification 108 that informs the user 115 that he has entered into the second virtual restricted-use zone 308. In particular, the visual cue notification 108 informs the user 115 that they are in a restricted-use zone and that one or more capabilities of the head-wearable device 110 are disabled. Additionally, as described above in reference to FIGS. 1A-2H, while the user 115 is in the enforcement zone, the imaging device 111 and/or microphone communicatively coupled with the head-wearable device 110 are disabled (as shown via a crossed-out camera icon 113-2 and a crossed-out video icon 114-2).

In a scenario where the user 115 is passing by a restroom, the user 115 will be warned about the restroom, but the imaging device 111 would not be shut down unless the user 115 tries to enter the restroom. For example, the system 100 may not disable an imaging device 111 and/or a microphone communicatively coupled with a head-wearable device 110 unless an image including a specific identifier is detected (such as bathroom signs 310-1 and 310-2, which are typically directly on or adjacent to the restroom door and typically present immediately before the user 115 enters the restroom).

Figure 3G:
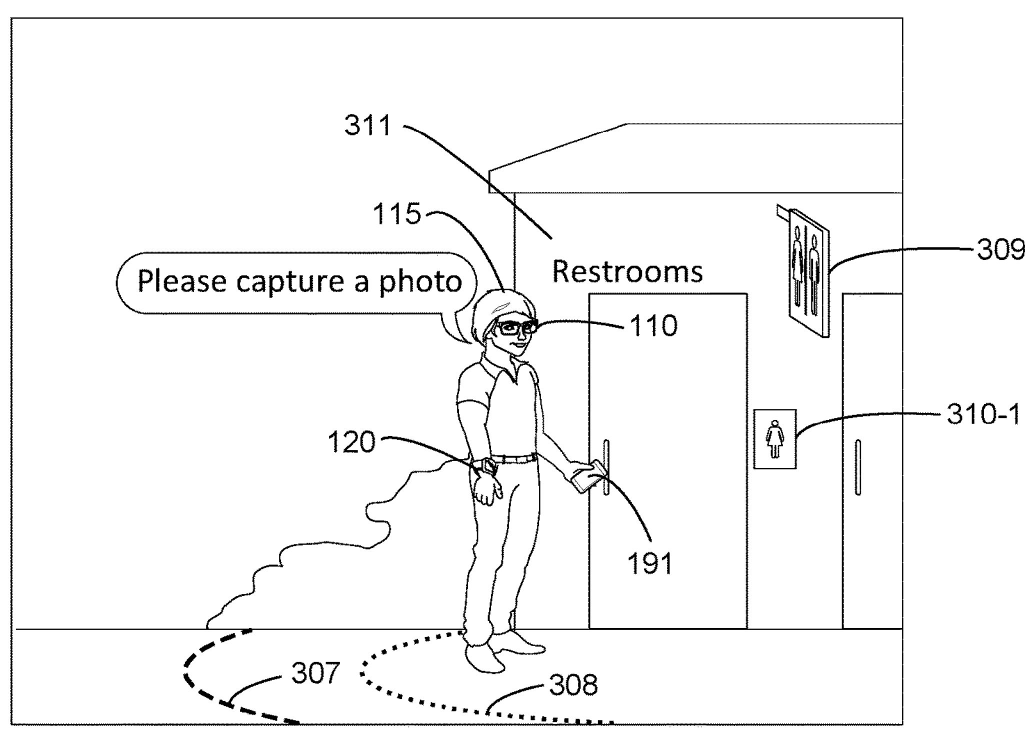
Figure 3H:
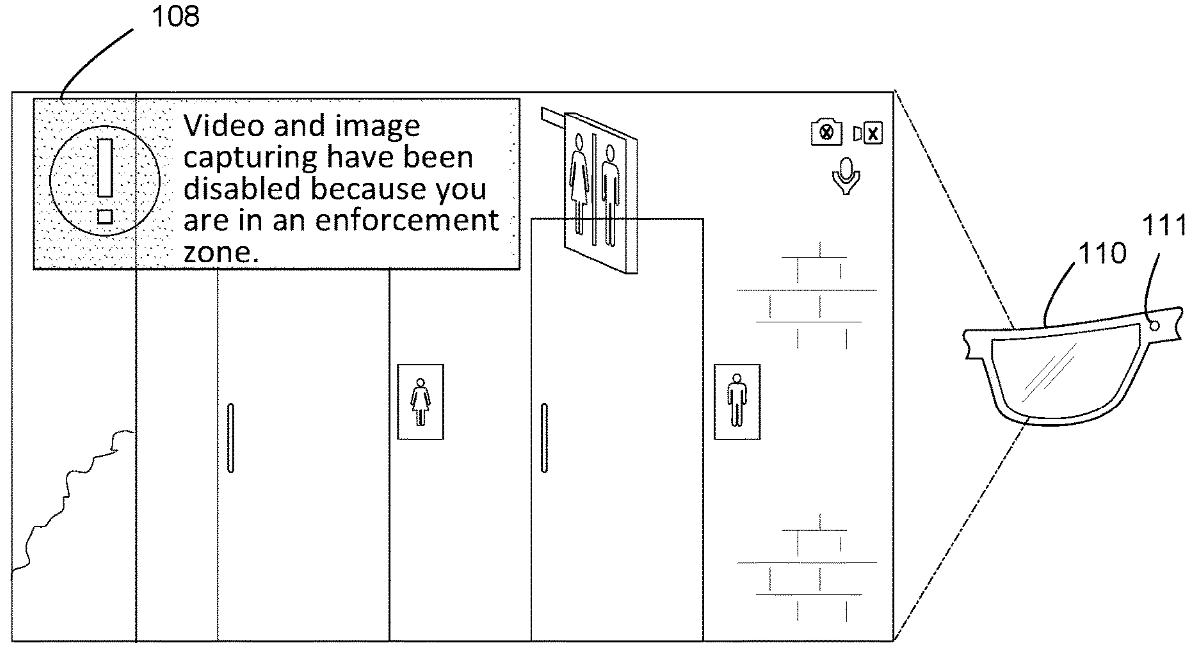

FIGS. 3G and 3H illustrate the user attempting to capture image data while within the second virtual restricted-use zone 308. As described above in reference to FIGS. 1G-1I, 2E and 2F, while the user is in an enforcement zone that restricts the user 115 of an imaging device 111 and/or microphone, the user 115 may not be able to capture image data and/or audio data. In some embodiments, the system 100 presents to the user 115 a notification (e.g., visual cue notification 108) that informs them of the restriction and the denied request to capture image data and/or audio data.

Figure 3I:
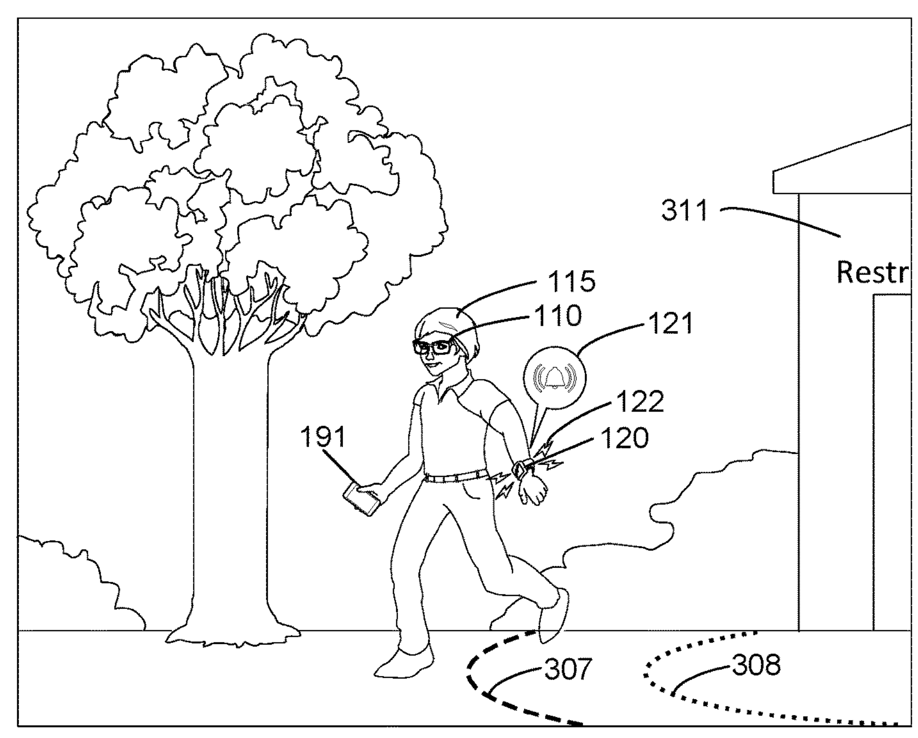
Figure 3J:
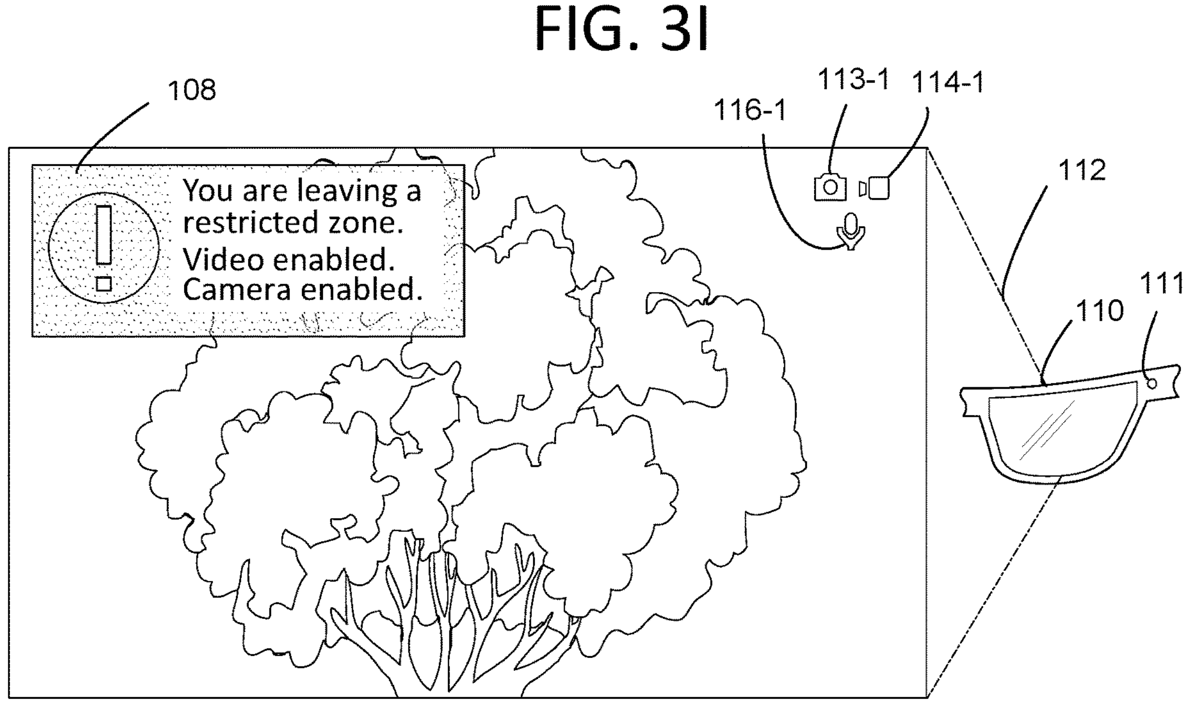

Turning to FIGS. 3I and 3J, the user 115 is shown leaving the restroom 311 (and the first and second virtual restricted-use zones 307 and 308) and the imaging device 111 and/or microphone of the head-wearable device 110 being reenabled. As described above in reference to FIGS. 2G and 2H, when the user 115 leaves each of the virtual restricted-use zones, the system 100 notifies the user 115 via a haptic cue notification 122, an audio cue notification 121, and/or a visual cue notification 108 each time they leave a respective virtual restricted-use zone. Additionally, in some embodiments, the system 100 notifies the user 115 of the devices and/or device capabilities that have been reenabled (as indicated by displayed camera icon 113-1, video icon 114-1, and microphone icon 116-1).

Figure 3K:
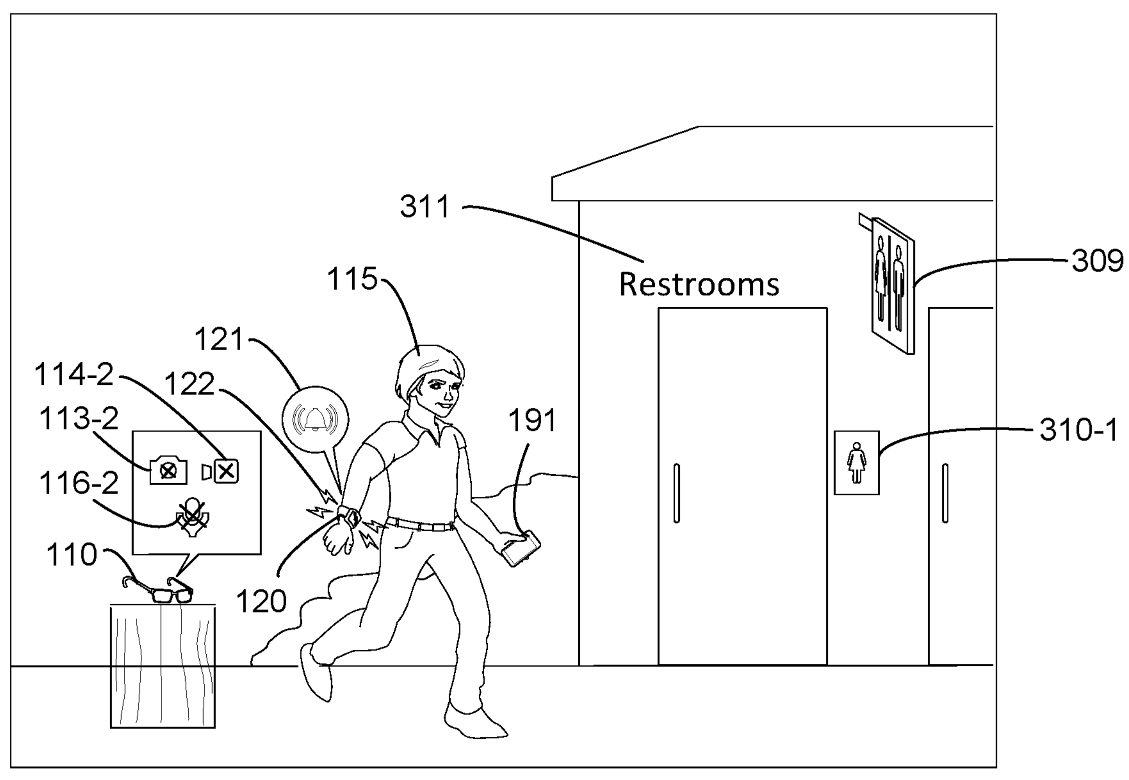

FIG. 3K illustrates an additional use restriction of the head-wearable device 110, in accordance with some embodiments. In some embodiments, in accordance with a determination by the system 100 that the head-wearable device is no longer worn by the user 115, an imaging device 111 and/or a microphone of the head-wearable device 111 are disabled. For example, in FIG. 3K, the user 115 places the head-wearable device 110 on a surface and walks away, and the system 100, when the head-wearable device 110 is placed on the surface, disables the imaging device 111 and microphone of the head-wearable device 110 (indicated by crossed-out camera icon 113-2, crossed-out video icon 114-2, and crossed-out microphone icon 116-2). In some embodiments, the system 100 uses device positional data (e.g., obtained by one or more IMUs or other sensors of the head-wearable device 110) to determine if the head-wearable device 110 is on the head of the user 115 or not.

In some embodiments, the system 100 presents a notification (e.g., a haptic cue notification 122, audio cue notification 121, and/or visual cue notification 108) to the user 115 informing them that an imaging device 111 and/or microphone of the head-wearable device 110 have been disabled and/or that the head-wearable device 110 is no longer worn by the user and/or was left behind. This additional feature is configured to prevent the head-wearable device 110 from using battery power while not in use. Further, by disabling the imaging device 111 and/or microphone of the head-wearable device 110 when not worn by the user 115 or when the head-wearable device 110 is placed at certain locations (e.g., outside the bathroom, gym, beach, etc.), the system 100 prevents the head-wearable device 110 from capturing image data and/or audio data of unsuspecting or unwilling bystanders.

FIGS. 4A-4F illustrate user-defined virtual restricted-use zones, in accordance with some embodiments. In some embodiments, the user 115 (and/or an administrator or property owner) can generate a virtual restricted-use zone via the head-wearable device 110, the wrist-wearable device 120, and/or an intermediary device. In particular, the user 115 can define a restricted-use zone marker that is used to generate a virtual restricted-use zone. In some embodiments, the user 115 can use any restricted-use zone geofence marker, restricted-use zone visual cue, and/or restricted-use zone audio cue to generate a virtual restricted-use zone.

Figure 4A:
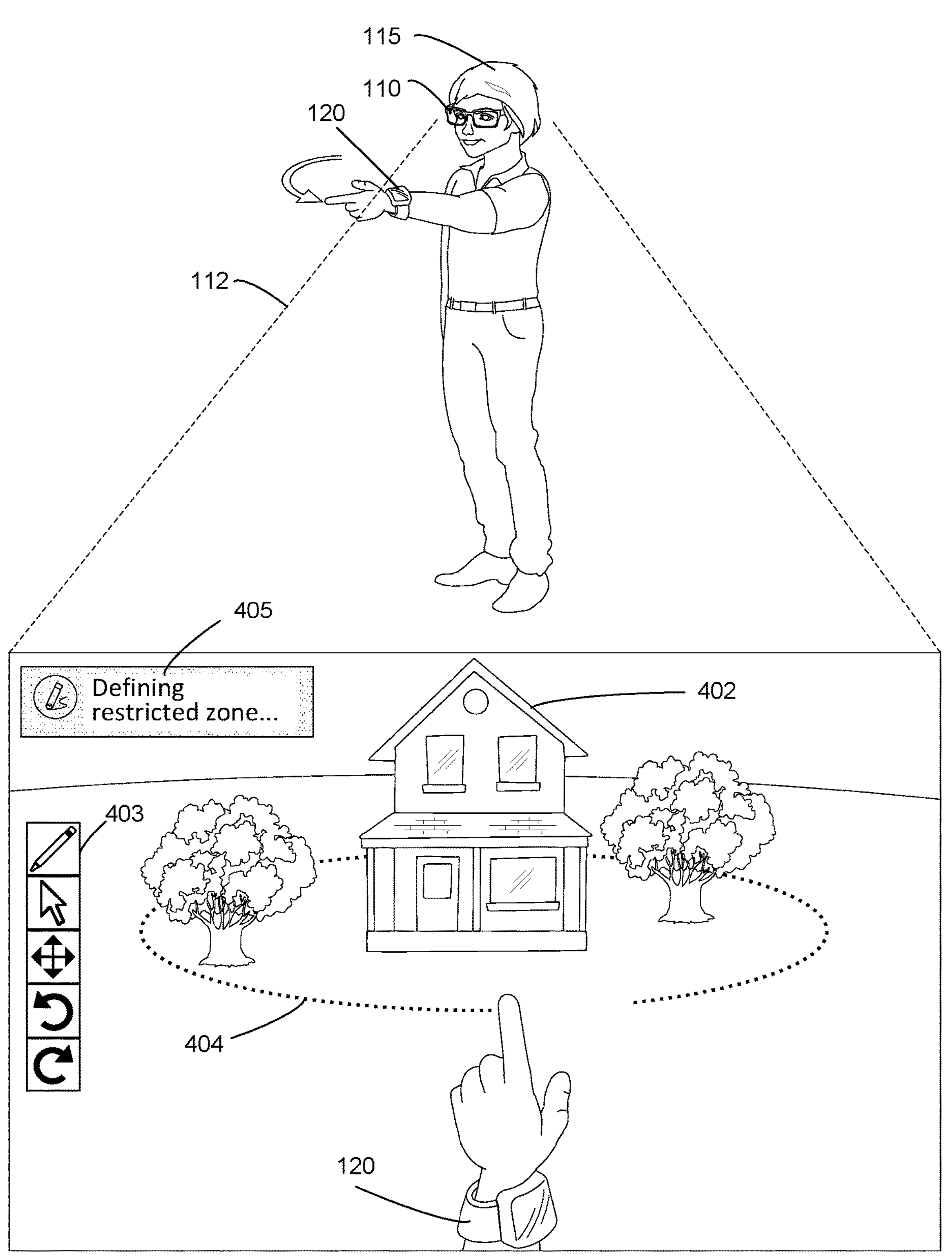
FIGS. 4A-4F illustrate user-defined virtual restricted-use zones, in accordance with some embodiments.

Turning to FIG. 4A, the user 115 wearing the head-wearable device 110 and wrist-wearable device 120 defines a restricted-use zone geofence marker 404. In some embodiments, the user 115 enters a virtual restricted-use zone editor mode to edit and/or generate virtual restricted-use zones. In some embodiments, the user 115 can enter the virtual restricted-use zone editor mode via the head-wearable device 110, the wrist-wearable device 120, and/or an intermediary device (e.g., a smartphone 191). When the user 115 enters the virtual restricted-use zone editor mode, the user 115 is presented, via the head-wearable device 110 (or other communicatively coupled device with a display), a representation of the user 115's field of view 112 that can be used to define one or more restricted-use zone markers. The virtual restricted-use zone editor mode can include one or more tools 403 for defining the restricted-use zone markers, such as a free hand or pencil tool, a pointer tool, a panning tool, and rotation tools. In some embodiments, the user 115 is presented with an editing notification 405 that includes information on the tools and actions available to the user 115.

As further shown in FIG. 4A, the user 115 defines the restricted-use zone geofence marker 404 via a user input. In some embodiments, the user input is detected by the wrist-wearable device 120, the head-wearable device 110, and/or an intermediary device. For example, the imaging device 111 of the head-wearable device can detect the user's hand motion and determine a user input based on the detected hand motions. Alternatively, the wrist-wearable device 120 can detect hand gestures, in-air gestures (gesture performed in free space), and/or or surface gestures (e.g., gestures performed on a display, or any surface) using one or more sensors, such as an EMG sensor and/or an IMU, and determine a user input based on the detected gestures. User inputs can include voice commands, touch commands, hand gestures, etc. In particular, in FIG. 4A, the user 115 uses their hand to draw a circle (e.g., the restricted-use zone geofence marker 404) around a house 402. In some embodiments, the restricted-use zone geofence marker 404 is visible by the user 115 while in the virtual restricted-use zone editor mode. This allows the user to modify restricted-use zone geofence markers as needed. After providing user input that defines the restricted-use zone geofence marker 404, the user 115 can further specify whether the virtual restricted-use zone (based on the defined restricted-use zone geofence marker 404) is a warning zone or an enforcement zone.

Alternatively, in some embodiments, the user 115 can select one or more detected objects to define a restricted-use zone visual cue. For example, in some embodiments, image data captured by the head-wearable device 110 is processed to detect the presence of the house 402. The house 402 when detected, becomes selectable in the virtual restricted-use zone editor mode and, when selected, can be used to define the virtual restricted-use zone. In some embodiments, the restricted-use zone visual cue is visible by the user 115 whenever in the virtual restricted-use zone editor mode. This allows the user to modify restricted-use zone visual cue as needed. In some embodiments, after selecting an object to define a restricted-use zone visual cue, the user can specify the type of zone (warning zone or enforcement zone) as well as a size of the zone (e.g., a 1 meter radius, a 3 meter radius, a 5 meter radius, etc.).

The virtual restricted-use zone editor mode allows the user 115 to dynamically create and/or update a virtual restricted-use zone. For example, the user 115 could identify their bedroom or home as an enforcement zone that disables an imaging device 111 coupled to the head-wearable device 110.

Figure 4B:
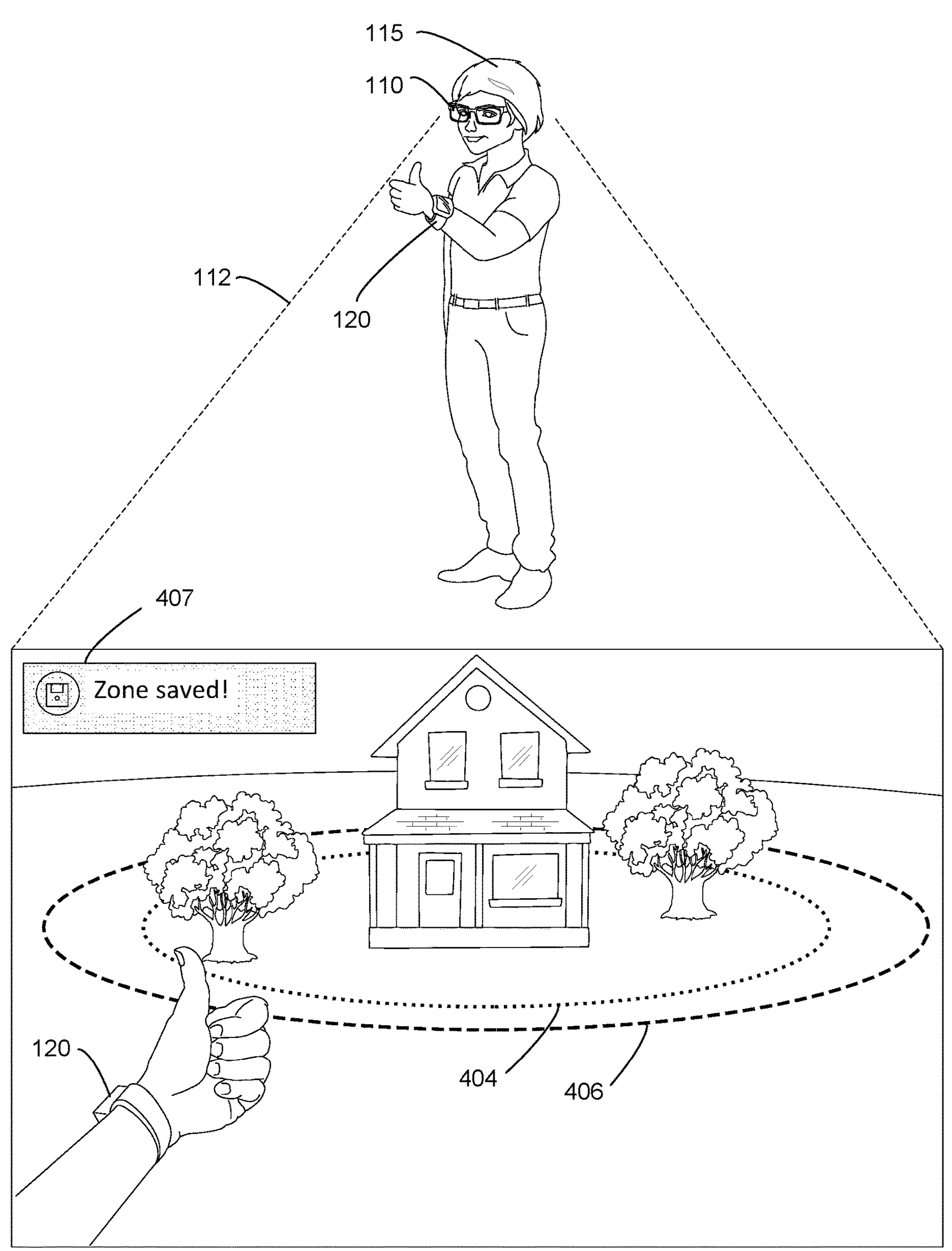

FIG. 4B illustrates confirmation or approval of user-defined virtual restricted-use zones. In some embodiments, the user 115 can provide an additional user input to accept and save a user-defined restricted-use zone visual cue and/or user-defined restricted-use zone geofence markers. For example, in FIG. 4B, the user 115 provides a thumbs up gesture to confirm and save the user-defined virtual restricted-use zones (e.g., a first virtual restricted-use zone 404 and a second virtual restricted-use zone 406). The user input can be provided via the head-wearable device 110, wrist-wearable device 120, and/or an intermediary device. In some embodiments, the head-wearable device 110, wrist-wearable device 120, and/or intermediary device presents to the user 115 a notification of the saved user-defined virtual restricted-use zones (e.g., saved notification 407).

Figure 4C:
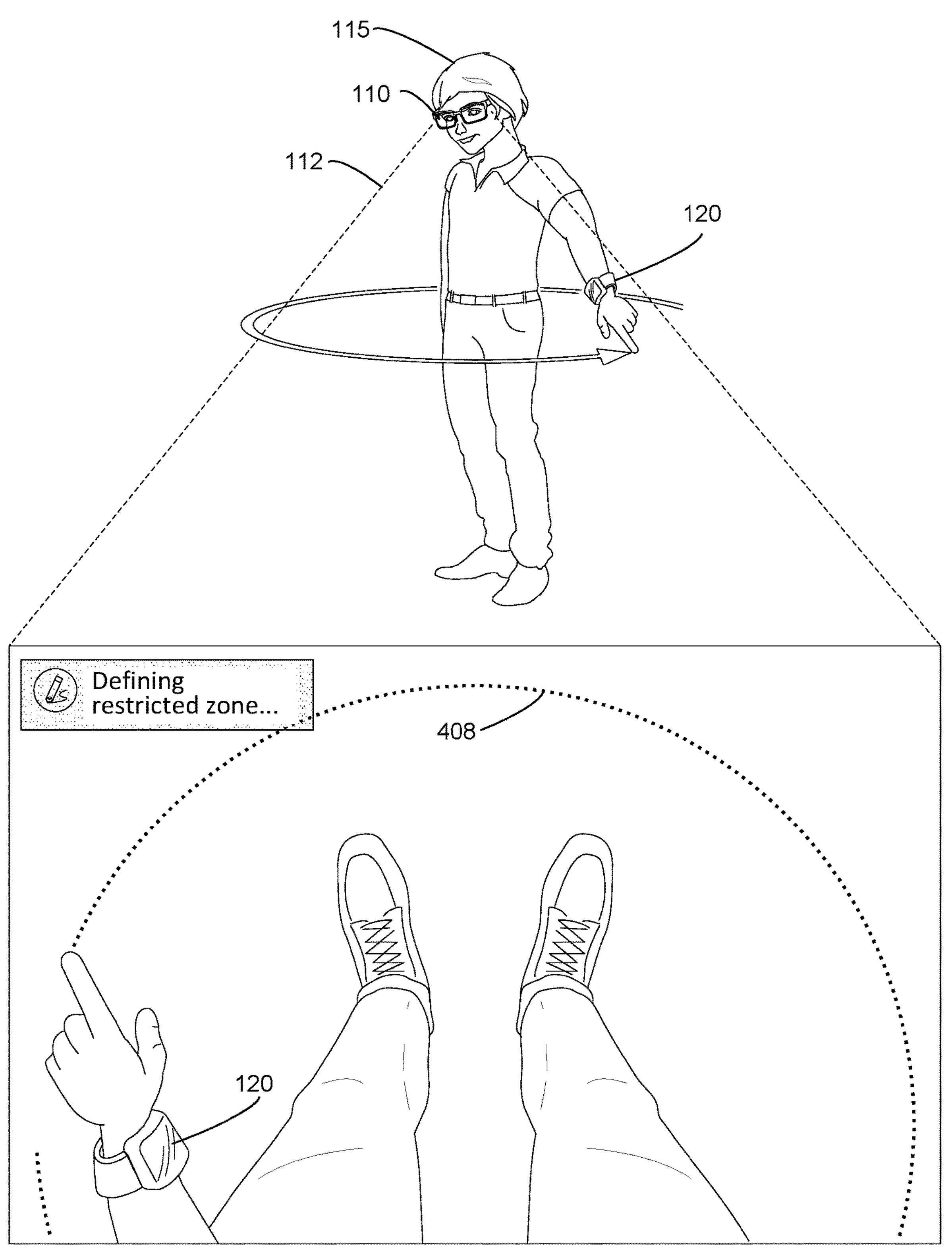

FIG. 4C illustrates a user defining a personal virtual restricted-use zone. The user 115 can define a personal virtual restricted-use zone 408 to protect their privacy. More specifically, the user 115 can define a restricted-use zone geofence marker that prevents others from capturing image data and/or audio data of the user 115 when someone gets too close to the user 115 (e.g., closer than 1 meter from the user). In some embodiments, the user 115 can grant different privileges and permissions to others. For example, the user 115 can identify friends and family members that would be allowed to capture image data and/or video data while within the user 115's personal virtual restricted-use zone 408. Similarly, the user 115 can configure the personal virtual restricted-use zone 408 such that they are still able to capture image data and/or video data within the personal virtual restricted-use zone 408. In other words, the personal virtual restricted-use zone 408 allows the user 115 to protect his privacy by not allowing others to record or capture images of the user 115, but still allowing the user 115 to utilize the imaging device 111 and microphone communicatively coupled with the head-wearable device 110 or other device. The user 115 can also be presented with another notification informing him of the current operation being performed in the virtual restricted-use zone editor mode.

Figure 4D:
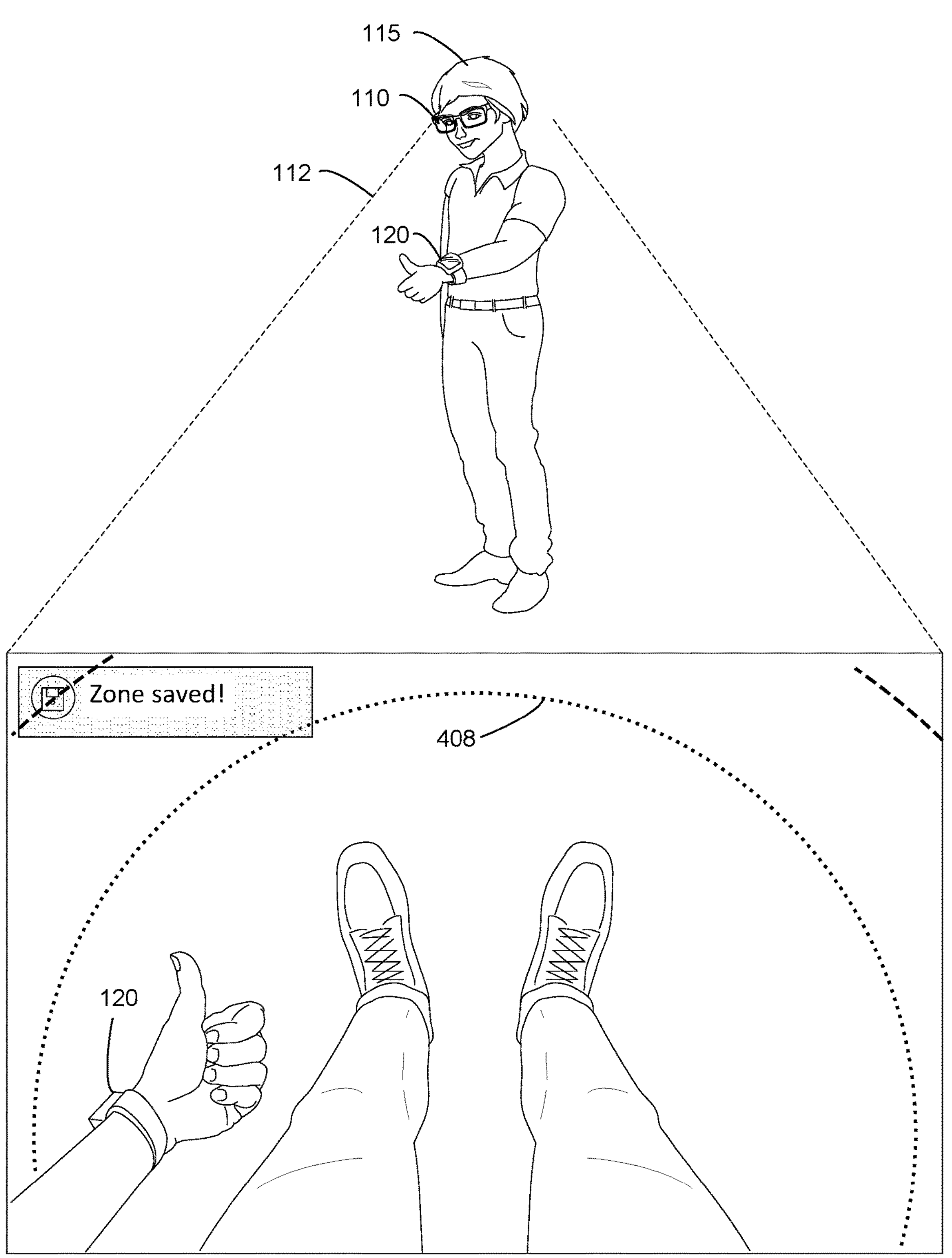

FIG. 4D illustrates confirmation or approval of a personal virtual restricted-use zone. The user 115 is able to confirm or approve the personal virtual restricted-use zone using one or more user inputs as described above in reference to FIG. 4B.

Figure 4E:
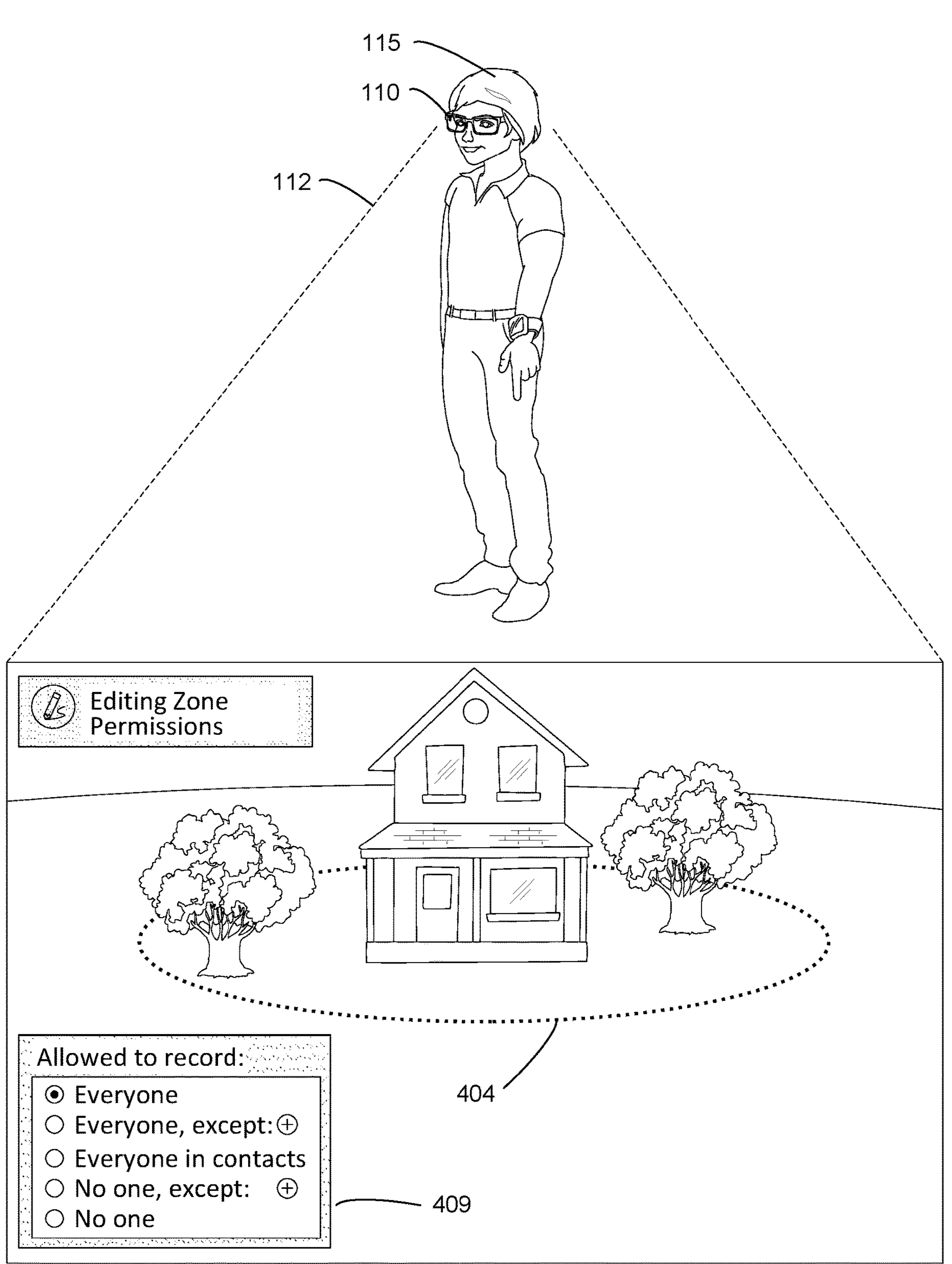

FIG. 4E illustrates adjustments to one or more virtual restricted-use zones via the virtual restricted-use zone editor mode, in accordance with some embodiments. In particular, FIG. 4E illustrates adjustments to image data and/or audio capture permissions within a virtual restricted-use zone. In some embodiments, a permission user interface 409 is presented to the user 115 via a display of the head-wearable device 110, wrist-wearable device 120, and/or intermediary device. The permission user interface 409 includes one or more user interface elements that allow the user 115 to specify privileges and permissions for others. More specifically, the user 115 can identify who can and cannot capture image data and/or audio data within a virtual restricted-use zone. For example, as shown in FIG. 4E, in some embodiments, the user 115 can select to allow everyone, everyone except one or more individuals, everyone in their contacts, no one except one or more individuals or no one. In some embodiments, the user 115 can specify user accounts, phone numbers, and/or user devices that are allowed to capture image data and/or audio data within a virtual restricted-use zone. The user 115 can edit the permissions of a virtual restricted-use zone and/or granted to other users within a respective virtual restricted-use zone at any time.

The above examples are non-exhaustive. In some embodiments, the user 115 can define additional restrictions on the use of imaging devices 111 and/or microphones. For example, the user 115 can define a predetermined time period in which image data and/or audio data cannot be captured. For example, the user 115 can define a virtual restricted-use zone to disable imaging devices 111 and/or microphones during work hours or school hours. In another example, an administrator can restrict the use of an imaging device 111 and/or microphone during working hours and/or allow the others to use their imaging device 111 and/or microphone for a predetermined period of time (e.g., temporarily unauthorized users are able to capture image data and/or audio data). In some embodiments, use of the imaging device 111 and/or microphone can be restricted strictly based on the time of day, or other criteria, configurable by a user 115 or administrator controlling a network where the user is attempting to initiate the artificial-reality activity In some embodiments, an administrator can establish a registration system that allows users to authorize and/or registered their devices such that they can operate inside of a virtual restricted-use zone. Unauthorized and/or unregistered devices will not be able to capture image data and/or audio data (e.g., as the imaging device 111 and/or microphone would be disabled). For example, the military could draw a virtual restricted-use zone where only registered military devices can record image, video, and/or audio data and any other imaging devices on unregistered devices inside of the virtual restricted-use zone will be disabled. In some embodiments, a user 115 can also develop a registration system for their user-defined virtual restricted-use zone. For example, if the user 115 does not want to allow an imaging device 111 to capture image data in his house for unregistered devices, the user 115 can set up a virtual restricted-use zone around their house prohibiting the use of imaging devices, and requests that others register their devices to receive permission to use their imaging devices 111 in the house.

Figure 4F:
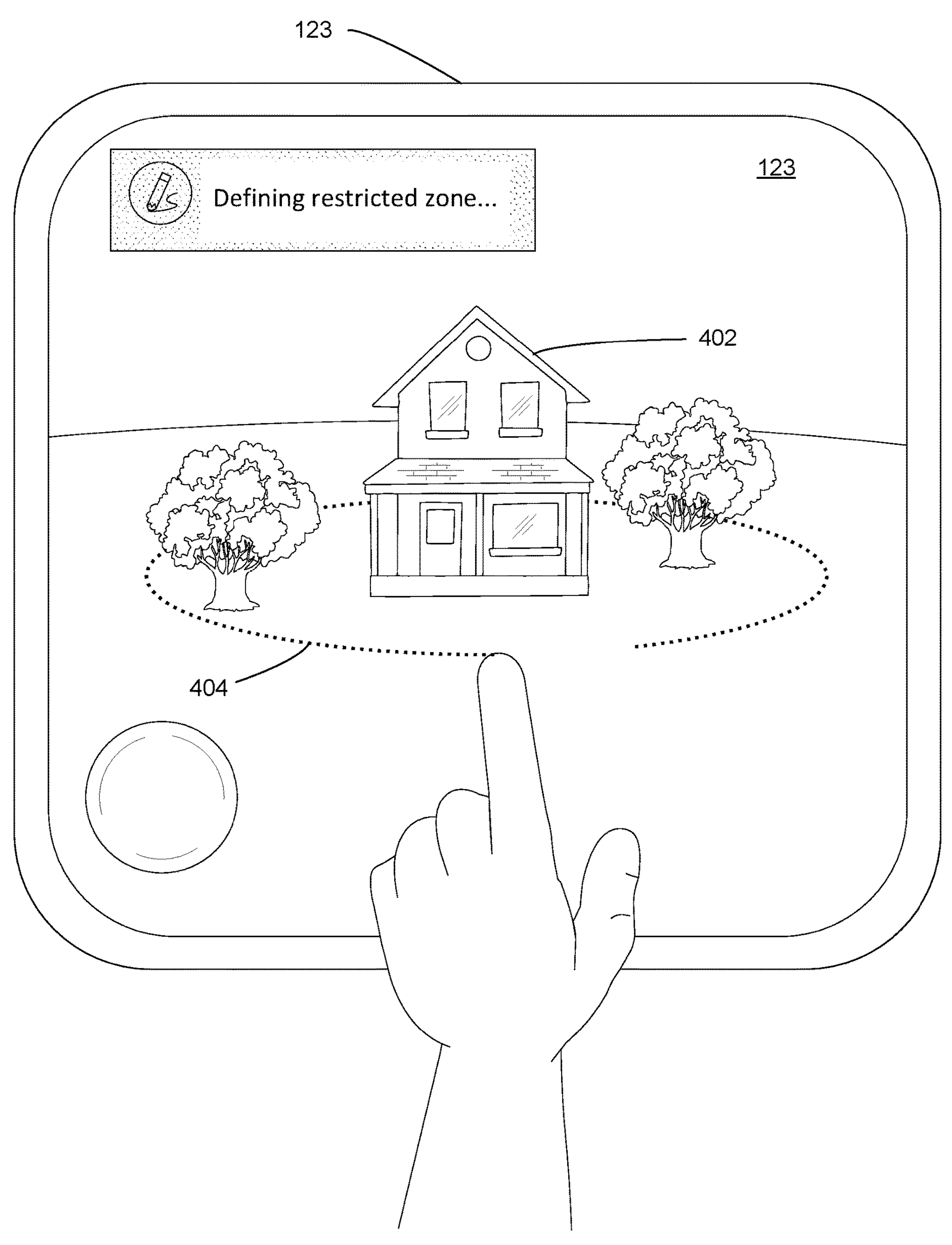

FIG. 4F illustrates a user-defined virtual restricted-use zone generated at the wrist-wearable device 120. In particular, the user 115 uses the wrist-wearable device 120 to define a restricted-use zone geofence marker 404 using the virtual restricted-use zone editor mode described above in reference to FIGS. 4A-4E. In some embodiments, the wrist-wearable device 120 can accept a user input via the touch screen display 124. For example, as shown in FIG. 4F, the user 115 uses his finger to draw the restricted-use zone geofence marker 404 around the house 402 on the touch screen display 124 of the wrist-wearable device. Although FIGS. 4A-4F show the user 115 defining a restricted-use zone marker using the field of view of the user 115, in some embodiments, the user 115 is presented with an overhead map (e.g., a top view map) that the user 115 can use to define the restricted-use zone markers. Additionally, in some embodiments, the user 115 is also able to define, via the virtual restricted-use zone editor mode, restricted-use zone audio cues for generating a virtual restricted-use zone.

Although the above examples describe user-defined restricted-use zone geofence marker and user-defined restricted-use zone visual cues, one of ordinary skill in the art, upon reading this disclosure, will appreciate that administrators, property owners, event organizers, etc. can generate any number of virtual restricted-use zones. For example, different virtual restricted-use zones can be created for large arenas, public restrooms, private art galleries, museums, private parties, fitting rooms, movie theater, military bases, etc.

Figure 5A:
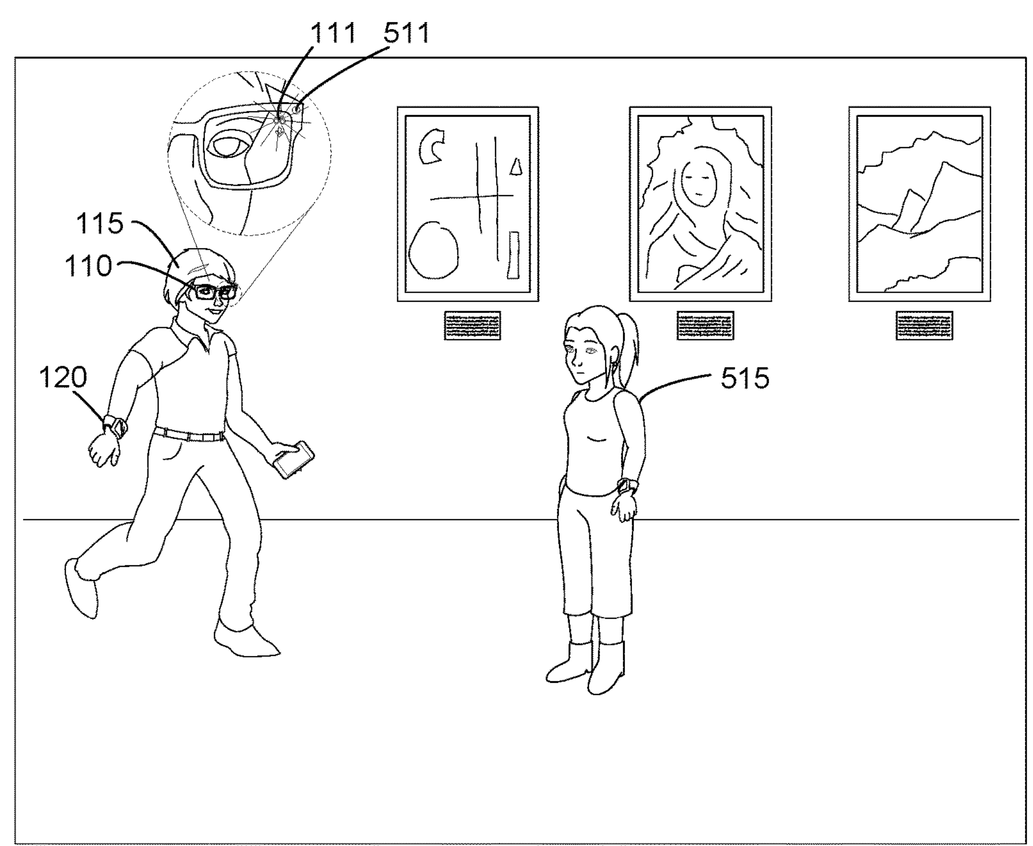
FIGS. 5A-5D illustrate a system for enforcing virtual restricted-use zones for imaging devices communicatively coupled with a head-wearable device based on the presence of one or more restricted-use zone audio cues, in accordance with some embodiments.

FIGS. 5A-5D illustrate a system for enforcing virtual restricted-use zones for imaging devices communicatively coupled with a head-wearable device 110 based on the presence of one or more restricted-use zone audio cues, in accordance with some embodiments. In FIG. 5A, a user 115 wearing a head-wearable device 110 and a wrist-wearable device 120 is in a museum viewing one or more museum exhibits. While in the museum, the user 115 is capturing image data using an imaging device 111 of the head-wearable device 110. In some embodiments, while the user 115 is capturing image data and/or audio data via the head-wearable device 110, the head-wearable device 110 presents an LED indicator 511. The LED indicator 511 allows others around the user 115 to know that the user 115 is actively recording audio and/or video data. In some embodiments, the LED indicator 511 is presented with an icon or symbol (e.g., glasses icon and/or microphone icon) so that others around the user 115 know what data is being captured (e.g., image data and/or audio data). For example, in FIG. 5A, a second user 515 is walking towards the user 115 and can see the LED indicator 511 illuminated by the user 115's head-wearable device 110. In some sediments, the LED indicator 511 is configured to illuminate (or blink) in different colors and/or predetermined patterns (e.g., every one second, in morse code, three blinks per second, etc.).

Figure 5B:
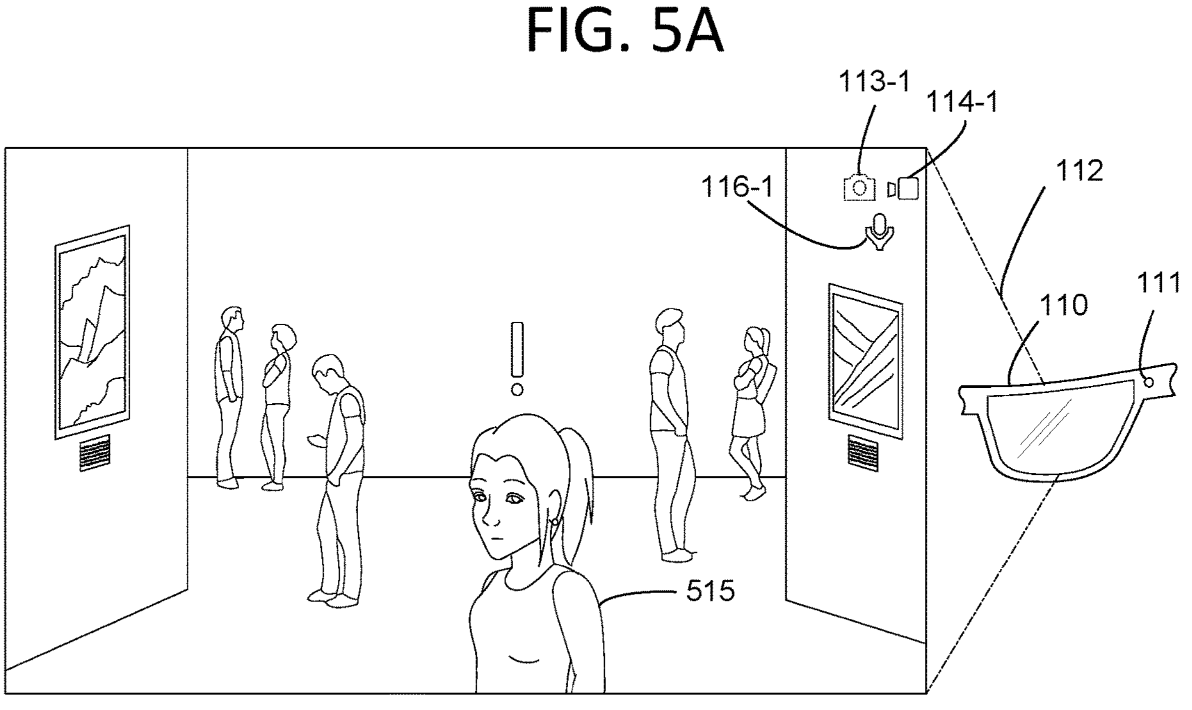

FIG. 5B illustrates the user 115's field of view 112 while wearing the head-wearable device 110 and walking through the museum. The user 115 is actively capturing image data and audio data via the imaging device 111 and the microphone of the head-wearable device 110. The user 115 can view the status or activity of the imaging device 111 and/or microphone via the presented camera icon 113-1, video icon 114-1, and microphone icon 116-1. For example, the video icon 114-1 and the microphone icon 116-1 can be illuminated in particular color (e.g., red, yellow, blue, etc.) to indicate that they are active and capturing image data and audio data, the camera icon 113-1 can be transparent and/or shown with broken lines to indicate that it is inactive. Further, in FIG. 1B, the user 115 notices that the second user 515 is looking at him.

Figure 5C:
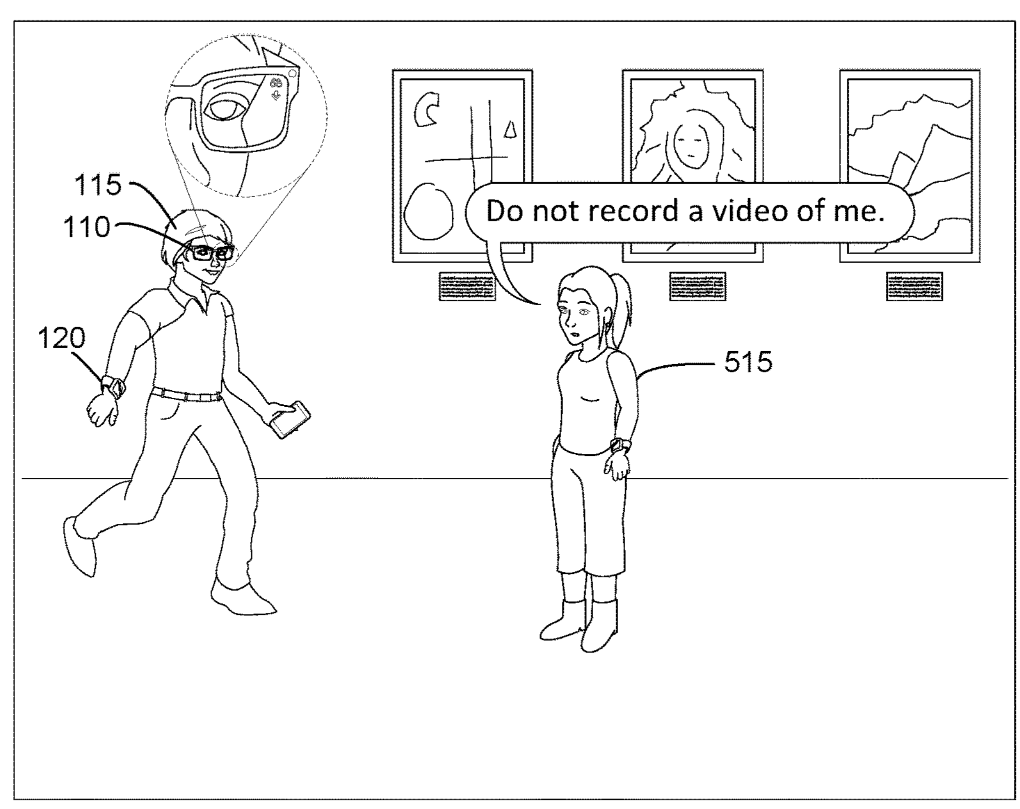

In FIG. 5C, the second user 515 asks the user 115 not to record her. The requests not to be recorded can, in some embodiments, be a restricted-use zone audio cue. The system 100 processes the audio data to determine the presence of a restricted-use zone audio cue, and, responsive to a determination that a restricted-use zone audio cue is present, cause an imaging device 111 and/or microphone of the head-wearable device 110, wrist-wearable device 120, and/or an intermediary device to be disabled. The restricted-use zone audio cues can include any combination of words that explicitly or implicitly indicate that capturing image data and/or audio data is not allowed. The restricted-use zone audio cues can include environmental sounds can be inferred to indicate that capturing image data and/or audio data is not allowed, such as shower sounds, flushing toilets, intimate communications, etc. In some embodiments, machine learning models are applied to determine whether a restricted-use zone audio cue is present in the audio data. The machine learning models can use contextual (e.g., situational information) and/or semantic information to determine whether capturing image data and/or audio data is not allowed. For example, while the user 115 is at a movie theater or play, a prerecorded announcement can indicate that photos are not allowed, the system 100 can process the prerecorded announcement to determine the presence of a restricted-use zone audio cue, and, in accordance with a determination that a restricted-use zone audio cue is present disable an imaging device 111 and/or microphone of the head-wearable device 110, wrist-wearable device 120, and/or intermediary device.

In some embodiments, the contextual and/or semantic information can be used to determine to forgo disabling the image device even though a restricted-use zone audio cue is detected. For example, if the user 115 is interacting with an aggressive driver in a car accident or interacting with an officer in a matter of public interest, restricted-use zone audio cues may not result in an imaging device being disabled. In this way, the user 115 is protected from potentially confrontational interactions. In some embodiments, the user 115 can manually reenable the imaging device after an imaging device is disabled.

After the imaging device 111 and/or microphone of the head-wearable device 110, wrist-wearable device 120, and/or an intermediary device are disabled, the corresponding indicator in no longer illuminated. For example, as shown in FIG. 5C, when the imaging device 111 of the head-wearable device 110 is disabled, the LED indicator 511 on the user's 115 head wearable-device 110 is de-activated and no longer is illuminated. In this way, others around the user 115 are able to see that image data and/or audio data is no longer being captured.

Figure 5D:
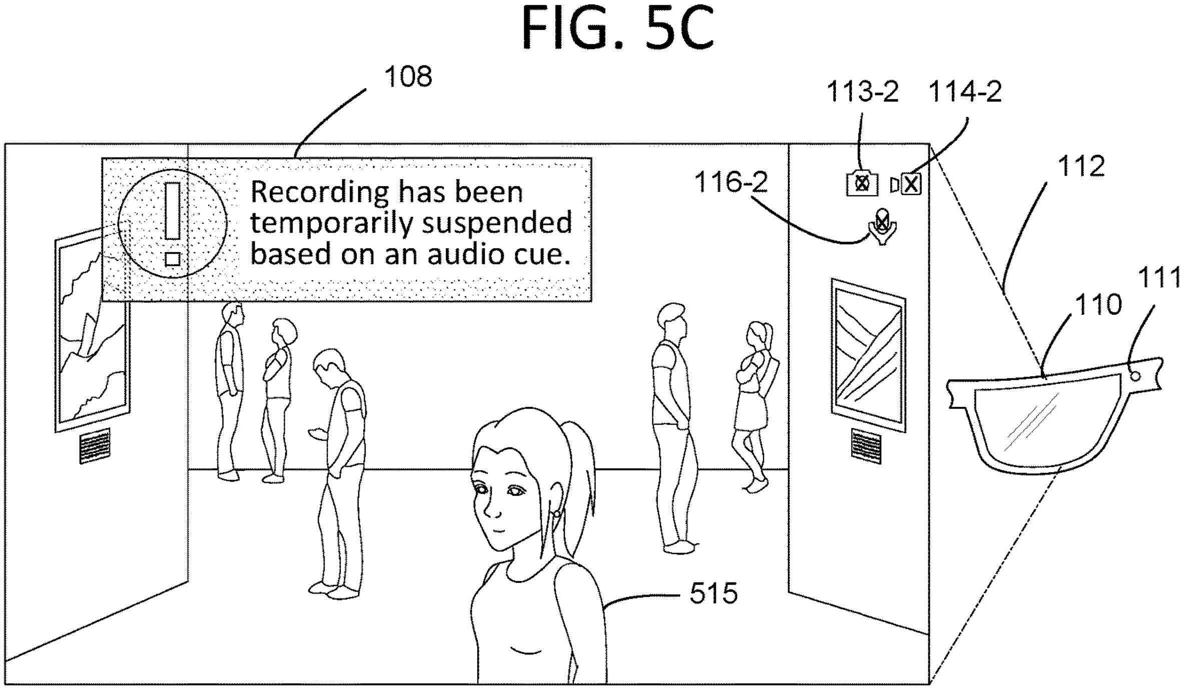

FIG. 5D illustrates the user 115's field of view 112 while wearing the head-wearable device 110 and after the system determines the presence of a restricted-use zone audio cue. The system 100, upon determining, based on processed audio data, the presence of a restricted-use zone audio cue, is configured to present to the user 115, via the head-wearable device 110, a visual cue notification 108 that informs the user 115 that image data and audio data cannot be captured at this time. In particular, the visual cue notification 108 informs the user 115 that a restricted-use zone audio cue was detected and the imaging device 111 and/or microphone of the head-wearable device 110, wrist-wearable device 120, and/or intermediary device are disabled (as shown via crossed-out camera icon 113-2, crossed-out video icon 114-2, and crossed-out microphone icon 116-2).

FIGS. 6A-6D illustrate a system for enforcing virtual restricted-use zones for remote imaging devices communicatively coupled with a head-wearable device 110, in accordance with some embodiments. In particular, FIGS. 6A-6D illustrate virtual restricted-use zones applied to a drone 606 communicatively coupled with the head-wearable device 110. The user 115 can control the drone 606 via a communicatively coupled head-wearable device 110, wrist-wearable device 120, smartphone 191, and/or another intermediary advice. The user 115 can fly his drone 606 near a virtual restricted-use zone 605 without having an imaging device 111 and/or microphone of the drone 606 disabled. When the user 115's drone 606 enters a virtual restricted-use zone 605, as shown below in reference to FIGS. 6C and 6D, the drones 606 imaging device 111 and/or microphone are disabled. In some embodiment, the virtual restricted-use zone can include a no-fly zone around a park (e.g., a National Park).

Figure 6A:
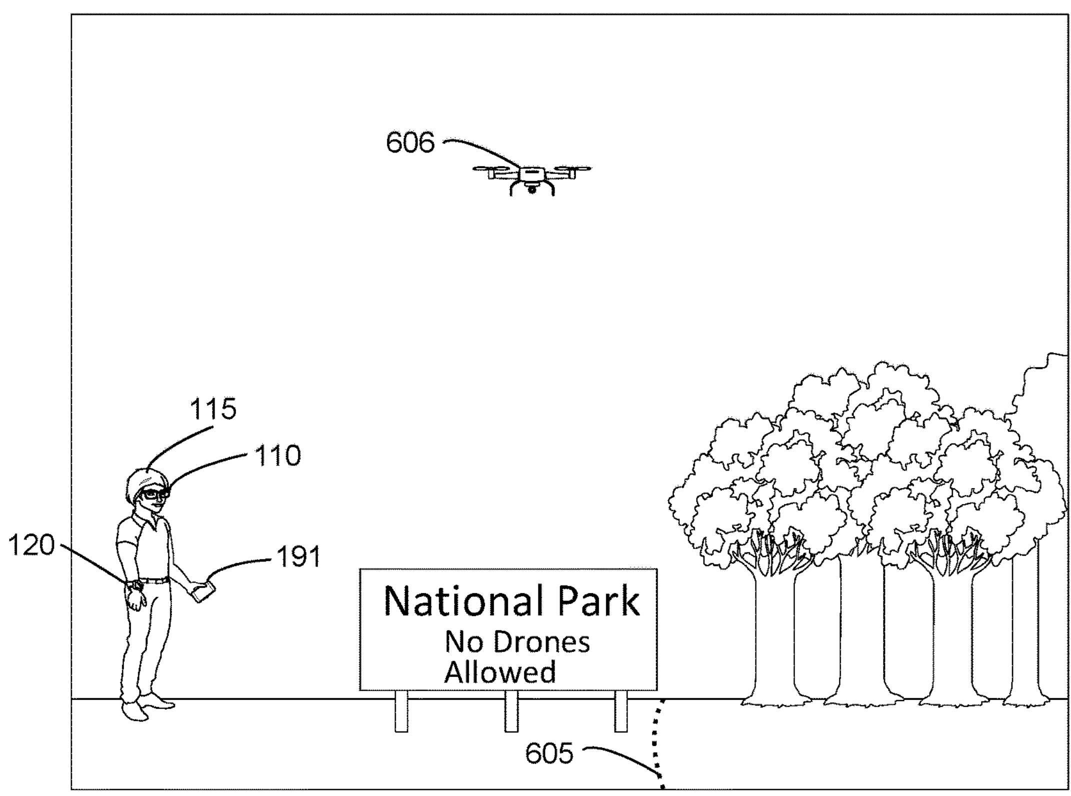
FIGS. 6A-6D illustrate a system for enforcing virtual restricted-use zones for remote imaging devices communicatively coupled with a head-wearable device, in accordance with some embodiments.
Figure 6B:
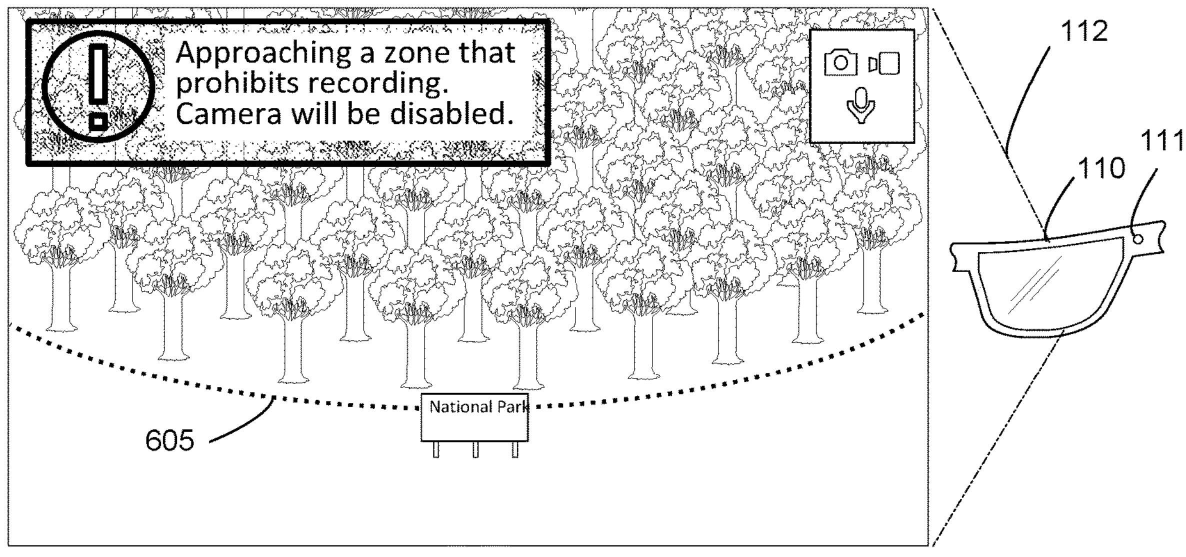

FIG. 6B illustrates a visual cue notification 108 presented to the user 115 via the display 130 of the head-wearable device 110. The visual cue notification 108 informs the user 115 they are approaching a virtual restricted-use zone and that access to image, audio, and video capturing will be disabled.

FIG. 6B illustrates the user 115's field of view while wearing the head-wearable device 110 and controlling the drone 606. The system 100, upon determining that the drone 606 communicatively coupled with the head-wearable device 110 approaches the virtual restricted-use zone 605, presents to the user 115, via the head-wearable device 110 (or other communicatively coupled device), a notice informing the user of the approaching virtual restricted-use zone 605 and the functionalities of the device that will be disabled (e.g., camera will be disabled). Additional examples of the notifications presented to the user are provided above in reference to FIGS. 1A-3K and 5A-5D.

Figure 6C:
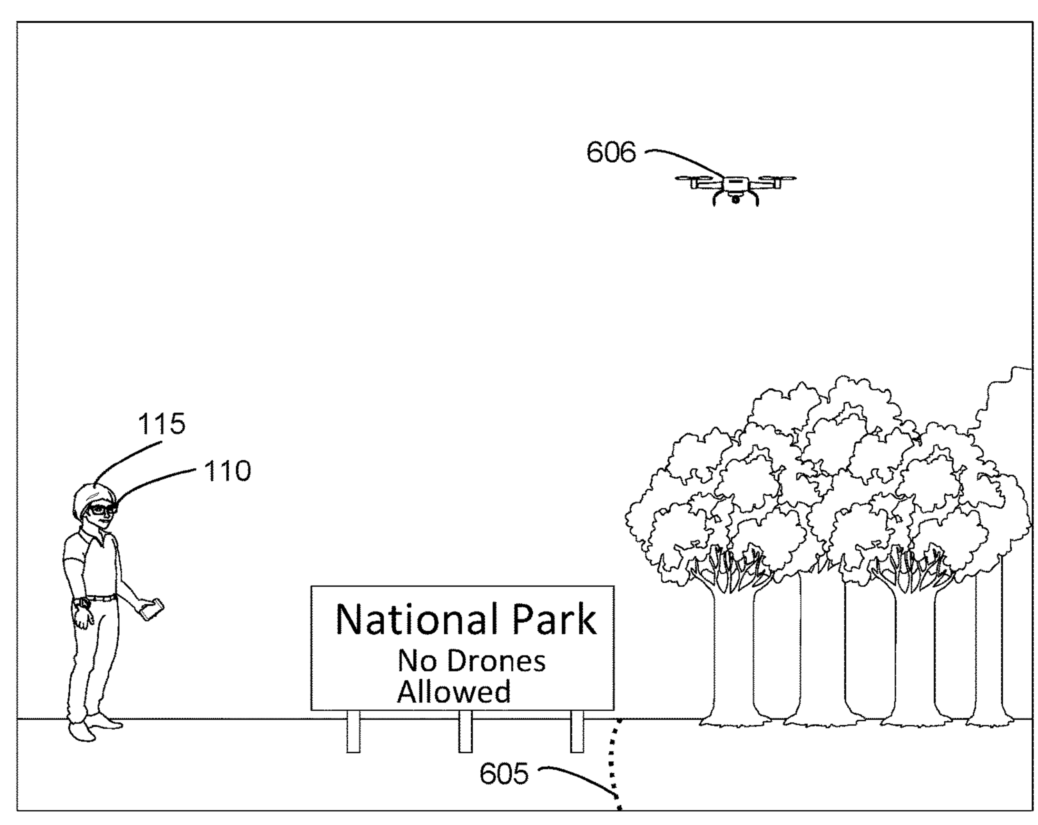
Figure 6D:
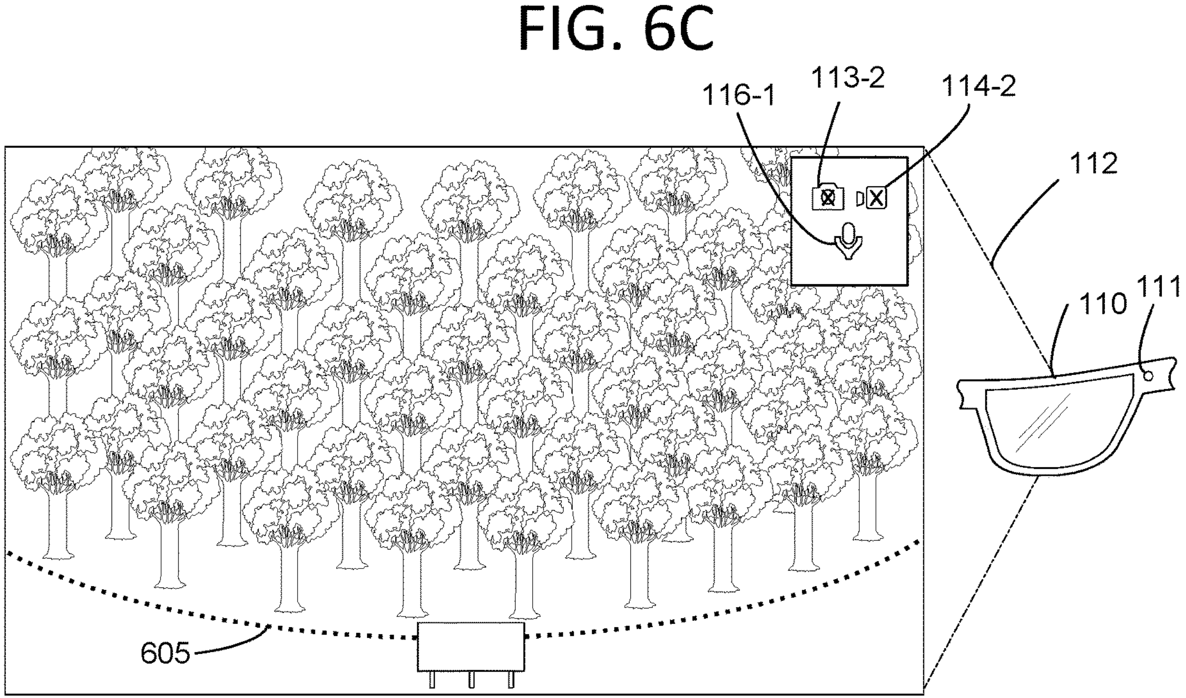

FIG. 6C illustrates the user 115's drone 606 entering the virtual restricted-use zone 605 and FIG. 6D illustrates the imaging device 111 and/or microphone of the drone 606 being disabled. In some embodiments, the head-wearable device 110 (or other communicatively coupled device) informs the user of the disabled devices (e.g., as shown by the crossed-out camera icon 113-2 and crossed-out video icon 114-2). Additional examples of the restricted-use zone are provided above in reference to FIGS. 1A-5D.

Figure 7:
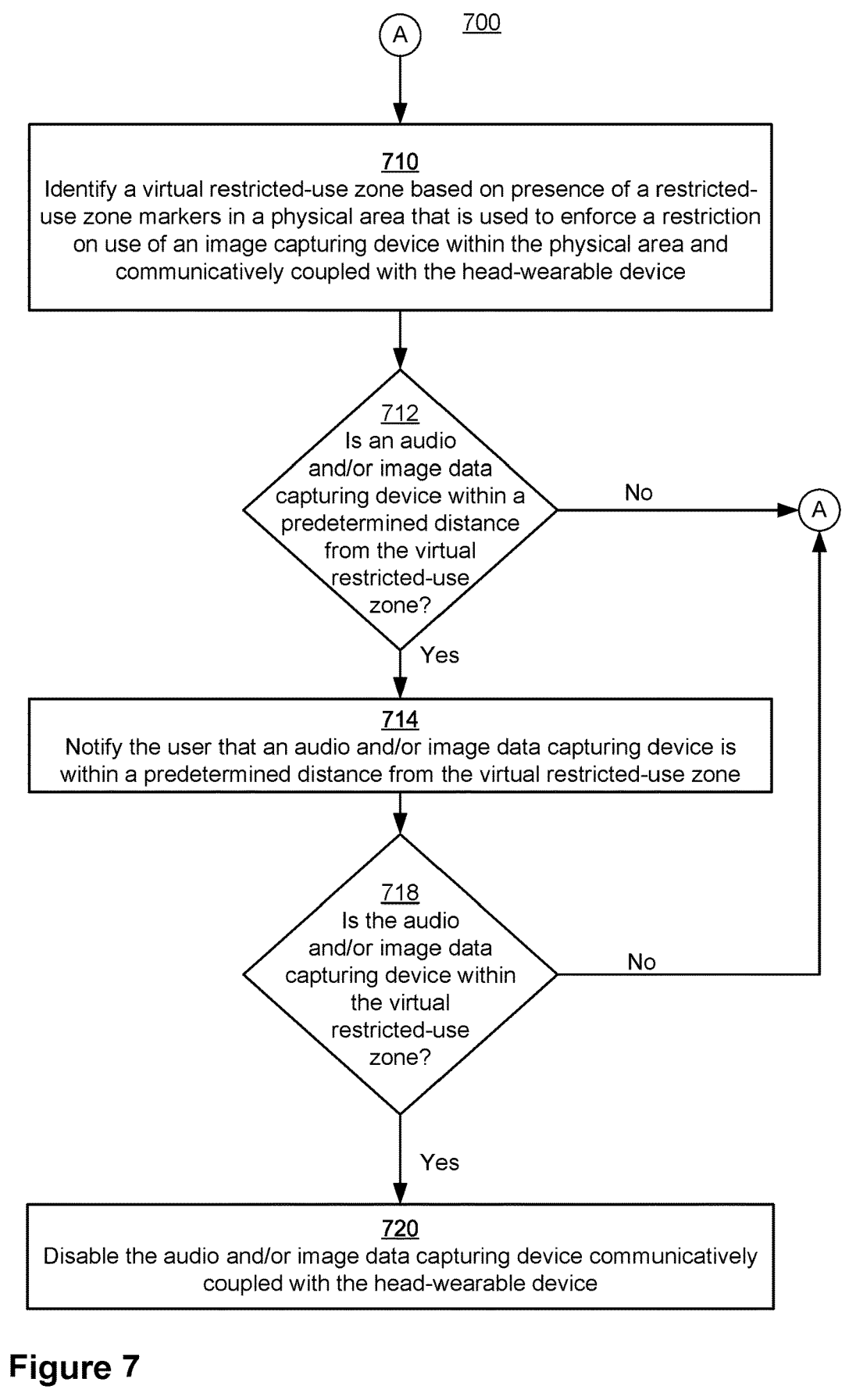

FIG. 7 illustrates a flow diagram of a method of enforcing virtual restricted-use zones for imaging devices and/or microphones communicatively coupled with a head-wearable device, in accordance with some embodiments. Operations (e.g., steps) of the method 700 can be performed by one or more processors (e.g., processor 1079 and/or 1049 of a wrist-wearable devices 120 and 1000 (FIGS. 10A-10B) and/or processors 1148A and/or 1148B of a head-wearable device 110, AR device 1100, and/or VR device 1110 (FIGS. 11A-11C)) of a system including a head-wearable device 110. In some embodiments, the head-wearable device 110 is coupled with one or more sensors (e.g., various sensors of a wrist-wearable devices 120 and 1000 and/or a head-wearable device 110, AR device 1100, and/or VR device 1110 discussed below in reference to FIGS. 10A-11C, such as a heart rate sensor, IMU, an EMG sensor, SpO2 sensor, altimeter, thermal sensor or thermal couple, ambient light sensor, ambient noise sensor), a display, a speaker, an imaging device (e.g., a camera or other imaging devices discussed below in reference to FIGS. 10A-11C), and a microphone to perform the one or more operations. At least some of the operations shown in FIG. 7 correspond to instructions stored in a computer memory or computer-readable storage medium (e.g., storage, RAM, and/or memory, FIGS. 10B and 11C). Operations of the method 700 can be performed by the head-wearable device 110 alone or in conjunction with one or more processors and/or hardware components of another device communicatively coupled to the head-wearable device 110 (e.g., a wrist-wearable device 120, a handheld intermediary processing device 1200 (FIGS. 12A and 12B), a smartphone 191, a laptop, a tablet, etc.) and/or instructions stored in memory or computer-readable medium of the other device communicatively coupled to the head-wearable device 110.

The method 700 includes identifying (710) a virtual restricted-use zone based on presence of a restricted-use zone markers in a physical area that is used to enforce a restriction on use of an image capturing device (and/or microphone) within the physical area and communicatively coupled with the head-wearable device 110. For example, as described in FIGS. 1A-3K and 5A-6D, the head-wearable device 110 can identify a second virtual restricted-use zone 104 based on the presence of a restricted-use zone geofence marker, a restricted-use zone visual cue, and a restricted-use zone audio cue.

The method 700 further includes determining (712) whether an audio data and/or image data capturing device is within a predetermined distance from the virtual restricted-use zone. For example, as described in Figure FIGS. 1A-3K and 5A-6D, the system 100 can determine whether a head-wearable device 110, wrist-wearable device 120, and/or intermediary device worn by the user 115 (and including an imaging device 111 and/or microphone) is within a predetermined distance (e.g., 0-5 meters) from the virtual restricted-use zone. A determination that the head-wearable device 110, wrist-wearable device 120, and/or intermediary device worn by the user 115 is within a predetermined distance (e.g. 0-5 meters) from the virtual restricted-use zone can be based on sensors data, audio data, and/or computer vision. In particular, sensor data, image data, and/or audio data can be used to determine the presence of one or more restricted-use zone markers in a physical area, the one or more restricted-use zone markers associated with a virtual restricted-use zone.

In accordance with a determination that a head-wearable device 110, wrist-wearable device 120, and/or intermediary device worn by the user 115 is not within a predetermined distance from the virtual restricted-use zone, ("no" at operation 712), the method 700 returns operation 710 and waits to identify a virtual restricted-use zone based on presence of a restricted-use zone markers. Alternatively, in accordance with a determination that a head-wearable device 110, wrist-wearable device 120, and/or intermediary device worn by the user 115 is within a predetermined distance from the virtual restricted-use zone, ("yes" at operation 712), the method 700 further includes notifying (714) the user 115 that an audio data and/or image data capturing device is within a predetermined distance from the virtual restricted-use zone. The user 115 can be notified via a haptic cue notification 122, audio cue notification 121, and/or visual cue notification 108 presented by the head-wearable device 110, wrist-wearable device 120, and/or intermediary device worn by the user 115. Examples of the different notifications are provided above in reference to FIGS. 1A-6D.

The method 700 further includes determining (718) whether an audio data and/or image data capturing device is within the virtual restricted-use zone. For example, as described above in reference to FIGS. 1A-3K and 5A-6D, the system 100 determine whether a head-wearable device 110, wrist-wearable device 120, and/or intermediary device worn by the user 115 is within a virtual restricted-use zone based on sensors data, audio data, and/or computer vision as described above. Additionally, the system 100 can determine, based on the sensor data of the head-wearable device 110; wrist-wearable device 120; and/or intermediary device (e.g., smartphone 191), location information of the head-wearable device 110, wrist-wearable device 120, and/or intermediary device worn by the user 115. The location information is used to determine the head-wearable device 110, wrist-wearable device 120, and/or intermediary device's relative position with respect to a restricted-use zone marker associated with the virtual restricted-use zone.

In accordance with a determination that the user is within the virtual restricted-use zone, ("yes" at operation 718), the method 700 further includes disabling (720) the audio data and/or image data capturing device communicatively coupled with the head-wearable device (and/or wrist-wearable device 120, and/or intermediary device). For example, as described in FIGS. 1C-1F, while the user 115 is inside of the second virtual restricted-use zone 104, the imaging device 111 of head-wearable device 110 is disabled and the user 115 is unable to use the camera or video function.

Returning to operation 718, in accordance with a determination that the user is not within the virtual restricted-use zone, ("no" at operation 718), the method 700 returns operation 716 and waits to identify a virtual restricted-use zone based on presence of a restricted-use zone marker.

FIGS. 8A-8C illustrates a detailed flow diagram of a method of enforcing virtual restricted-use zones for imaging devices communicatively coupled with a head-wearable device, in accordance with some embodiments. Similar to method 700 of FIG. 7, operations of the method 800 can be performed by one or more processors of a system 100 including a head-wearable device 110. At least some of the operations shown in FIG. 8 correspond to instructions stored in a computer memory or computer-readable storage medium. Operations of the method 800 can be performed by the head-wearable device 110 alone or in conjunction with one or more processors and/or hardware components of another device (e.g., a wrist-wearable device 120 and/or a handheld intermediary processing device 1200 described below in reference to FIGS. 9A-12B) communicatively coupled to the head-wearable device 110 and/or instructions stored in memory or computer-readable medium of the other device communicatively coupled to the head-wearable device 110.

Method 800 includes identifying (810), a virtual restricted-use zone based on presence of one or more restricted-use zone markers in a physical area. In some embodiments, identifying the virtual restricted-use zone includes determining, based on location information, image data, and audio data provided by a head-wearable device 110, a wrist-wearable device 120, a smartphone 191, or other intermediary device communicatively coupled to the head-wearable device, the presence of the one or more restricted-use zone markers in a physical area. Data provided by the head-wearable device 110, the wrist-wearable device 120, or other intermediary device communicatively coupled to the head-wearable device includes location information (e.g., GPS information, geofence information, etc.), visual information (e.g., image data including the user 115's field of view), audio information (audio data of the user 115's surroundings). For example, a microphone communicatively coupled to the head-wearable device 110 can receive audio data that can be analyzed to detect "stop recording me," which can be used to identify a virtual restricted-use zone. The data can be shared between devices so that that a single device does not need to process all of the data, which saves the devices power. As another example, the method 800 can include identifying the virtual restricted-use zone includes determining, based on sensor data received from one or more sensors communicatively with the head-wearable device 110, presence of the one or more restricted-use zone markers in the physical area. The sensor data can be from one or more sensors of the head-wearable device 110 or sensor data from a device communicatively coupled with the head-wearable device such as a wrist-wearable device 120 or other intermediary devices.

The virtual restricted-use zone is used (812) to enforce a restriction on use of an imaging device within the physical area, the imaging device communicatively coupled with the head-wearable device. The one or more restricted-use zone markers include (814) a restricted-use zone geofence defined for the physical area, a restricted-use zone visual cue present for the physical area, and a restricted-use zone audio cue present for the physical area. The restricted-use zone geofence could be predetermined, dynamically created, or optimized over time. The restricted-use zone geofence could be placed in public and private areas, such as arenas; public restrooms; private art galleries; museums; private parties, fitting rooms; movie theaters; military zones; etc. Examples of the virtual restricted-use zones and/or the one or more restricted-use zone markers are provided above in reference to FIGS. 1A-3K and 5A-6D. In some embodiments, the virtual restricted-use zones and/or the one or more restricted-use zone markers can be configured by an administrator or user 115 to grant permissions to different users, allow users to request and/or register their device to receive permission, etc. Examples of defining virtual restricted-use zones and/or the one or more restricted-use zone markers are provided above in reference to FIGS. 4A-4F.

In some embodiments, the virtual restricted-use zone is user defined, and the method 800 further includes receiving yet another user input to define a restricted-use zone marker of the one or more restricted-use zone markers, and responsive to the user input, causing one or more affordances to be presented to the user for defining the restricted-use zone marker. For example, the user can identify their bedroom or their home as a private area that disables an imaging device 111 and/or microphone communicatively coupled with the head-wearable device 110. Additionally, in some embodiments, the user 115 can define an area around them (e.g., a 1 meter radius) that disables an imaging device such that the user 115 can use to enforce their privacy. The user can authorize one or more devices or other users to capture image data and/or audio data within the user defined zone. In some embodiments, the user 115 is able to capture image data and/or audio data using an imaging device 111 and/or microphone communicatively coupled with the head-wearable device 110 while within their user defined zone. Examples of the user-defined virtual restricted-use zones are provided above in reference to FIGS. 4A-4F.

In some embodiments, the virtual restricted-use zone can be updated while the user and/or other users capture image data or navigate through the physical world (providing sensor data and/or other data to the head-wearable device). Restricted-use zone markers can be detected by intermediary devices or devices from other user's that is used to refine the virtual restricted-use zone. For example, a geofence may not be available or a private area can be missed, and use of image data or geofences provided from other user's or an intermediary device can be used to bolster/improve the detection of the virtual restricted-use zone. Data that can be used to dynamically generate the virtual restricted-use zone can include publicly available map information (e.g., google maps), other user data (e.g., from other users' head-wearable devices, wrist-wearable device, etc.; other data can be image data, location data, local geofences, etc.).

The method 800 includes receiving (816-A) a user input configured to initiate the imaging device communicatively coupled with the head-wearable device, and responsive (816-B) to the user input, capturing image data using the imaging device communicatively coupled with the head-wearable device. The one or more restricted-use zone markers include (816-C) a restricted-use zone visual cue, and the determination that the imaging device is within the restricted-use zone is based on detection of the restricted-use zone visual cue. For example, the restricted-use zone visual cue can include a restroom sign, a camera symbol with a strikethrough, text, etc. that, when recognized by processing image data captured by an imaging device 111 communicatively coupled with the head-wearable device 110, is used to determine the imaging device 111's (or head-wearable device 110's) location relative to the restricted-use zone. In some embodiments, the restricted-use zone visual cue includes objects typically associated with privacy, such as a toilet, a shower, a locker room, a bedroom, etc. Examples of the determining a restricted-use zone based on detection of the restricted-use zone visual cues are provided above in reference to FIGS. 3A-3K.

Additionally or alternatively, in some embodiments, the method 800 includes receiving user input configured to initiate a microphone communicatively coupled with the head-wearable device, and responsive to the user input, capturing audio data using the microphone communicatively coupled with the head-wearable device. The one or more restricted-use zone markers include a restricted-use zone audio cue, and a determination that the imaging device is within the restricted-use zone is based on detection of the restricted-zone audio cue within the audio data. For example, the restricted-use zone audio cue can include key words or phrases (e.g., "stop recording"), sounds associated with privacy (e.g., toilet flushes), etc. that, when recognized by processing audio data captured by a microphone communicatively coupled with the head-wearable device 110, is used to determine the microphone's (or head-wearable device 110's) location relative to the restricted-use zone. Examples of the determining a restricted-use zone based on detection of the restricted-use zone audio cues are provided above in reference to FIGS. 5A-5D.

In some embodiments, the virtual restricted-use zone is enforced based on monitoring the one or more restricted-use zone markers identified by the head-wearable device or other data received from an intermediary device communicatively coupled with the head-wearable device.

The method 800 includes causing (818) presentation of a notification to the user that informs the user 115 of the virtual restricted-use zone in accordance with a determination that the imaging device is within a predetermined distance from the virtual restricted-use zone. The notification (820) presented to the user includes one or more of a haptic cue, audio cue, and a message displayed on a display of the head-wearable device. In some embodiments, the notification is presented when the user is within a certain threshold distance of entering a virtual restricted-use zone. In particular, when the user 115 is approaching a virtual restricted-use zone, there is a predetermined distance (set out by the restricted-use zone marker) that is part of a warning zone and/or enforcement zone where the user will be put on notice that they are close to a particular zone. Additionally, the user 115 can also receive proximity notifications via a wrist-wearable device 120, a smartphone 191, and/or other communicatively coupled device. For example, when the user enters the restricted region, they can be notified that their image capturing device and/or microphone will be limited before they are disabled. Examples of the notifications presented to the user are provided above in reference to FIGS. 1A-3K and 5A-5D.

The method 800 includes automatically, without human intervention, disabling the imaging device (822) communicatively coupled with the head-wearable device in accordance with a determination that the imaging device is within the virtual restricted-use zone. In some embodiments, the method 800 also includes causing (824) presentation of a notification in conjunction with disabling the imaging device that informs the user that the imaging device is disabled. In some embodiments, while the imaging device is disabled, the method 800 includes activating an indicator coupled with the head-wearable device notifying external people (e.g., people (other than the user 115) looking at the head-wearable device 110 and/or other communicatively coupled device) that the imaging device 111 and/or microphone have disabled. In some embodiments, while the user is capturing audio and/or image data, the indicator flashes or blinks or is steadily illuminated. The indicator can be illuminated in different colors, patterns, intensities, etc. In some embodiments, an audio indicator can be presented (e.g., via speakers of the head-wearable device) that notify external people that an image device 111 and/or microphone have been disabled.

In some embodiments, the method 800 includes automatically, without human intervention, disabling (826) imaging devices on additional devices communicatively coupled to the head-wearable device, in accordance with the determination that the imaging device is within the virtual restricted-use zone. In some embodiments, imaging devices 111 and/or microphones of a wrist-wearable device, smartphone 191, drone 606, and/or other devices communicatively couple with the head-wearable device 110 are also disabled.

In some embodiments, the method 800 includes identifying (828-A) another virtual restricted-use zone based on presence of the one or more restricted-use zone markers in the physical area, the other virtual restricted-use zone is used to enforce a restriction on use of a microphone within the physical area, the microphone communicatively coupled with the head-wearable device, and automatically, without human intervention, disabling (828-B) the microphone communicatively coupled with the head-wearable device, in accordance with a determination that the imaging device is within the other virtual restricted-use zone.

In some embodiments, the method 800 includes identifying another virtual restricted-use zone based on the presence of one or more restricted-use zone markers in the physical area, the third virtual restricted-use zone being used to enforce a restriction on use of video capturing capabilities of an imaging device such that the imaging device cannot capture video data while still being able to capture static image data; and in accordance with a determination that the imaging device is within the other virtual restricted-use zone, automatically without human intervention disabling video capturing functionality of the imaging device while forgoing disabling static image capturing functionality of the imaging device. As shown and described above in reference to FIGS. 2A-2H, different restrictions can be placed on different components and/or functionality of the head-wearable device 110.

In some embodiments, the virtual restricted-use zone includes (830-A) a first virtual restricted-use zone and a second virtual restricted-use zone, the second virtual restricted-use zone at least partially overlapping the first virtual restricted-use zone. The method 800 further includes causing (830-B) presentation of a notification to the user that informs the user of the first virtual restricted-use zone in accordance with the determination that the imaging device is within a predetermined distance from and/or within the first virtual restricted-use zone, and automatically, without human intervention, disabling (830-C) the imaging device communicatively coupled with the head-wearable device in accordance with the determination that the imaging device is within the second virtual restricted-use zone.

In some embodiments, there is more than one virtual restricted-use zone. In some embodiments, one or more virtual restricted-use zone can be adjacent to one another, within one another (e.g., concentric circles, concentric squares, etc.), partially overlapping, etc. In some embodiments, a first virtual restricted-use zone is defined by a restricted-use zone geofence marker of the one or more restricted-use zone markers in a physical area; and a second virtual restricted-use zone is defined by a restricted-use zone visual cue marker of the one or more restricted-use zone markers in a physical area. In some embodiments, the first and second virtual restricted-use zone are defined by a restricted-use zone visual cue marker and a restricted-use zone geofence marker of the one or more restricted-use zone markers in a physical area.

In some embodiments, the method 800 includes receiving device positional data, in accordance with a determination that the head-wearable device is no longer worn by the user, disabling the imaging device (or microphone) communicatively coupled with the head-wearable device. This additionally features, as described above in reference to FIG. 3K, prevents an imaging device (or microphone) communicatively coupled with the head-wearable device 110 from consuming power when not in user and/or protect others from being captured without being aware of imaging device (or microphone) communicatively coupled with the head-wearable device 110.

The devices described above are further detailed below, including systems, wrist-wearable devices, headset devices, and smart textile-based garments. Specific operations described above may occur as a result of specific hardware, such hardware is described in further detail below. The devices described below are not limiting and features on these devices can be removed or additional features can be added to these devices. The different devices can include one or more analogous hardware components. For brevity, analogous devices and components are described below. Any differences in the devices and components are described below in their respective sections.

As described herein, a processor (e.g., a central processing unit (CPU), microcontroller unit (MCU), etc.), is an electronic component that is responsible for executing instructions and controlling the operation of an electronic device (e.g., a wrist-wearable device 1000 (analogous to wrist-wearable device 120 (FIGS. 1A-8C)), a head-wearable device (e.g., AR device 1100 and VR device 1110, which are analogous to head-wearable device 110 (FIGS. 1A-8C))), a handheld intermediary processing device 1200 (FIGS. 12A-12B), or other computer system). There are various types of processors that may be used interchangeably, or may be specifically required, by embodiments described herein. For example, a processor may be: (i) a general processor designed to perform a wide range of tasks, such as running software applications, managing operating systems, and performing arithmetic and logical operations; (ii) a microcontroller designed for specific tasks such as controlling electronic devices, sensors, and motors; (iii) a graphics processing unit (GPU) designed to accelerate the creation and rendering of images, videos, and animations (e.g., virtual-reality animations, such as three-dimensional modeling); (iv) a field-programmable gate array (FPGA) that can be programmed and reconfigured after manufacturing, and/or can be customized to perform specific tasks, such as signal processing, cryptography, and machine learning; (v) a digital signal processor (DSP) designed to perform mathematical operations on signals such as audio, video, and radio waves. One of skill in the art will understand that one or more processors of one or more electronic devices may be used in various embodiments described herein.

As described herein, controllers are electronic components that manage and coordinate the operation of other components within an electronic device (e.g., controlling inputs, processing data, and/or generating outputs). Examples of controllers can include: (i) microcontrollers, including small, low-power controllers that are commonly used in embedded systems and Internet of Things (IoT) devices; (ii) programmable logic controllers (PLCs) which may be configured to be used in industrial automation systems to control and monitor manufacturing processes; (iii) system-on-a-chip (SoC) controllers that integrate multiple components such as processors, memory, I/O interfaces, and other peripherals into a single chip; and/or DSPs. As described herein, a graphics module is a component or software module that is designed to handle graphical operations and/or processes, and can include a hardware module and/or a software module.

As described herein, memory refers to electronic components in a computer or electronic device that store data and instructions for the processor to access and manipulate. The devices described herein can include volatile and non-volatile memory. Examples of memory can include: (i) random access memory (RAM), such as DRAM, SRAM, DDR RAM or other random access solid state memory devices, configured to store data and instructions temporarily; (ii) read-only memory (ROM) configured to store data and instructions permanently (e.g., one or more portions of system firmware, and/or boot loaders); (iii) flash memory, magnetic disk storage devices, optical disk storage devices, other non-volatile solid state storage devices, which can be configured to store data in electronic devices (e.g., USB drives, memory cards, and/or solid-state drives (SSDs); and (iv) cache memory configured to temporarily store frequently accessed data and instructions. Memory, as described herein, can include structured data (e.g., SQL databases, MongoDB databases, GraphQL data, JSON data, etc.). Other examples of memory can include: (i) profile data, including user account data, user settings, and/or other user data stored by the user; (ii) sensor data detected and/or otherwise obtained by one or more sensors; (iii) media content data including stored image data, audio data, documents, and the like; (iv) application data, which can include data collected and/or otherwise obtained and stored during use of an application; and/or any other types of data described herein.

As described herein, a power system of an electronic device is configured to convert incoming electrical power into a form that can be used to operate the device. A power system can include various components, including: (i) a power source, which can be an alternating current (AC) adapter or a direct current (DC) adapter power supply; (ii) a charger input, and can be configured to use a wired and/or wireless connection (which may be part of a peripheral interface, such as a USB, micro-USB interface, near-field magnetic coupling, magnetic inductive and magnetic resonance charging, and/or radio frequency (RF) charging); (iii) a power-management integrated circuit, configured to distribute power to various components of the device and to ensure that the device operates within safe limits (e.g., regulating voltage, controlling current flow, and/or managing heat dissipation); and/or (iv) a battery configured to store power to provide usable power to components of one or more electronic devices.

As described herein, peripheral interfaces are electronic components (e.g., of electronic devices) that allow electronic devices to communicate with other devices or peripherals, and can provide a means for input and output of data and signals. Examples of peripheral interfaces can include: (i) universal serial bus (USB) and/or micro-USB interfaces configured for connecting devices to an electronic device; (ii) bluetooth interfaces configured to allow devices to communicate with each other, including bluetooth low energy (BLE); (iii) near field communication (NFC) interfaces configured to be short-range wireless interface for operations such as access control; (iv) POGO pins, which may be small, spring-loaded pins configured to provide a charging interface; (v) wireless charging interfaces; (vi) GPS interfaces; (vii) WiFi interfaces for providing a connection between a device and a wireless network; (viii) sensor interfaces.

As described herein, sensors are electronic components (e.g., in and/or otherwise in electronic communication with electronic devices, such as wearable devices) configured to detect physical and environmental changes and generate electrical signals. Examples of sensors can includer: (i) imaging sensors for collecting imaging data (e.g., including one or more cameras disposed on a respective electronic device); (ii) biopotential-signal sensors; (iii) inertial measurement unit (e.g., IMUs) for detecting, for example, angular rate, force, magnetic field, and/or changes in acceleration; (iv) heart rate sensors for measuring a user's heart rate; (v) SpO2 sensors for measuring blood oxygen saturation and/or other biometric data of a user; (vi) capacitive sensors for detecting changes in potential at a portion of a user's body (e.g., a sensor-skin interface) and/or the proximity of other devices or objects; (vii) light sensors (e.g., time-of-flight sensors, infrared light sensors, visible light sensors, etc.), and/or sensor for sensing data from the user or the user's environment. As described herein biopotential-signal-sensing components are devices used to measure electrical activity within the body (e.g., biopotential-signal sensors). Some types of biopotential-signal sensors include: (i) electroencephalography (EEG) sensors configured to measure electrical activity in the brain to diagnose neurological disorders; (ii) electrocardiogramar EKG) sensors configured to measure electrical activity of the heart to diagnose heart problems; (iii) electromyography (EMG) sensors configured to measure the electrical activity of muscles and to diagnose neuromuscular disorders; (iv) electrooculography (EOG) sensors configure to measure the electrical activity of eye muscles to detect eye movement and diagnose eye disorders.

As described herein, an application stored in memory of an electronic device (e.g., software) includes instructions stored in the memory. Examples of such applications include: (i) games; (ii) word processors; (iii) messaging applications; (iv) media-streaming applications; (v) financial applications; (vi) calendars; (vii) clocks; (viii) web-browsers; (ix) social media applications, (x) camera applications, (xi) web-based applications; (xii) health applications; (xiii) artificial reality applications, and/or any other applications that can be stored in memory. The applications can operate in conjunction with data and/or one or more components of a device or communicatively coupled devices to perform one or more operations and/or functions.

As described herein, communication interface modules can include hardware and/or software capable of data communications using any of a variety of custom or standard wireless protocols (e.g., IEEE 802.15.4, Wi-Fi, ZigBee, 6LoWPAN, Thread, Z-Wave, Bluetooth Smart, ISA100.11a, WirelessHART, or MiWi), custom or standard wired protocols (e.g., Ethernet or HomePlug), and/or any other suitable communication protocol, including communication protocols not yet developed as of the filing date of this document. A communication interface is a mechanism that enables different systems or devices to exchange information and data with each other, including hardware, software, or a combination of both hardware and software. For example, a communication interface can refer to a physical connector and/or port on a device that enables communication with other devices (e.g., USB, Ethernet, HDMI, Bluetooth). In some embodiments, a communication interface can refer to a software layer that enables different software programs to communicate with each other (e.g., application programming interfaces (APIs), protocols like HTTP and TCP/IP, etc.).

As described herein, a graphics module is a component or software module that is designed to handle graphical operations and/or processes, and can include a hardware module and/or a software module.

As described herein, non-transitory computer-readable storage media are physical devices or storage medium that can be used to store electronic data in a non-transitory form (e.g., such that the data is stored permanently until it is intentionally deleted or modified.

Example AR Systems

Figure 9A:
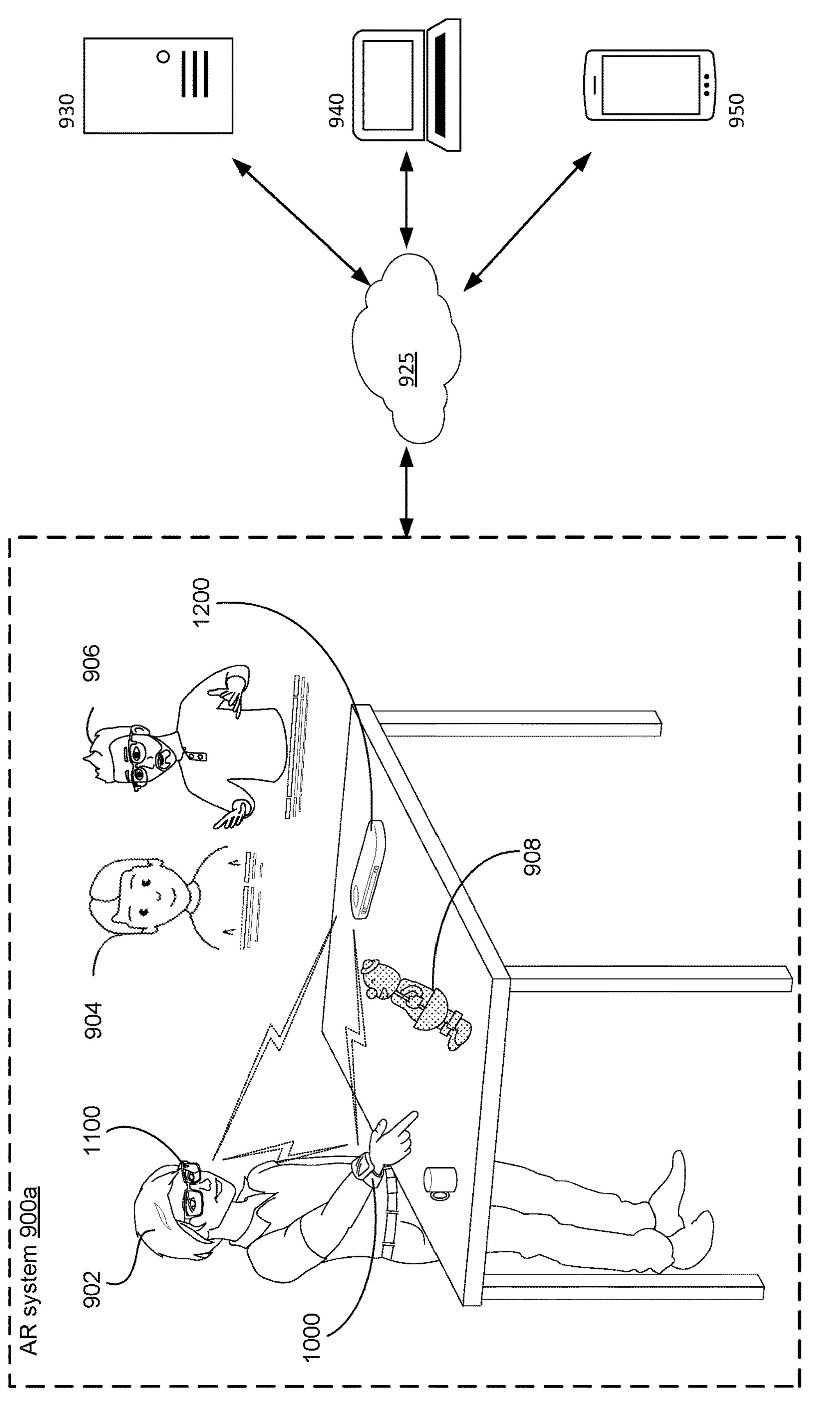
FIGS. 9A-9C-2 illustrate example artificial-reality systems, in accordance with some embodiments.
Figure 9B:
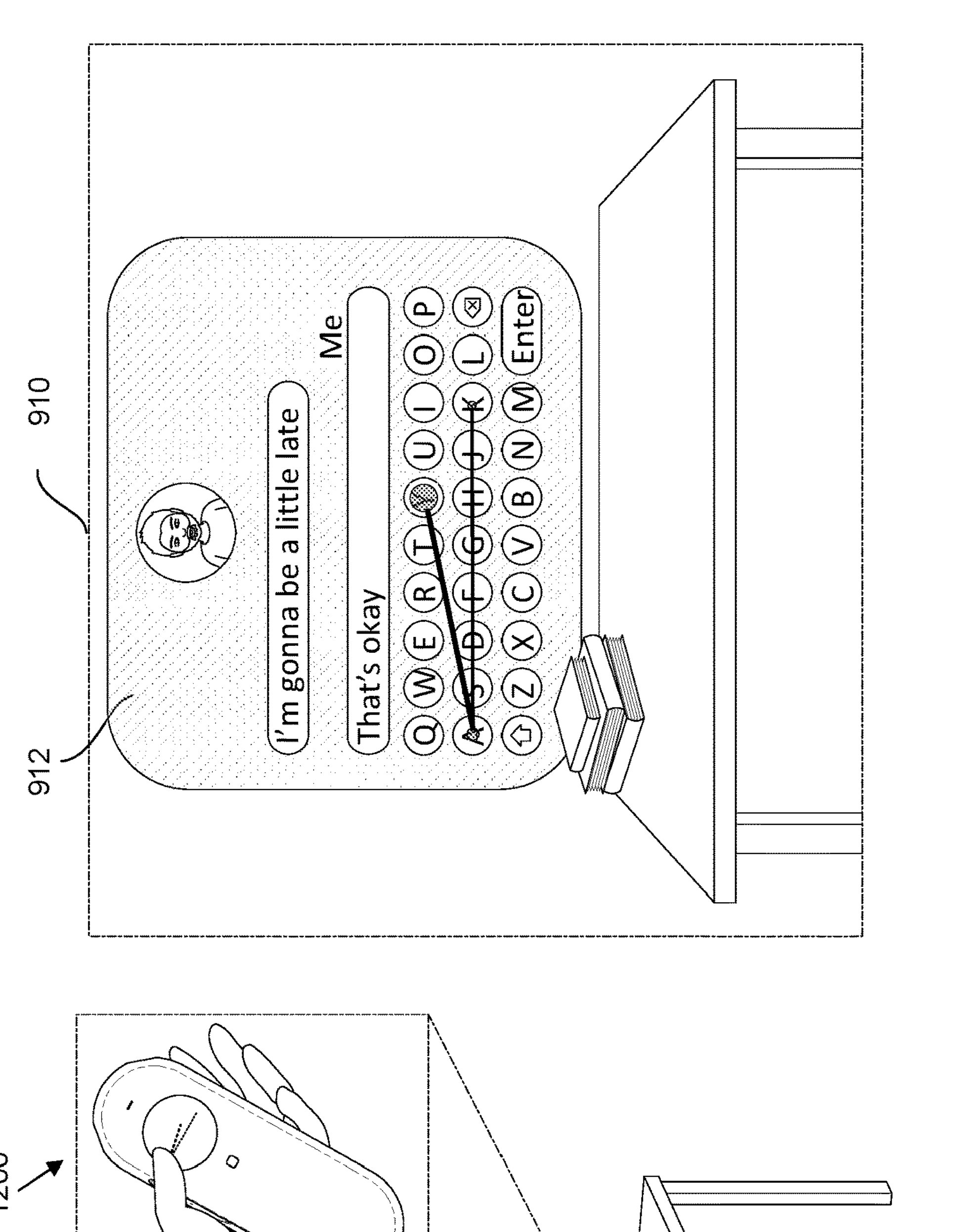
Figures 1, 9C:
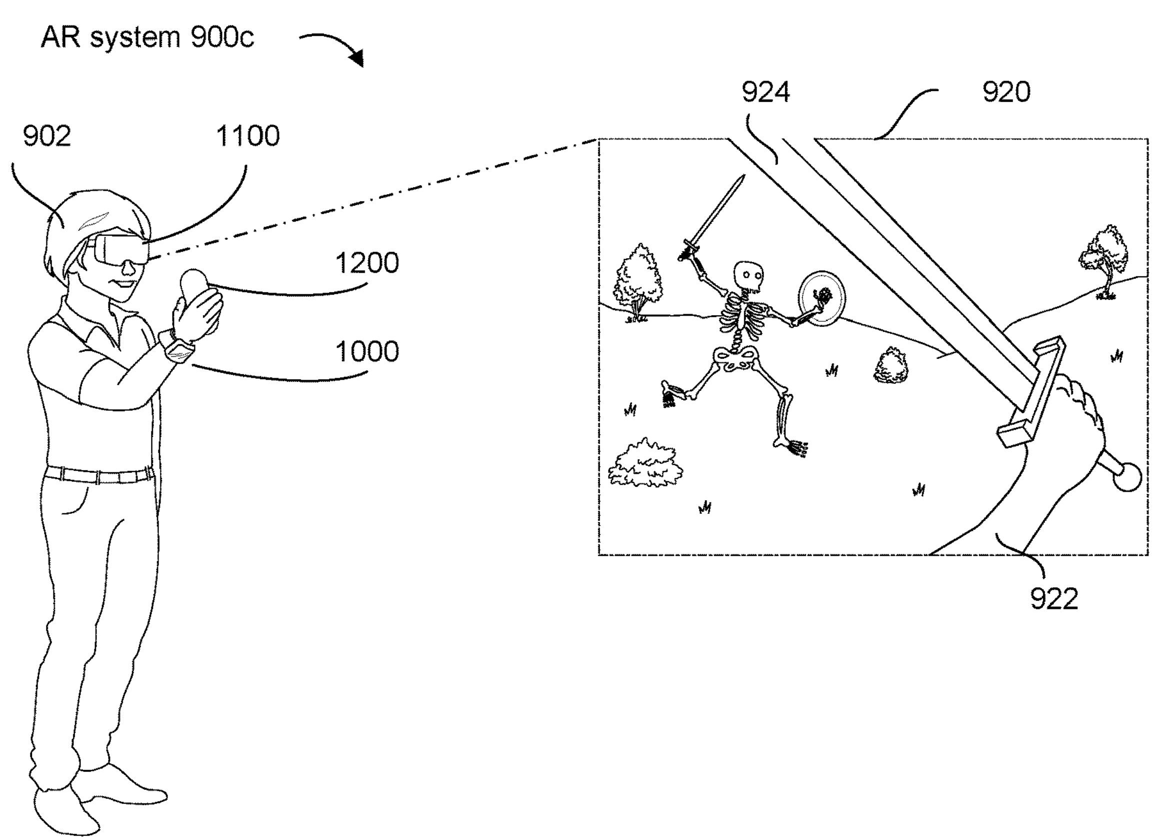
Figures 2, 9C:
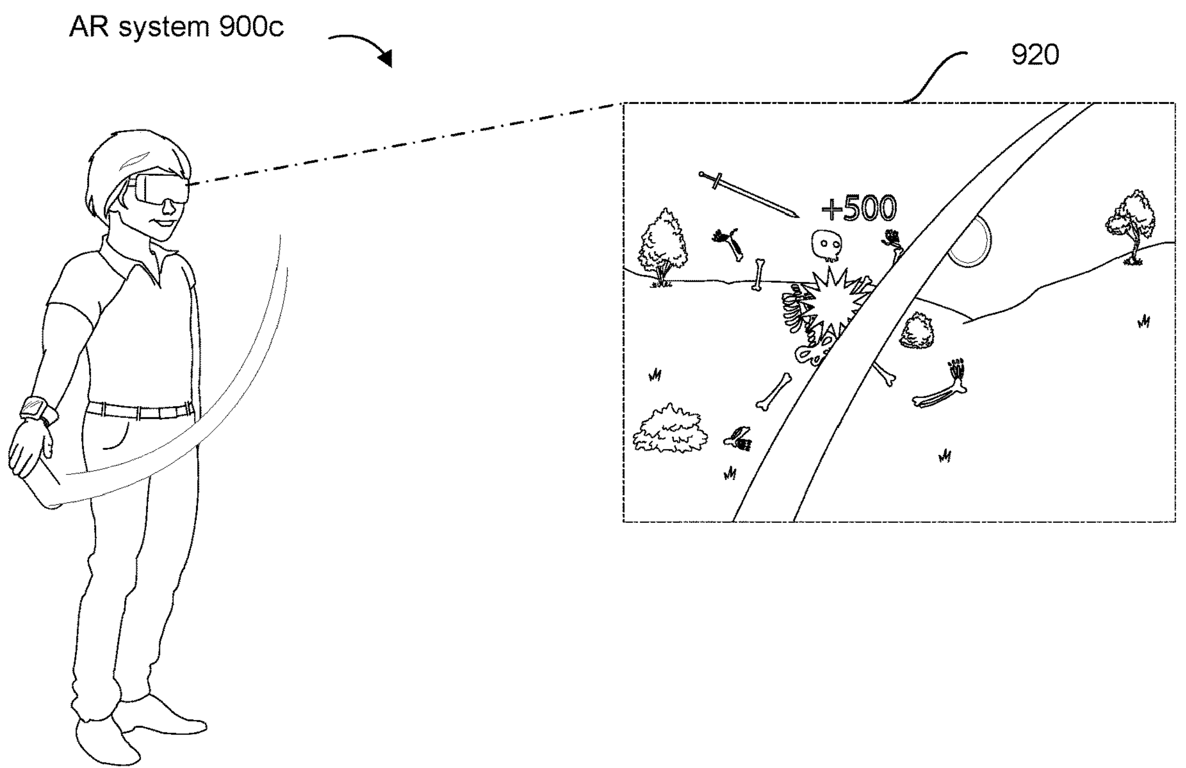

FIGS. 9A-9C-2 illustrate example artificial-reality systems, in accordance with some embodiments. FIG. 9A shows a first AR system 900*a* and first example user interactions using a wrist-wearable device 1000 (analogous to wrist-wearable device 120), a head-wearable device (e.g., AR device 1100 or analogous head-wearable device 110), and/or a handheld intermediary processing device (HIPD) 1200. FIG. 9B shows a second AR system 900*b* and second example user interactions using a wrist-wearable device 1000, AR device 1100, and/or an HIPD 1200. FIGS. 9C-1 and 9C-2 show a third AR system 900*c* and third example user interactions using a wrist-wearable device 1000, a head-wearable device (e.g., VR device 1110), and/or an HIPD 1200. As the skilled artisan will appreciate upon reading the descriptions provided herein, the above-example AR systems (described in detail below) can perform various functions and/or operations described above with reference to FIGS. 1A-8C.

The wrist-wearable device 1000 and one or more of its components are described below in reference to FIGS. 10A-10B; the head-wearable devices and their one or more components are described below in reference to FIGS. 11A-11C; and the HIPD 1200 and its one or more components are described below in reference to FIGS. 12A-12B. The wrist-wearable device 1000, the head-wearable devices, and/or the HIPD 1200 can communicatively couple via a network 925 (e.g., cellular, near field, Wi-Fi, personal area network, wireless LAN, etc.). Additionally, the wrist-wearable device 1000, the head-wearable devices, and/or the HIPD 1200 can also communicatively couple with one or more servers 930, computers 940 (e.g., laptops, computers, etc.), mobile devices 950 (e.g., smartphones 191 (FIGS. 1A-1G), tablets, etc.), and/or other electronic devices via the network 925 (e.g., cellular, near field, Wi-Fi, personal area network, wireless LAN, etc.)

Turning to FIG. 9A, a user 902 is shown wearing the wrist-wearable device 1000 and the AR device 1100, and having the HIPD 1200 on their desk. The wrist-wearable device 1000, the AR device 1100, and the HIPD 1200 facilitate user interaction with an AR environment. In particular, as shown by the first AR system 900*a*, the wrist-wearable device 1000, the AR device 1100, and/or the HIPD 1200 cause presentation of one or more avatars 904, digital representations of contacts 906, and virtual objects 908. As discussed below, the user 902 can interact with the one or more avatars 904, digital representations of the contacts 906, and virtual objects 908 via the wrist-wearable device 1000, the AR device 1100, and/or the HIPD 1200.

The user 902 can use any of the wrist-wearable device 1000, the AR device 1100, and/or the HIPD 1200 to provide user inputs. For example, the user 902 can perform one or more hand gestures that are detected by the wrist-wearable device 1000 (e.g., using one or more EMG sensors and/or IMUs, described below in reference to FIGS. 10A-10B) and/or AR device 1100 (e.g. using one or more image sensor or camera, described below in reference to FIGS. 11A-11B) to provide a user input. Alternatively, or additionally, the user 902 can provide a user input via one or more touch surfaces of the wrist-wearable device 1000, the AR device 1100, and/or the HIPD 1200, and/or voice commands captured by a microphone of the wrist-wearable device 1000, the AR device 1100, and/or the HIPD 1200. In some embodiments, the wrist-wearable device 1000, the AR device 1100, and/or the HIPD 1200 include a digital assistant to help the user in providing a user input (e.g., completing a sequence of operations, suggesting different operations or commands, providing reminders, confirming a command, etc.). In some embodiments, the user 902 can provide a user input via one or more facial gestures and/or facial expressions. For example, cameras of the wrist-wearable device 1000, the AR device 1100, and/or the HIPD 1200 can track the user 902's eyes for navigating a user interface.

The wrist-wearable device 1000, the AR device 1100, and/or the HIPD 1200 can operate alone or in conjunction to allow the user 902 to interact with the AR environment. In some embodiments, the HIPD 1200 is configured to operate as a central hub or control center for the wrist-wearable device 1000, the AR device 1100, and/or another communicatively coupled device. For example, the user 902 can provide an input to interact with the AR environment at any of the wrist-wearable device 1000, the AR device 1100, and/or the HIPD 1200, and the HIPD 1200 can identify one or more back-end and front-end tasks to cause the performance of the requested interaction and distribute instructions to cause the performance of the one or more back-end and front-end tasks at the wrist-wearable device 1000, the AR device 1100, and/or the HIPD 1200. In some embodiments, a back-end task is background processing task that is not perceptible by the user (e.g., rendering content, decompression, compression, etc.), and a front-end task is a user-facing task that is perceptible to the user (e.g., presenting information to the user, providing feedback to the user, etc.)). As described below in reference to FIGS. 12A-12B, the HIPD 1200 can perform the back-end tasks and provide the wrist-wearable device 1000 and/or the AR device 1100 operational data corresponding to the performed back-end tasks such that the wrist-wearable device 1000 and/or the AR device 1100 can perform the front-end tasks. In this way, the HIPD 1200, which has more computational resources and greater thermal headroom than the wrist-wearable device 1000 and/or the AR device 1100, performs computationally intensive tasks and reduces the computer resource utilization and/or power usage of the wrist-wearable device 1000 and/or the AR device 1100.

In the example shown by the first AR system 900*a*, the HIPD 1200 identifies one or more back-end tasks and front-end tasks associated with a user request to initiate an AR video call with one or more other users (represented by the avatar 904 and the digital representation of the contact 906) and distributes instructions to cause the performance of the one or more back-end tasks and front-end tasks. In particular, the HIPD 1200 performs back-end tasks for processing and/or rendering image data (and other data) associated with the AR video call and provides operational data associated with the performed back-end tasks to the AR device 1100 such that the AR device 1100 perform front-end tasks for presenting the AR video call (e.g., presenting the avatar 904 and the digital representation of the contact 906).

In some embodiments, the HIPD 1200 can operate as a focal or anchor point for causing the presentation of information. This allows the user 902 to be generally aware of where information is presented. For example, as shown in the first AR system 900*a*, the avatar 904 and the digital representation of the contact 906 are presented above the HIPD 1200. In particular, the HIPD 1200 and the AR device 1100 operate in conjunction to determine a location for presenting the avatar 904 and the digital representation of the contact 906. In some embodiments, information can be presented a predetermined distance from the HIPD 1200 (e.g., within 5 meters). For example, as shown in the first AR system 900*a*, virtual object 908 is presented on the desk some distance from the HIPD 1200. Similar to the above example, the HIPD 1200 and the AR device 1100 can operate in conjunction to determine a location for presenting the virtual object 908. Alternatively, in some embodiments, presentation of information is not bound by the HIPD 1200. More specifically, the avatar 904, the digital representation of the contact 906, and the virtual object 908 do not have to be presented within a predetermined distance of the HIPD 1200.

User inputs provided at the wrist-wearable device 1000, the AR device 1100, and/or the HIPD 1200 are coordinated such that the user can use any device to initiate, continue, and/or complete an operation. For example, the user 902 can provide a user input to the AR device 1100 to cause the AR device 1100 to present the virtual object 908 and, while the virtual object 908 is presented by the AR device 1100, the user 902 can provide one or more hand gestures via the wrist-wearable device 1000 to interact and/or manipulate the virtual object 908.

FIG. 9B shows the user 902 wearing the wrist-wearable device 1000 and the AR device 1100, and holding the HIPD 1200. In the second AR system 900*b*, the wrist-wearable device 1000, the AR device 1100, and/or the HIPD 1200 are used to receive and/or provide one or more messages to a contact of the user 902. In particular, the wrist-wearable device 1000, the AR device 1100, and/or the HIPD 1200 detect and coordinate one or more user inputs to initiate a messaging application and prepare a response to a received message via the messaging application.

In some embodiments, the user 902 initiates, via a user input, an application on the wrist-wearable device 1000, the AR device 1100, and/or the HIPD 1200 that causes the application to initiate on at least one device. For example, in the second AR system 900*b* the user 902 performs a hand gesture associated with a command for initiating a messaging application (represented by messaging user interface 912); the wrist-wearable device 1000 detects the hand gesture; and, based on a determination that the user 902 is wearing AR device 1100, causes the AR device 1100 to present a messaging user interface 912 of the messaging application. The AR device 1100 can present the messaging user interface 912 to the user 902 via its display (e.g., as shown by user 902's field of view 910). In some embodiments, the application is initiated and ran on the device (e.g., the wrist-wearable device 1000, the AR device 1100, and/or the HIPD 1200) that detects the user input to initiate the application, and the device provides another device operational data to cause the presentation of the messaging application. For example, the wrist-wearable device 1000 can detect the user input to initiate a messaging application; initiate and run the messaging application; and provide operational data to the AR device 1100 and/or the HIPD 1200 to cause presentation of the messaging application. Alternatively, the application can be initiated and ran at a device other than the device that detected the user input. For example, the wrist-wearable device 1000 can detect the hand gesture associated with initiating the messaging application and cause the HIPD 1200 to run the messaging application and coordinate the presentation of the messaging application.

Further, the user 902 can provide a user input provided at the wrist-wearable device 1000, the AR device 1100, and/or the HIPD 1200 to continue and/or complete an operation initiated are at another device. For example, after initiating the messaging application via the wrist-wearable device 1000 and while the AR device 1100 present the messaging user interface 912, the user 902 can provide an input at the HIPD 1200 to prepare a response (e.g., shown by the swipe gesture performed on the HIPD 1200). The user 902's gestures performed on the HIPD 1200 can be provided and/or displayed on another device. For example, the user 902's swipe gestured performed on the HIPD 1200 are displayed on a virtual keyboard of the messaging user interface 912 displayed by the AR device 1100.

In some embodiments, the wrist-wearable device 1000, the AR device 1100, the HIPD 1200, and/or other communicatively couple device can present one or more notifications to the user 902. The notification can be an indication of a new message, an incoming call, an application update, a status update, etc. The user 902 can select the notification via the wrist-wearable device 1000, the AR device 1100, the HIPD 1200, and cause presentation of an application or operation associated with the notification on at least one device. For example, the user 902 can receive a notification that a message was received at the wrist-wearable device 1000, the AR device 1100, the HIPD 1200, and/or other communicatively couple device and provide a user input at the wrist-wearable device 1000, the AR device 1100, and/or the HIPD 1200 to review the notification, and the device detecting the user input can cause an application associated with the notification to be initiated and/or presented at the wrist-wearable device 1000, the AR device 1100, and/or the HIPD 1200.

While the above example describes coordinated inputs used to interact with a messaging application, the skilled artisan will appreciate upon reading the descriptions that user inputs can be coordinated to interact with any number of applications including, but not limited to, gaming applications, social media applications, camera applications, web-based applications, financial applications, etc. For example, the AR device 1100 can present to the user 902 game application data and the HIPD 1200 can use a controller to provide inputs to the game. Similarly, the user 902 can use the wrist-wearable device 1000 to initiate a camera of the AR device 1100, and the user can use the wrist-wearable device 1000, the AR device 1100, and/or the HIPD 1200 to manipulate the image capture (e.g., zoom in or out, apply filters, etc.) and capture image data.

Turning to FIGS. 9C-1 and 9C-2, the user 902 is shown wearing the wrist-wearable device 1000 and a VR device 1110, and holding the HIPD 1200. In the third AR system 900*c*, the wrist-wearable device 1000, the VR device 1110, and/or the HIPD 1200 are used to interact within an AR environment, such as a VR game or other AR application. While the VR device 1110 present a representation of a VR game (e.g., first AR game environment 920) to the user 902, the wrist-wearable device 1000, the VR device 1110, and/or the HIPD 1200 detect and coordinate one or more user inputs to allow the user 902 to interact with the VR game.

In some embodiments, the user 902 can provide a user input via the wrist-wearable device 1000, the VR device 1110, and/or the HIPD 1200 that causes an action in a corresponding AR environment. For example, the user 902 in the third AR system 900*c* (shown in FIG. 9C-1) raises the HIPD 1200 to prepare for a swing in the first AR game environment 920. The VR device 1110, responsive to the user 902 raising the HIPD 1200, causes the AR representation of the user 922 to perform a similar action (e.g., raise a virtual object, such as a virtual sword 924). In some embodiments, each device uses respective sensor data and/or image data to detect the user input and provide an accurate representation of the user 902's motion. For example, image sensors 1258 (e.g., SLAM cameras or other cameras discussed below in FIGS. 12A and 12B) of the HIPD 1200 can be used to detect a position of the 1200 relative to the user 902's body such that the virtual object can be positioned appropriately within the first AR game environment 920; sensor data from the wrist-wearable device 1000 can be used to detect a velocity at which the user 902 raises the HIPD 1200 such that the AR representation of the user 922 and the virtual sword 924 are synchronized with the user 902's movements; and image sensors 1126 (FIGS. 11A-11C) of the VR device 1110 can be used to represent the user 902's body, boundary conditions, or real-world objects within the first AR game environment 920.

In FIG. 9C-2, the user 902 performs a downward swing while holding the HIPD 1200. The user 902's downward swing is detected by the wrist-wearable device 1000, the VR device 1110, and/or the HIPD 1200 and a corresponding action is performed in the first AR game environment 920. In some embodiments, the data captured by each device is used to improve the user's experience within the AR environment. For example, sensor data of the wrist-wearable device 1000 can be used to determine a speed and/or force at which the downward swing is performed and image sensors of the HIPD 1200 and/or the VR device 1110 can be used to determine a location of the swing and how it should be represented in the first AR game environment 920, which, in turn, can be used as inputs for the AR environment (e.g., game mechanics, which can use detected speed, force, locations, and/or aspects of the user 902's actions to classify a user's inputs (e.g., user performs a light strike, hard strike, critical strike, glancing strike, miss, etc.) or calculate an output (e.g., amount of damage)).

While the wrist-wearable device 1000, the VR device 1110, and/or the HIPD 1200 are described as detecting user inputs, in some embodiments, user inputs are detected at a single device (with the single device being responsible for distributing signals to the other devices for performing the user input). For example, the HIPD 1200 can operate an application for generating the first AR game environment 920 and provide the VR device 1110 with corresponding data for causing the presentation of the first AR game environment 920, as well as detect the 902's movements (while holding the HIPD 1200) to cause the performance of corresponding actions within the first AR game environment 920. Additionally or alternatively, in some embodiments, operational data (e.g., sensor data, image data, application data, device data, and/or other data) of one or more devices is provide to a single device (e.g., the HIPD 1200) to process the operational data and cause respective devices to perform an action associated with processed operational data.

Having discussed example AR systems, devices for interacting with such AR systems, and other computing systems more generally, will now be discussed in greater detail below. Some definitions of devices and components that can be included in some or all of the example devices discussed below are defined here for ease of reference. A skilled artisan will appreciate that certain types of the components described below may be more suitable for a particular set of devices, and less suitable for a different set of devices. But subsequent reference to the components defined here should be considered to be encompassed by the definitions provided.

In some embodiments discussed below example devices and systems, including electronic devices and systems, will be discussed. Such example devices and systems are not intended to be limiting, and one of skill in the art will understand that alternative devices and systems to the example devices and systems described herein may be used to perform the operations and construct the systems and device that are described herein.

As described herein, an electronic device is a device that uses electrical energy to perform a specific function. It can be any physical object that contains electronic components such as transistors, resistors, capacitors, diodes, and integrated circuits. Examples of electronic devices include smartphones, laptops, digital cameras, televisions, gaming consoles, and music players, as well as the example electronic devices discussed herein. As described herein, an intermediary electronic device is a device that sits between two other electronic devices, and/or a subset of components of one or more electronic devices and facilitates communication, and/or data processing and/or data transfer between the respective electronic devices and/or electronic components.

Example Wrist-Wearable Devices

Figure 10A:
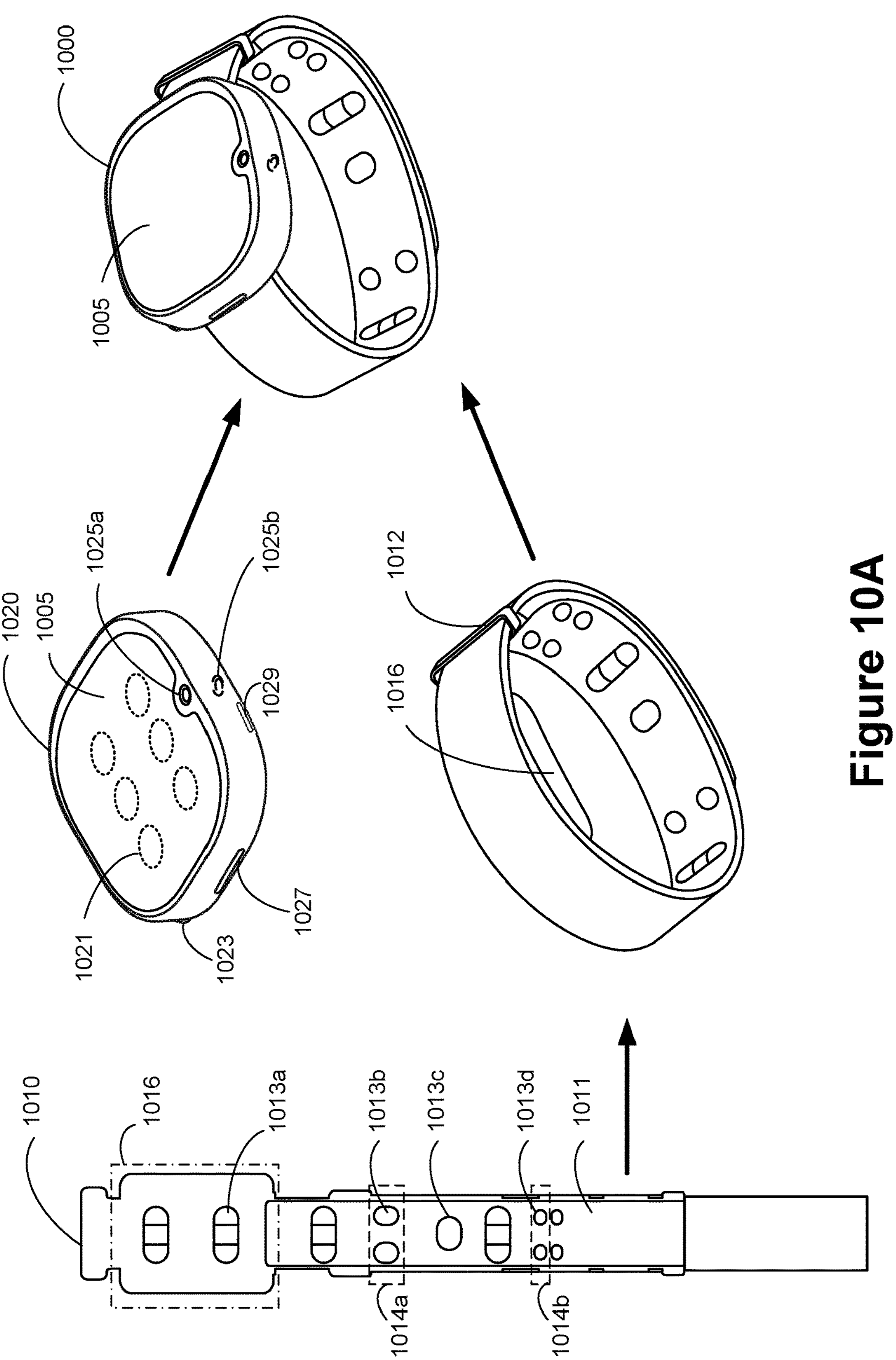
FIGS. 10A-10B illustrate an example wrist-wearable device 1000, in accordance with some embodiments.
Figure 10B:
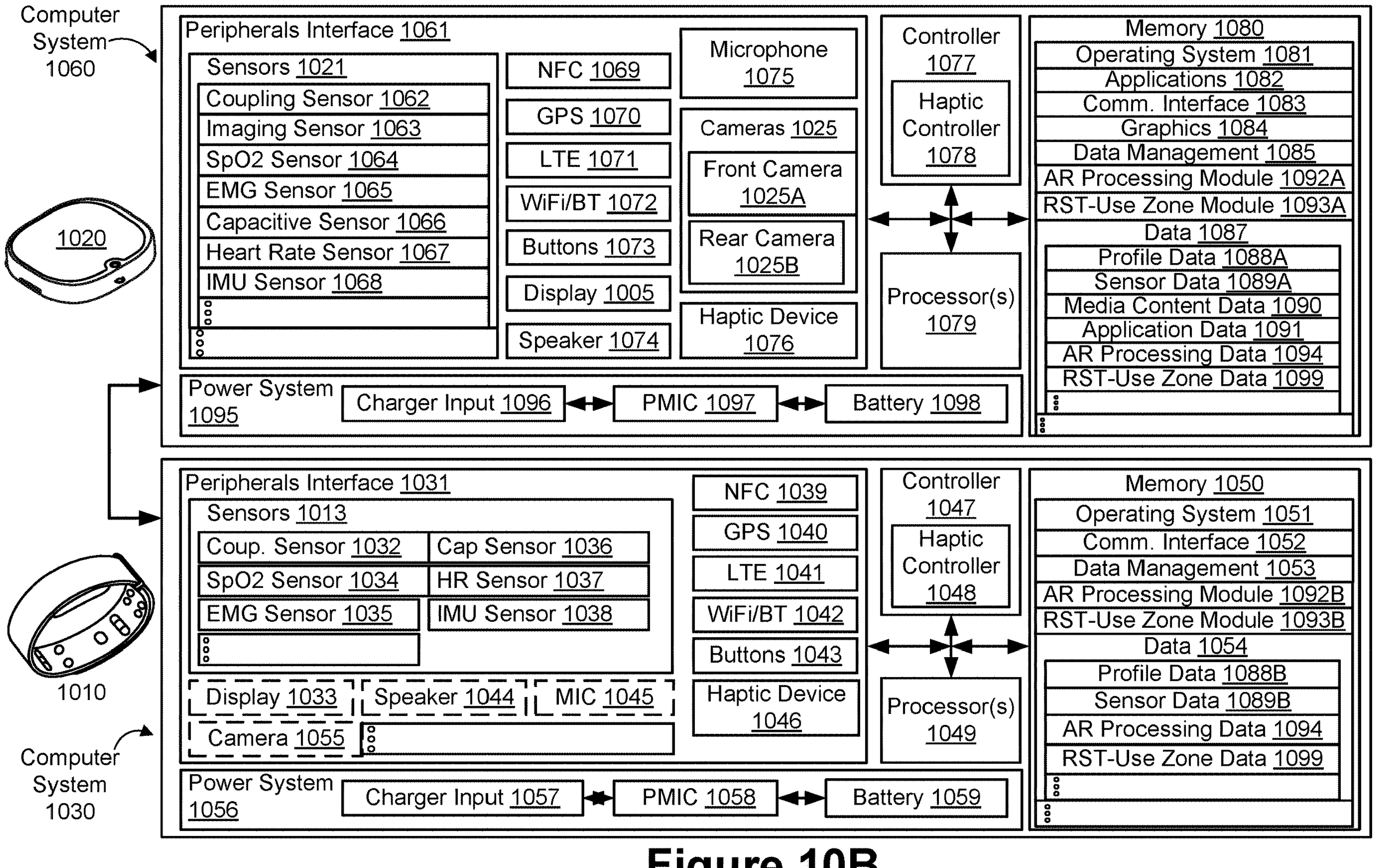

FIGS. 10A and 10B illustrate an example wrist-wearable device 1000, in accordance with some embodiments. The wrist-wearable device 1000 is an instance of the wearable device described in reference to FIGS. 1-6 herein, such that the wearable device should be understood to have the features of the wrist-wearable device 1000 and vice versa. FIG. 10A illustrates components of the wrist-wearable device 1000, which can be used individually or in combination, including combinations that include other electronic devices and/or electronic components.

FIG. 10A shows a wearable band 1010 and a watch body 1020 (or capsule) being coupled, as discussed below, to form the wrist-wearable device 1000. The wrist-wearable device 1000 can perform various functions and/or operations associated with navigating through user interfaces and selectively opening applications, as well as the functions and/or operations described above with reference to FIGS. 1A-9C-2.

As will be described in more detail below, operations executed by the wrist-wearable device 1000 can include: (i) presenting content to a user (e.g., displaying visual content via a display 1005); (ii) detecting (e.g., sensing) user input (e.g., sensing a touch on peripheral button 1023 and/or at a touch screen of the display 1005, a hand gesture detected by sensors (e.g., biopotential sensors)); (iii) sensing biometric data via one or more sensors 1013 (e.g., neuromuscular signals, heart rate, temperature, sleep, etc.); messaging (e.g., text, speech, video, etc.); image capture via one or more imaging devices or cameras 1025; wireless communications (e.g., cellular, near field, Wi-Fi, personal area network, etc.); location determination; financial transactions; providing haptic feedback; alarms; notifications; biometric authentication; health monitoring; sleep monitoring; etc.

The above-example functions can be executed independently in the watch body 1020, independently in the wearable band 1010, and/or via an electronic communication between the watch body 1020 and the wearable band 1010. In some embodiments, functions can be executed on the wrist-wearable device 1000 while an AR environment is being presented (e.g., via one of the AR systems 900*a* to 900*d*). As the skilled artisan will appreciate upon reading the descriptions provided herein, the novel wearable devices described herein can be used with other types of AR environments.

The wearable band 1010 can be configured to be worn by a user such that an inner (or inside) surface of the wearable structure 1011 of the wearable band 1010 is in contact with the user's skin. When worn by a user, sensors 1013 contact the user's skin. The sensors 1013 can sense biometric data such as a user's heart rate, saturated oxygen level, temperature, sweat level, neuromuscular signal sensors, or a combination thereof. The sensors 1013 can also sense data about a user's environment including a user's motion, altitude, location, orientation, gait, acceleration, position, or a combination thereof. In some embodiment, the sensors 1013 are configured to track a position and/or motion of the wearable band 1010. The one or more sensors 1013 can include any of the sensors defined above and/or discussed below with respect to FIG. 10B.

The one or more sensors 1013 can be distributed on an inside and/or an outside surface of the wearable band 1010. In some embodiments, the one or more sensors 1013 are uniformly spaced along the wearable band 1010. Alternatively, in some embodiments, the one or more sensors 1013 are positioned at distinct points along the wearable band 1010. As shown in FIG. 10A, the one or more sensors 1013 can be the same or distinct. For example, in some embodiments, the one or more sensors 1013 can be shaped as a pill (e.g., sensor 1013*a*), an oval, a circle a square, an oblong (e.g., sensor 1013*c*) and/or any other shape that maintains contact with the user's skin (e.g., such that neuromuscular signal and/or other biometric data can be accurately measured at the user's skin). In some embodiments, the one or more sensors 1013 are aligned to form pairs of sensors (e.g., for sensing neuromuscular signals based on differential sensing within each respective sensor). For example, sensor 1013*b* is aligned with an adjacent sensor to form sensor pair 1014*a* and sensor 1013*d* aligned with an adjacent sensor to form sensor pair 1014*b*. In some embodiments, the wearable band 1010 does not have a sensor pair. Alternatively, in some embodiments, the wearable band 1010 has a predetermined number of sensor pairs (one pair of sensors, three pairs of sensors, four pairs of sensors, six pairs of sensors, sixteen pairs of sensors, etc.).

The wearable band 1010 can include any suitable number of sensors 1013. In some embodiments, the number and arrangement of sensors 1013 depends on the particular application for which the wearable band 1010 is used. For instance, a wearable band 1010 configured as an armband, wristband, or chest-band may include a plurality of sensors 1013 with different number of sensors 1013 and different arrangement for each use case, such as medical use cases as compared to gaming or general day-to-day use cases.

In accordance with some embodiments, the wearable band 1010 further includes an electrical ground electrode and a shielding electrode. The electrical ground and shielding electrodes, like the sensors 1013, can be distributed on the inside surface of the wearable band 1010 such that they contact a portion of the user's skin. For example, the electrical ground and shielding electrodes can be at an inside surface of coupling mechanism 1016 or an inside surface of a wearable structure 1011. The electrical ground and shielding electrodes can be formed and/or use the same components as the sensors 1013. In some embodiments, the wearable band 1010 includes more than one electrical ground electrode and more than one shielding electrode.

The sensors 1013 can be formed as part of the wearable structure 1011 of the wearable band 1010. In some embodiments, the sensors 1013 are flush or substantially flush with the wearable structure 1011 such that they do not extend beyond the surface of the wearable structure 1011. While flush with the wearable structure 1011, the sensors 1013 are still configured to contact the user's skin (e.g., via a skin-contacting surface). Alternatively, in some embodiments, the sensors 1013 extend beyond the wearable structure 1011 a predetermined distance (e.g., 0.1-2 mm) to make contact and depress into the user's skin. In some embodiment, the sensors 1013 are coupled to an actuator (not shown) configured to adjust an extension height (e.g., a distance from the surface of the wearable structure 1011) of the sensors 1013 such that the sensors 1013 make contact and depress into the user's skin. In some embodiments, the actuators adjust the extension height between 0.01 mm-1.2 mm. This allows the user to customize the positioning of the sensors 1013 to improve the overall comfort of the wearable band 1010 when worn while still allowing the sensors 1013 to contact the user's skin. In some embodiments, the sensors 1013 are indistinguishable from the wearable structure 1011 when worn by the user.

The wearable structure 1011 can be formed of an elastic material, elastomers, etc. configured to be stretched and fitted to be worn by the user. In some embodiments, the wearable structure 1011 is a textile or woven fabric. As described above, the sensors 1013 can be formed as part of a wearable structure 1011. For example, the sensors 1013 can be molded into the wearable structure 1011 or be integrated into a woven fabric (e.g., the sensors 1013 can be sewn into the fabric and mimic the pliability of fabric (e.g., the sensors 1013 can be constructed from a series woven strands of fabric)).

The wearable structure 1011 can include flexible electronic connectors that interconnect the sensors 1013, the electronic circuitry, and/or other electronic components (described below in reference to FIG. 10B) that are enclosed in the wearable band 1010. In some embodiments, the flexible electronic connectors are configured to interconnect the sensors 1013, the electronic circuitry, and/or other electronic components of the wearable band 1010 with respective sensors and/or other electronic components of another electronic device (e.g., watch body 1020). The flexible electronic connectors are configured to move with the wearable structure 1011 such that the user adjustment to the wearable structure 1011 (e.g., resizing, pulling, folding, etc.) does not stress or strain the electrical coupling of components of the wearable band 1010.

As described above, the wearable band 1010 is configured to be worn by a user. In particular, the wearable band 1010 can be shaped or otherwise manipulated to be worn by a user. For example, the wearable band 1010 can be shaped to have a substantially circular shape such that it can be configured to be worn on the user's lower arm or wrist. Alternatively, the wearable band 1010 can be shaped to be worn on another body part of the user, such as the user's upper arm (e.g., around a bicep), forearm, chest, legs, etc. The wearable band 1010 can include a retaining mechanism 1012 (e.g., a buckle, a hook and loop fastener, etc.) for securing the wearable band 1010 to the user's wrist or other body part. While the wearable band 1010 is worn by the user, the sensors 1013 sense data (referred to as sensor data) from the user's skin. In particular, the sensors 1013 of the wearable band 1010 obtain (e.g., sense and record) neuromuscular signals.

The sensed data (e.g., sensed neuromuscular signals) can be used to detect and/or determine the user's intention to perform certain motor actions. In particular, the sensors 1013 sense and record neuromuscular signals from the user as the user performs muscular activations (e.g., movements, gestures, etc.). The detected and/or determined motor actions (e.g., phalange (or digits) movements, wrist movements, hand movements, and/or other muscle intentions) can be used to determine control commands or control information (instructions to perform certain commands after the data is sensed) for causing a computing device to perform one or more input commands. For example, the sensed neuromuscular signals can be used to control certain user interfaces displayed on the display 1005 of the wrist-wearable device 1000 and/or can be transmitted to a device responsible for rendering an artificial-reality environment (e.g., a head-mounted display) to perform an action in an associated artificial-reality environment, such as to control the motion of a virtual device displayed to the user. The muscular activations performed by the user can include static gestures, such as placing the user's hand palm down on a table; dynamic gestures, such as grasping a physical or virtual object; and covert gestures that are imperceptible to another person, such as slightly tensing a joint by co-contracting opposing muscles or using sub-muscular activations. The muscular activations performed by the user can include symbolic gestures (e.g., gestures mapped to other gestures, interactions, or commands, for example, based on a gesture vocabulary that specifies the mapping of gestures to commands).

The sensor data sensed by the sensors 1013 can be used to provide a user with an enhanced interaction with a physical object (e.g., devices communicatively coupled with the wearable band 1010) and/or a virtual object in an artificial-reality application generated by an artificial-reality system (e.g., user interface objects presented on the display 1005, or another computing device (e.g., a smartphone)).

In some embodiments, the wearable band 1010 includes one or more haptic devices 1046 (FIG. 10B; e.g., a vibratory haptic actuator) that are configured to provide haptic feedback (e.g., a cutaneous and/or kinesthetic sensation, etc.) to the user's skin. The sensors 1013, and/or the haptic devices 1046 can be configured to operate in conjunction with multiple applications including, without limitation, health monitoring, social media, games, and artificial reality (e.g., the applications associated with artificial reality).

The wearable band 1010 can also include coupling mechanism 1016 (e.g., a cradle or a shape of the coupling mechanism can correspond to shape of the watch body 1020 of the wrist-wearable device 1000) for detachably coupling a capsule (e.g., a computing unit) or watch body 1020 (via a coupling surface of the watch body 1020) to the wearable band 1010. In particular, the coupling mechanism 1016 can be configured to receive a coupling surface proximate to the bottom side of the watch body 1020 (e.g., a side opposite to a front side of the watch body 1020 where the display 1005 is located), such that a user can push the watch body 1020 downward into the coupling mechanism 1016 to attach the watch body 1020 to the coupling mechanism 1016. In some embodiments, the coupling mechanism 1016 can be configured to receive a top side of the watch body 1020 (e.g., a side proximate to the front side of the watch body 1020 where the display 1005 is located) that is pushed upward into the cradle, as opposed to being pushed downward into the coupling mechanism 1016. In some embodiments, the coupling mechanism 1016 is an integrated component of the wearable band 1010 such that the wearable band 1010 and the coupling mechanism 1016 are a single unitary structure. In some embodiments, the coupling mechanism 1016 is a type of frame or shell that allows the watch body 1020 coupling surface to be retained within or on the wearable band 1010 coupling mechanism 1016 (e.g., a cradle, a tracker band, a support base, a clasp, etc.).

The coupling mechanism 1016 can allow for the watch body 1020 to be detachably coupled to the wearable band 1010 through a friction fit, magnetic coupling, a rotation-based connector, a shear-pin coupler, a retention spring, one or more magnets, a clip, a pin shaft, a hook and loop fastener, or a combination thereof. A user can perform any type of motion to couple the watch body 1020 to the wearable band 1010 and to decouple the watch body 1020 from the wearable band 1010. For example, a user can twist, slide, turn, push, pull, or rotate the watch body 1020 relative to the wearable band 1010, or a combination thereof, to attach the watch body 1020 to the wearable band 1010 and to detach the watch body 1020 from the wearable band 1010. Alternatively, as discussed below, in some embodiments, the watch body 1020 can be decoupled from the wearable band 1010 by actuation of the release mechanism 1029.

The wearable band 1010 can be coupled with a watch body 1020 to increase the functionality of the wearable band 1010 (e.g., converting the wearable band 1010 into a wrist-wearable device 1000, adding an additional computing unit and/or battery to increase computational resources and/or a battery life of the wearable band 1010, adding additional sensors to improve sensed data, etc.). As described above, the wearable band 1010 (and the coupling mechanism 1016) is configured to operate independently (e.g., execute functions independently) from watch body 1020. For example, the coupling mechanism 1016 can include one or more sensors 1013 that contact a user's skin when the wearable band 1010 is worn by the user and provide sensor data for determining control commands.

A user can detach the watch body 1020 (or capsule) from the wearable band 1010 in order to reduce the encumbrance of the wrist-wearable device 1000 to the user. For embodiments in which the watch body 1020 is removable, the watch body 1020 can be referred to as a removable structure, such that in these embodiments the wrist-wearable device 1000 includes a wearable portion (e.g., the wearable band 1010) and a removable structure (the watch body 1020).

Turning to the watch body 1020, the watch body 1020 can have a substantially rectangular or circular shape. The watch body 1020 is configured to be worn by the user on their wrist or on another body part. More specifically, the watch body 1020 is sized to be easily carried by the user, attached on a portion of the user's clothing, and/or coupled to the wearable band 1010 (forming the wrist-wearable device 1000). As described above, the watch body 1020 can have a shape corresponding to the coupling mechanism 1016 of the wearable band 1010. In some embodiments, the watch body 1020 includes a single release mechanism 1029 or multiple release mechanisms (e.g., two release mechanisms 1029 positioned on opposing sides of the watch body 1020, such as spring-loaded buttons) for decoupling the watch body

1020 and the wearable band 1010. The release mechanism 1029 can include, without limitation, a button, a knob, a plunger, a handle, a lever, a fastener, a clasp, a dial, a latch, or a combination thereof.

A user can actuate the release mechanism 1029 by pushing, turning, lifting, depressing, shifting, or performing other actions on the release mechanism 1029. Actuation of the release mechanism 1029 can release (e.g., decouple) the watch body 1020 from the coupling mechanism 1016 of the wearable band 1010, allowing the user to use the watch body 1020 independently from wearable band 1010, and vice versa. For example, decoupling the watch body 1020 from the wearable band 1010 can allow the user to capture images using rear-facing camera 1025B. Although the is shown positioned at a corner of watch body 1020, the release mechanism 1029 can be positioned anywhere on watch body 1020 that is convenient for the user to actuate. In addition, in some embodiments, the wearable band 1010 can also include a respective release mechanism for decoupling the watch body 1020 from the coupling mechanism 1016. In some embodiments, the release mechanism 1029 is optional and the watch body 1020 can be decoupled from the coupling mechanism 1016 as described above (e.g., via twisting, rotating, etc.).

The watch body 1020 can include one or more peripheral buttons 1023 and 1027 for performing various operations at the watch body 1020. For example, the peripheral buttons 1023 and 1027 can be used to turn on or wake (e.g., transition from a sleep state to an active state) the display 1005, unlock the watch body 1020, increase or decrease a volume, increase or decrease a brightness, interact with one or more applications, interact with one or more user interfaces, etc. Additionally, or alternatively, in some embodiments, the display 1005 operates as a touch screen and allows the user to provide one or more inputs for interacting with the watch body 1020.

In some embodiments, the watch body 1020 includes one or more sensors 1021. The sensors 1021 of the watch body 1020 can be the same or distinct from the sensors 1013 of the wearable band 1010. The sensors 1021 of the watch body 1020 can be distributed on an inside and/or an outside surface of the watch body 1020. In some embodiments, the sensors 1021 are configured to contact a user's skin when the watch body 1020 is worn by the user. For example, the sensors 1021 can be placed on the bottom side of the watch body 1020 and the coupling mechanism 1016 can be a cradle with an opening that allows the bottom side of the watch body 1020 to directly contact the user's skin. Alternatively, in some embodiments, the watch body 1020 does not include sensors that are configured to contact the user's skin (e.g., including sensors internal and/or external to the watch body 1020 that configured to sense data of the watch body 1020 and the watch body 1020's surrounding environment). In some embodiment, the sensors 1013 are configured to track a position and/or motion of the watch body 1020.

The watch body 1020 and the wearable band 1010 can share data using a wired communication method (e.g., a Universal Asynchronous Receiver/Transmitter (UART), a USB transceiver, etc.) and/or a wireless communication method (e.g., near field communication, Bluetooth, etc.). For example, the watch body 1020 and the wearable band 1010 can share data sensed by the sensors 1013 and 1021, as well as application and device specific information (e.g., active and/or available applications, output devices (e.g., display, speakers, etc.), input devices (e.g., touch screen, microphone, imaging sensors, etc.).

In some embodiments, the watch body 1020 can include, without limitation, a front-facing camera 1025A and/or a rear-facing camera 1025B, sensors 1021 (e.g., a biometric sensor, an IMU, a heart rate sensor, a saturated oxygen sensor, a neuromuscular signal sensor, an altimeter sensor, a temperature sensor, a bioimpedance sensor, a pedometer sensor, an optical sensor (e.g., imaging sensor 1063; FIG. 10B), a touch sensor, a sweat sensor, etc.). In some embodiments, the watch body 1020 can include one or more haptic devices 1076 (FIG. 10B; a vibratory haptic actuator) that is configured to provide haptic feedback (e.g., a cutaneous and/or kinesthetic sensation, etc.) to the user. The sensors 1021 and/or the haptic device 1076 can also be configured to operate in conjunction with multiple applications including, without limitation, health monitoring applications, social media applications, game applications, and artificial reality applications (e.g., the applications associated with artificial reality).

As described above, the watch body 1020 and the wearable band 1010, when coupled, can form the wrist-wearable device 1000. When coupled, the watch body 1020 and wearable band 1010 operate as a single device to execute functions (operations, detections, communications, etc.) described herein. In some embodiments, each device is provided with particular instructions for performing the one or more operations of the wrist-wearable device 1000. For example, in accordance with a determination that the watch body 1020 does not include neuromuscular signal sensors, the wearable band 1010 can include alternative instructions for performing associated instructions (e.g., providing sensed neuromuscular signal data to the watch body 1020 via a different electronic device). Operations of the wrist-wearable device 1000 can be performed by the watch body 1020 alone or in conjunction with the wearable band 1010 (e.g., via respective processors and/or hardware components) and vice versa. In some embodiments, operations of the wrist-wearable device 1000, the watch body 1020, and/or the wearable band 1010 can be performed in conjunction with one or more processors and/or hardware components of another communicatively coupled device (e.g., the HIPD 1200; FIGS. 12A-12B).

As described below with reference to the block diagram of FIG. 10B, the wearable band 1010 and/or the watch body 1020 can each include independent resources required to independently execute functions. For example, the wearable band 1010 and/or the watch body 1020 can each include a power source (e.g., a battery), a memory, data storage, a processor (e.g., a central processing unit (CPU)), communications, a light source, and/or input/output devices.

FIG. 10B shows block diagrams of a computing system 1030 corresponding to the wearable band 1010, and a computing system 1060 corresponding to the watch body 1020, according to some embodiments. A computing system of the wrist-wearable device 1000 includes a combination of components of the wearable band computing system 1030 and the watch body computing system 1060, in accordance with some embodiments.

The watch body 1020 and/or the wearable band 1010 can include one or more components shown in watch body computing system 1060. In some embodiments, a single integrated circuit includes all or a substantial portion of the components of the watch body computing system 1060 are included in a single integrated circuit. Alternatively, in some embodiments, components of the watch body computing system 1060 are included in a plurality of integrated circuits that are communicatively coupled. In some embodiments, the watch body computing system 1060 is configured to couple (e.g., via a wired or wireless connection) with the wearable band computing system 1030, which allows the computing systems to share components, distribute tasks, and/or perform other operations described herein (individually or as a single device).

The watch body computing system 1060 can include one or more processors 1079, a controller 1077, a peripherals interface 1061, a power system 1095, and memory (e.g., a memory 1080), each of which are defined above and described in more detail below.

The power system 1095 can include a charger input 1096, a power-management integrated circuit (PMIC) 1097, and a battery 1098, each are which are defined above. In some embodiments, a watch body 1020 and a wearable band 1010 can have respective charger inputs (e.g., charger input 1096 and 1057), respective batteries (e.g., battery 1098 and 1059), and can share power with each other (e.g., the watch body 1020 can power and/or charge the wearable band 1010, and vice versa). Although watch body 1020 and/or the wearable band 1010 can include respective charger inputs, a single charger input can charge both devices when coupled. The watch body 1020 and the wearable band 1010 can receive a charge using a variety of techniques. In some embodiments, the watch body 1020 and the wearable band 1010 can use a wired charging assembly (e.g., power cords) to receive the charge. Alternatively, or in addition, the watch body 1020 and/or the wearable band 1010 can be configured for wireless charging. For example, a portable charging device can be designed to mate with a portion of watch body 1020 and/or wearable band 1010 and wirelessly deliver usable power to a battery of watch body 1020 and/or wearable band 1010. The watch body 1020 and the wearable band 1010 can have independent power systems (e.g., power system 1095 and 1056) to enable each to operate independently. The watch body 1020 and wearable band 1010 can also share power (e.g., one can charge the other) via respective PMICs (e.g., PMICs 1097 and 1058) that can share power over power and ground conductors and/or over wireless charging antennas.

In some embodiments, the peripherals interface 1061 can include one or more sensors 1021, many of which listed below are defined above. The sensors 1021 can include one or more coupling sensor 1062 for detecting when the watch body 1020 is coupled with another electronic device (e.g., a wearable band 1010). The sensors 1021 can include imaging sensors 1063 (one or more of the cameras 1025, and/or separate imaging sensors 1063 (e.g., thermal-imaging sensors)). In some embodiments, the sensors 1021 include one or more SpO2 sensors 1064. In some embodiments, the sensors 1021 include one or more biopotential-signal sensors (e.g., EMG sensors 1065, which may be disposed on a user-facing portion of the watch body 1020 and/or the wearable band 1010). In some embodiments, the sensors 1021 include one or more capacitive sensors 1066. In some embodiments, the sensors 1021 include one or more heart rate sensors 1067. In some embodiments, the sensors 1021 include one or more IMU sensors 1068. In some embodiments, one or more IMU sensors 1068 can be configured to detect movement of a user's hand or other location that the watch body 1020 is placed or held).

In some embodiments, the peripherals interface 1061 includes a near-field communication (NFC) component 1069, a global-position system (GPS) component 1070, a long-term evolution (LTE) component 1071, and/or a Wi-Fi and/or Bluetooth communication component 1072. In some embodiments, the peripherals interface 1061 includes one or more buttons 1073 (e.g., the peripheral buttons 1023 and 1027 in FIG. 10A), which, when selected by a user, cause operation to be performed at the watch body 1020. In some embodiments, the peripherals interface 1061 includes one or more indicators, such as a light emitting diode (LED), to provide a user with visual indicators (e.g., message received, low battery, active microphone and/or camera, etc.).

The watch body 1020 can include at least one display 1005, for displaying visual representations of information or data to the user, including user-interface elements and/or three-dimensional virtual objects. The display can also include a touch screen for inputting user inputs, such as touch gestures, swipe gestures, and the like. The watch body 1020 can include at least one speaker 1074 and at least one microphone 1075 for providing audio signals to the user and receiving audio input from the user. The user can provide user inputs through the microphone 1075 and can also receive audio output from the speaker 1074 as part of a haptic event provided by the haptic controller 1078. The watch body 1020 can include at least one camera 1025, including a front-facing camera 1025A and a rear-facing camera 1025B. The cameras 1025 can include ultra-wide-angle cameras, wide angle cameras, fish-eye cameras, spherical cameras, telephoto cameras, a depth-sensing cameras, or other types of cameras.

The watch body computing system 1060 can include one or more haptic controllers 1078 and associated componentry (e.g., haptic devices 1076) for providing haptic events at the watch body 1020 (e.g., a vibrating sensation or audio output in response to an event at the watch body 1020). The haptic controllers 1078 can communicate with one or more haptic devices 1076, such as electroacoustic devices, including a speaker of the one or more speakers 1074 and/or other audio components and/or electromechanical devices that convert energy into linear motion such as a motor, solenoid, electroactive polymer, piezoelectric actuator, electrostatic actuator, or other tactile output generating component (e.g., a component that converts electrical signals into tactile outputs on the device). The haptic controller 1078 can provide haptic events to that are capable of being sensed by a user of the watch body 1020. In some embodiments, the one or more haptic controllers 1078 can receive input signals from an application of the applications 1082.

In some embodiments, the computer system 1030 and/or the computer system 1060 can include memory 1080, which can be controlled by a memory controller of the one or more controllers 1077 and/or one or more processors 1079. In some embodiments, software components stored in the memory 1080 include one or more applications 1082 configured to perform operations at the watch body 1020. In some embodiments, the one or more applications 1082 include games, word processors, messaging applications, calling applications, web browsers, social media applications, media streaming applications, financial applications, calendars, clocks, etc. In some embodiments, software components stored in the memory 1080 include one or more communication interface modules 1083 as defined above. In some embodiments, software components stored in the memory 1080 include one or more graphics modules 1084 for rendering, encoding, and/or decoding audio and/or visual data; and one or more data management modules 1085 for collecting, organizing, and/or providing access to the data 1087 stored in memory 1080. In some embodiments, software components stored in the memory 1080 include an AR processing module 1092A configured to process data for generating AR representations of data and and/or AR environments, such as AR UIs, avatars, augmented reality environments, VR environments, etc. The software components stored in the memory 1080 further include a restricted-use zone module 1093A (e.g., represented by RST-Use Zone Module) for enforcing the imaging device (e.g., camera) restrictions described above in reference to FIGS. 1A-8C. In some embodiments, software components stored in the memory 1080 can further include any modules for performing the features described above in reference to FIGS. 1A-9C-2. In some embodiments, one or more of applications 1082 and/or one or more modules can work in conjunction with one another to perform various tasks at the watch body 1020.

In some embodiments, software components stored in the memory 1080 can include one or more operating systems 1081 (e.g., a Linux-based operating system, an Android operating system, etc.). The memory 1080 can also include data 1087. The data 1087 can include profile data 1088A, sensor data 1089A, media content data 1090, and application data 1091. The data 1087 can further include AR processing data 1094, which stores models and/or algorithms for processing data via the AR processing module 1092A as well as the processed data generated by the AR processing module 1092A, and restricted-use zone data 1099 (e.g., represented as RST-Use Zone Data), which stores geolocations for enforcing restricted-use zones, models for detecting visual cues in captured image data, user defined image capture restrictions, and/or other restricted-use zone data related to the performance of the features of the restricted-use zone module 1093A and described above in reference to FIGS. 1A-9C-2.

It should be appreciated that the watch body computing system 1060 is an example of a computing system within the watch body 1020, and that the watch body 1020 can have more or fewer components than shown in the watch body computing system 1060, combine two or more components, and/or have a different configuration and/or arrangement of the components. The various components shown in watch body computing system 1060 are implemented in hardware, software, firmware, or a combination thereof, including one or more signal processing and/or application-specific integrated circuits.

Turning to the wearable band computing system 1030, one or more components that can be included in the wearable band 1010 are shown. The wearable band computing system 1030 can include more or fewer components than shown in the watch body computing system 1060, combine two or more components, and/or have a different configuration and/or arrangement of some or all of the components. In some embodiments, all, or a substantial portion of the components of the wearable band computing system 1030 are included in a single integrated circuit. Alternatively, in some embodiments, components of the wearable band computing system 1030 are included in a plurality of integrated circuits that are communicatively coupled. As described above, in some embodiments, the wearable band computing system 1030 is configured to couple (e.g., via a wired or wireless connection) with the watch body computing system 1060, which allows the computing systems to share components, distribute tasks, and/or perform other operations described herein (individually or as a single device).

The wearable band computing system 1030, similar to the watch body computing system 1060, can include one or more processors 1049, one or more controllers 1047 (including one or more haptics controller 1048), a peripherals interface 1031 that can includes one or more sensors 1013 and other peripheral devices, power source (e.g., a power system 1056), and memory (e.g., a memory 1050) that includes an operating system (e.g., an operating system 1051), data (e.g., data 1054 including profile data 1088B, sensor data 1089B, AR processing data 1094, restricted-use zone data 1099, etc.), and one or more modules (e.g., a communications interface module 1052, a data management module 1053, an AR processing module 1092B, a restricted-use zone module 1093B, etc.).

The one or more sensors 1013 can be analogous to sensors 1021 of the computer system 1060 and in light of the definitions above. For example, sensors 1013 can include one or more coupling sensors 1032, one or more SpO2 sensor 1034, one or more EMG sensors 1035, one or more capacitive sensor 1036, one or more heart rate sensor 1037, and one or more IMU sensor 1038.

The peripherals interface 1031 can also include other components analogous to those included in the peripheral interface 1061 of the computer system 1060, including an NFC component 1039, a GPS component 1040, an LTE component 1041, a Wi-Fi and/or Bluetooth communication component 1042, and/or one or more haptic devices 1076 as described above in reference to peripherals interface 1061. In some embodiments, the peripherals interface 1031 includes one or more buttons 1043, a display 1033, a speaker 1044, a microphone 1045, and a camera 1055. In some embodiments, the peripherals interface 1031 includes one or more indicators, such as an LED.

It should be appreciated that the wearable band computing system 1030 is an example of a computing system within the wearable band 1010, and that the wearable band 1010 can have more or fewer components than shown in the wearable band computing system 1030, combine two or more components, and/or have a different configuration and/or arrangement of the components. The various components shown in wearable band computing system 1030 can be implemented in one or a combination of hardware, software, firmware, including one or more signal processing and/or application-specific integrated circuits.

The wrist-wearable device 1000 with respect to FIG. 10A is an example of the wearable band 1010 and the watch body 1020 coupled, so the wrist-wearable device 1000 will be understood to include the components shown and described for the wearable band computing system 1030 and the watch body computing system 1060. In some embodiments, wrist-wearable device 1000 has a split architecture (e.g., a split mechanical architecture, a split electrical architecture) between the watch body 1020 and the wearable band 1010. In other words, all of the components shown in the wearable band computing system 1030 and the watch body computing system 1060 can be housed or otherwise disposed in a combined watch device 1000, or within individual components of the watch body 1020, wearable band 1010, and/or portions thereof (e.g., a coupling mechanism 1016 of the wearable band 1010).

The techniques described above can be used with any device for sensing neuromuscular signals, including the arm-wearable devices of FIG. 10A-10B, but could also be used with other types of wearable devices for sensing neuromuscular signals (such as body-wearable or head-wearable devices that might have neuromuscular sensors closer to the brain or spinal column).

In some embodiments, a wrist-wearable device 1000 can be used in conjunction with a head-wearable device described below (e.g., AR device 1100 and VR device 1110) and/or an HIPD 1200; and the wrist-wearable device 1000 can also be configured to be used to allow a user to control aspect of the artificial reality (e.g., by using EMG-based gestures to control user interface objects in the artificial reality and/or by allowing a user to interact with the touch-screen on the wrist-wearable device to also control aspects of the artificial reality). Having thus described example wrist-wearable device, attention will now be turned to example head-wearable devices, such AR device 1100 and VR device 1110.

Example Head-Wearable Devices

Figure 11A:
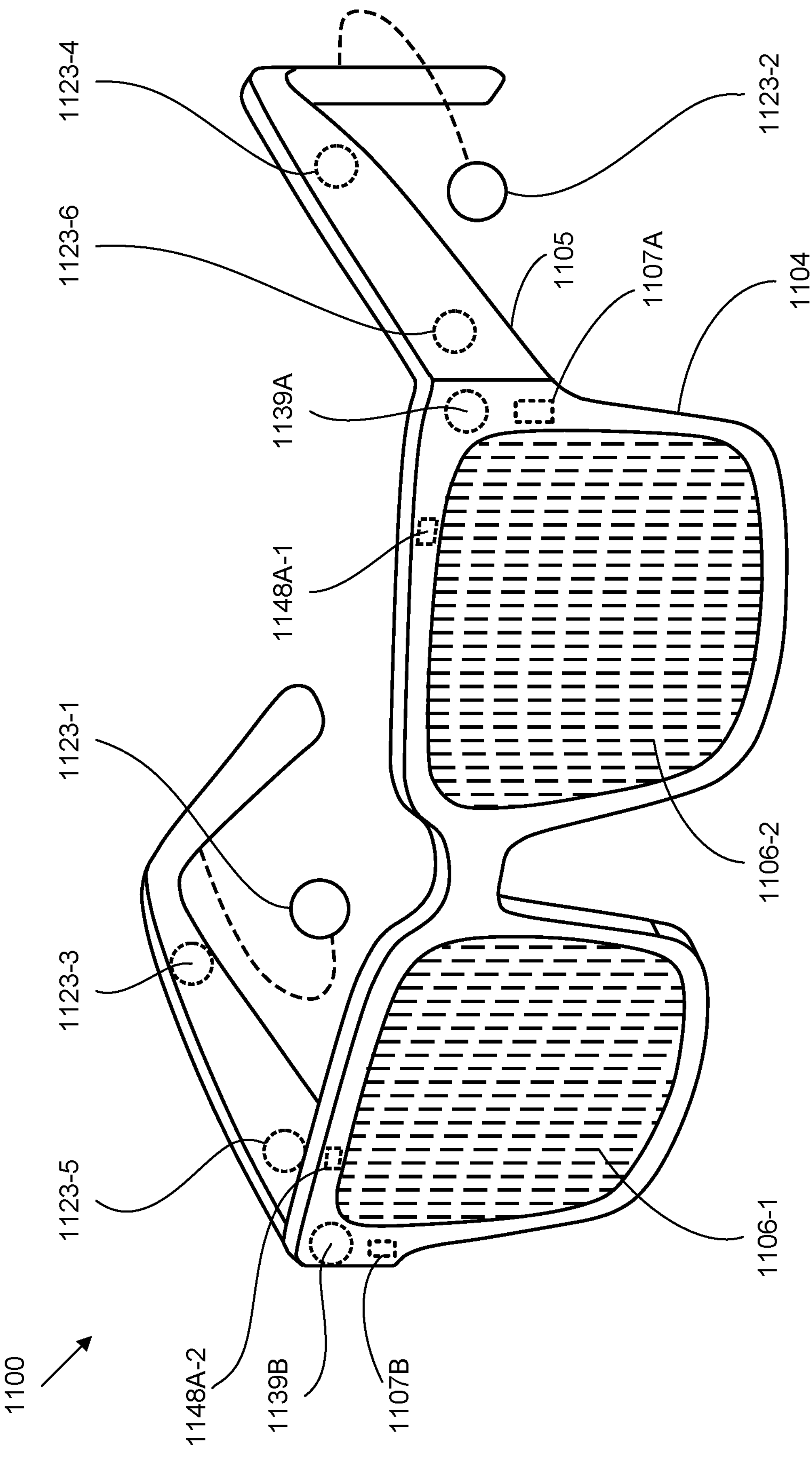
FIGS. 11A-11C illustrate example head-wearable devices, in accordance with some embodiments.
Figures 1, 11B:
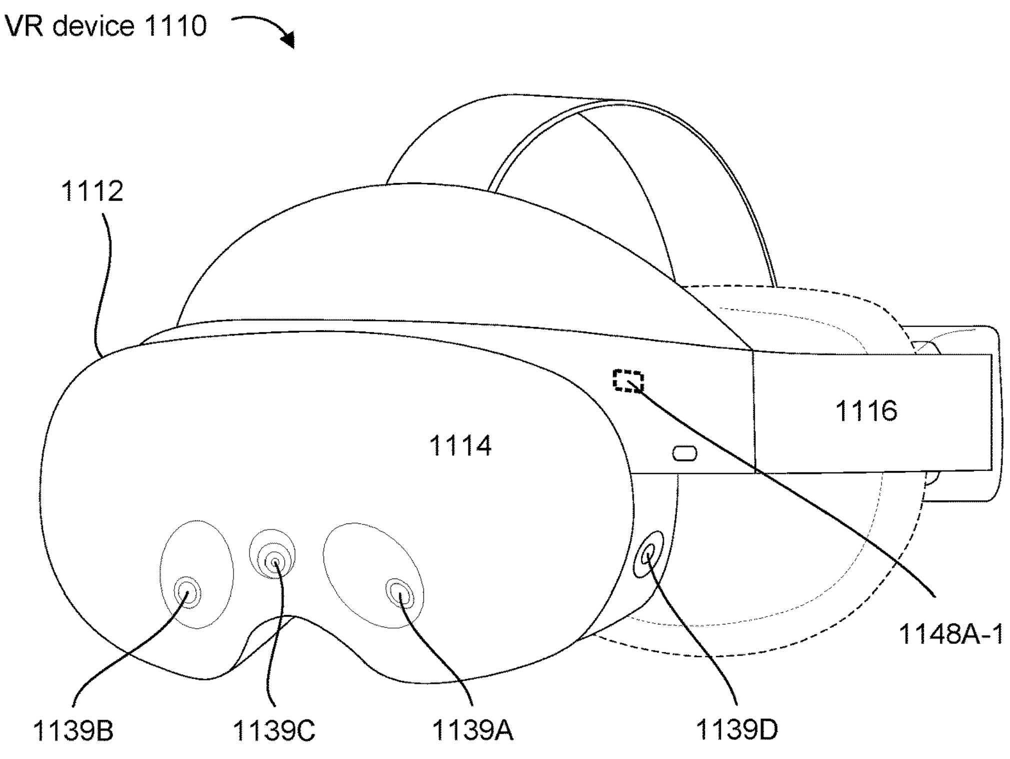
Figures 2, 11B:
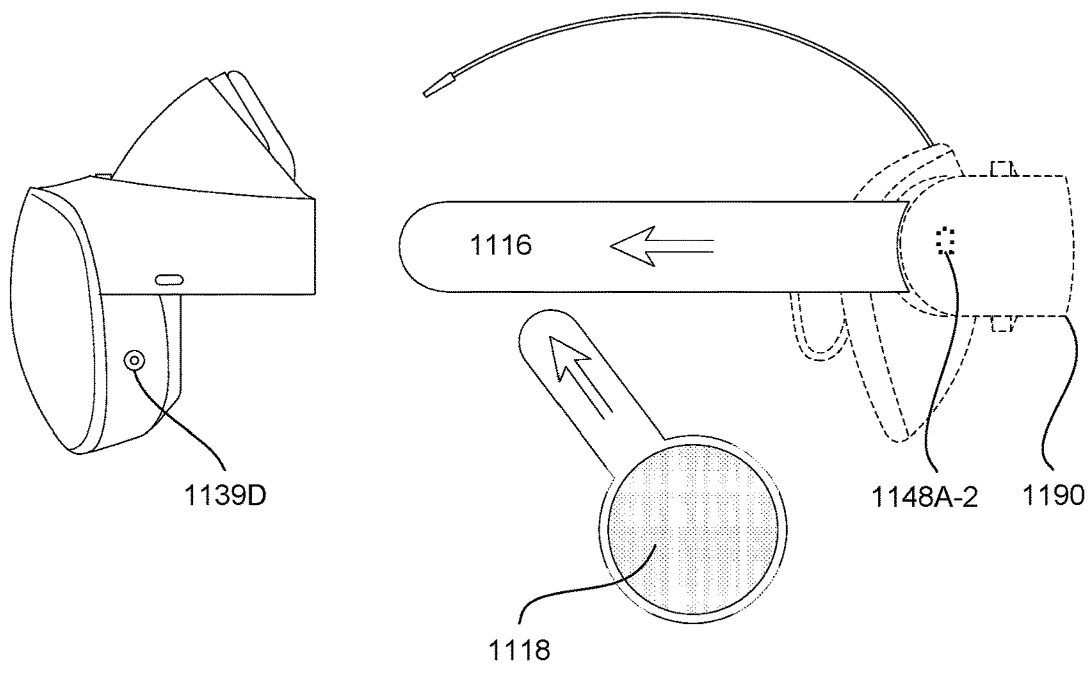
Figure 11C:
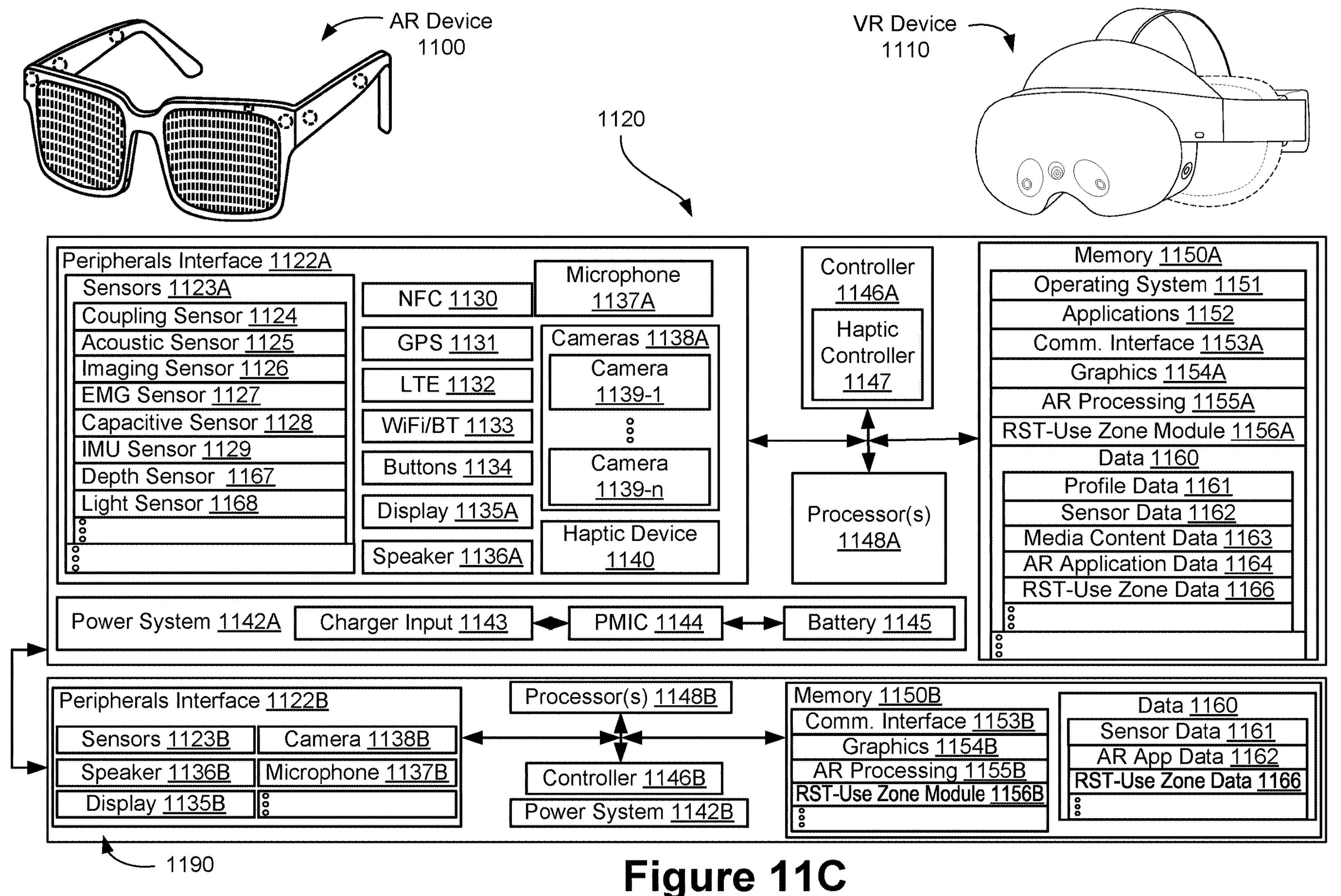

FIGS. 11A-11C show example head-wearable devices, in accordance with some embodiments. Head-wearable devices can include, but are not limited to, AR devices 1100 (e.g., AR or smart eyewear devices, such as smart glasses, smart monocles, smart contacts, etc.), VR devices 1110 (e.g., VR headsets, head-mounted displays (HMD) s, etc.), or other ocularly coupled devices. The AR devices 1110 and the VR devices 1110 are instances of the head-wearable devices 110 described in reference to FIGS. 1A-8C herein, such that the head-wearable device 110 should be understood to have the features of the AR devices 1100 and/or the VR devices 1110, and vice versa. The AR devices 1100 and the VR devices 1110 can perform various functions and/or operations associated with navigating through user interfaces and selectively opening applications, as well as the functions and/or operations described above with reference to FIGS. 1A-8C.

In some embodiments, an AR system (e.g., AR systems 900*a*-900*d*; FIGS. 9A-9D-2) includes an AR device 1100 (as shown in FIG. 11A) and/or VR device 1110 (as shown in FIGS. 11B-1-B-2). In some embodiments, the AR device 1100 and the VR device 1110 can include one or more analogous components (e.g., components for presenting interactive artificial-reality environments, such as processors, memory, and/or presentation devices, including one or more displays and/or one or more waveguides), some of which are described in more detail with respect to FIG. 11C. The head-wearable devices can use display projectors (e.g., display projector assemblies 1107A and 1107B) and/or waveguides for projecting representations of data to a user. Some embodiments of head-wearable devices do not include displays.

FIG. 11A shows an example visual depiction of the AR device 1100 (e.g., which may also be described herein as augmented-reality glasses, and/or smart glasses). The AR device 1100 can work in conjunction with additional electronic components that are not shown in FIGS. 11A, such as a wearable accessory device and/or an intermediary processing device, in electronic communication or otherwise configured to be used in conjunction with the AR device 1100. In some embodiments, the wearable accessory device and/or the intermediary processing device may be configured to couple with the AR device 1100 via a coupling mechanism in electronic communication with a coupling sensor 1124, where the coupling sensor 1124 can detect when an electronic device becomes physically or electronically coupled with the AR device 1100. In some embodiments, the AR device 1100 can be configured to couple to a housing (e.g., a portion of frame 1104 or temple arms 1105), which may include one or more additional coupling mechanisms configured to couple with additional accessory devices. The components shown in FIG. 11A can be implemented in hardware, software, firmware, or a combination thereof, including one or more signal-processing components and/or application-specific integrated circuits (ASICs).

The AR device 1100 includes mechanical glasses components, including a frame 1104 configured to hold one or more lenses (e.g., one or both lenses 1106-1 and 1106-2). One of ordinary skill in the art will appreciate that the AR device 1100 can include additional mechanical components, such as hinges configured to allow portions of the frame 1104 of the AR device 1100 to be folded and unfolded, a bridge configured to span the gap between the lenses 1106-1 and 1106-2 and rest on the user's nose, nose pads configured to rest on the bridge of the nose and provide support for the AR device 1100, earpieces configured to rest on the user's ears and provide additional support for the AR device 1100, temple arms 1105 configured to extend from the hinges to the earpieces of the AR device 1100, and the like. One of ordinary skill in the art will further appreciate that some examples of the AR device 1100 can include none of the mechanical components described herein. For example, smart contact lenses configured to present artificial-reality to users may not include any components of the AR device 1100.

The lenses 1106-1 and 1106-2 can be individual displays or display devices (e.g., a waveguide for projected representations). The lenses 1106-1 and 1106-2 may act together or independently to present an image or series of images to a user. In some embodiments, the lenses 1106-1 and 1106-2 can operate in conjunction with one or more display projector assemblies 1107A and 1107B to present image data to a user. While the AR device 1100 includes two displays, embodiments of this disclosure may be implemented in AR devices with a single near-eye display (NED) or more than two NEDs.

The AR device 1100 includes electronic components, many of which will be described in more detail below with respect to FIG. 11C. Some example electronic components are illustrated in FIG. 11A, including sensors 1123-1, 1123-2, 1123-3, 1123-4, 1123-5, and 1123-6, which can be distributed along a substantial portion of the frame 1104 of the AR device 1100. The different types of sensors are described below in reference to FIG. 11C. The AR device 1100 also includes a left camera 1139A and a right camera 1139B, which are located on different sides of the frame 1104. And the eyewear device includes one or more processors 1148A and 1148B (e.g., an integral microprocessor, such as an ASIC) that is embedded into a portion of the frame 1104.

FIGS. 11B-1 and 11B-2 show an example visual depiction of the VR device 1110 (e.g., a head-mounted display (HMD) 1112, also referred to herein as an artificial-reality headset, a head-wearable device, a VR headset, etc.). The HMD 1112 includes a front body 1114 and a frame 1116 (e.g., a strap or band) shaped to fit around a user's head. In some embodiments, the front body 1114 and/or the frame 1116 includes one or more electronic elements for facilitating presentation of and/or interactions with an AR and/or VR system (e.g., displays, processors (e.g., processor 1148A-1), IMUs, tracking emitter or detectors, sensors, etc.). In some embodiments, the HMD 1112 includes output audio transducers (e.g., an audio transducer 1118-1), as shown in FIG. 11B-2. In some embodiments, one or more components, such as the output audio transducer(s) 1118 and the frame 1116, can be configured to attach and detach (e.g., are detachably attachable) to the HMD 1112 (e.g., a portion or all of the frame 1116, and/or the output audio transducer 1118), as shown in FIG. 11B-2. In some embodiments, coupling a detachable component to the HMD 1112 causes the detachable component to come into electronic communication with the HMD 1112. The VR device 1110 includes electronic components, many of which will be described in more detail below with respect to FIG. 11C FIG. 11B-1 to 11B-2 also show that the VR device 1110 one or more cameras, such as the left camera 1139A and the right camera 1139B, which can be analogous to the left and right cameras on the frame 1104 of the AR device 1100. In some embodiments, the VR device 1110 includes one or more additional cameras (e.g., cameras 1139C and 1139D), which can be configured to augment image data obtained by the cameras 1139A and 1139B by providing more information. For example, the camera 1139C can be used to supply color information that is not discerned by cameras 1139A and 1139B. In some embodiments, one or more of the cameras 1139A to 1139D can include an optional IR cut filter configured to remove IR light from being received at the respective camera sensors.

The VR device 1110 can include a housing 1190 storing one or more components of the VR device 1110 and/or additional components of the VR device 1110. The housing 1190 can be a modular electronic device configured to couple with the VR device 1110 (or an AR device 1100) and supplement and/or extend the capabilities of the VR device 1110 (or an AR device 1100). For example, the housing 1190 can include additional sensors, cameras, power sources, processors (e.g., processor 1148A-2), etc. to improve and/or increase the functionality of the VR device 1110. Examples of the different components included in the housing 1190 are described below in reference to FIG. 11C.

Alternatively or in addition, in some embodiments, the head-wearable device, such as the VR device 1110 and/or the AR device 1100), includes, or is communicatively coupled to, another external device (e.g., a paired device), such as an HIPD 1200 (discussed below in reference to FIGS. 12A-12B) and/or an optional neckband. The optional neckband can couple to the head-wearable device via one or more connectors (e.g., wired or wireless connectors). The head-wearable device and the neckband can operate independently without any wired or wireless connection between them. In some embodiments, the components of the head-wearable device and the neckband are located on one or more additional peripheral devices paired with the head-wearable device, the neckband, or some combination thereof. Furthermore, the neckband is intended to represent any suitable type or form of paired device. Thus, the following discussion of neckband may also apply to various other paired devices, such as smart watches, smart phones, wrist bands, other wearable devices, hand-held controllers, tablet computers, or laptop computers.

In some situations, pairing external devices, such as an intermediary processing device (e.g., an HIPD device 1200, an optional neckband, and/or wearable accessory device) with the head-wearable devices (e.g., an AR device 1100 and/or VR device 1110) enables the head-wearable devices to achieve a similar form factor of a pair of glasses while still providing sufficient battery and computation power for expanded capabilities. Some, or all, of the battery power, computational resources, and/or additional features of the head-wearable devices can be provided by a paired device or shared between a paired device and the head-wearable devices, thus reducing the weight, heat profile, and form factor of the head-wearable devices overall while allowing the head-wearable devices to retain its desired functionality. For example, the intermediary processing device (e.g., the HIPD 1200) can allow components that would otherwise be included in a head-wearable device to be included in the intermediary processing device (and/or a wearable device or accessory device), thereby shifting a weight load from the user's head and neck to one or more other portions of the user's body. In some embodiments, the intermediary processing device has a larger surface area over which to diffuse and disperse heat to the ambient environment. Thus, the intermediary processing device can allow for greater battery and computation capacity than might otherwise have been possible on the head-wearable devices, standing alone. Because weight carried in the intermediary processing device can be less invasive to a user than weight carried in the head-wearable devices, a user may tolerate wearing a lighter eyewear device and carrying or wearing the paired device for greater lengths of time than the user would tolerate wearing a heavier eyewear device standing alone, thereby enabling an artificial-reality environment to be incorporated more fully into a user's day-to-day activities.

In some embodiments, the intermediary processing device is communicatively coupled with the head-wearable device and/or to other devices. The other devices may provide certain functions (e.g., tracking, localizing, depth mapping, processing, storage, etc.) to the head-wearable device. In some embodiments, the intermediary processing device includes a controller and a power source. In some embodiments, sensors of the intermediary processing device are configured to sense additional data that can be shared with the head-wearable devices in an electronic format (analog or digital).

The controller of the intermediary processing device processes information generated by the sensors on the intermediary processing device and/or the head-wearable devices. The intermediary processing device, like an HIPD 1200, can process information generated by one or more sensors of its sensors and/or information provided by other communicatively coupled devices. For example, a head-wearable device can include an IMU, and the intermediary processing device (neckband and/or an HIPD 1200) can compute all inertial and spatial calculations from the IMUs located on the head-wearable device. Additional examples of processing performed by a communicatively coupled device, such as the HIPD 1200, are provided below in reference to FIGS. 12A and 12B.

Artificial-reality systems may include a variety of types of visual feedback mechanisms. For example, display devices in the AR devices 1100 and/or the VR devices 1110 may include one or more liquid-crystal displays (LCDs), light emitting diode (LED) displays, organic LED (OLED) displays, and/or any other suitable type of display screen. Artificial-reality systems may include a single display screen for both eyes or may provide a display screen for each eye, which may allow for additional flexibility for varifocal adjustments or for correcting a refractive error associated with the user's vision. Some artificial-reality systems also include optical subsystems having one or more lenses (e.g., conventional concave or convex lenses, Fresnel lenses, or adjustable liquid lenses) through which a user may view a display screen. In addition to or instead of using display screens, some artificial-reality systems include one or more projection systems. For example, display devices in the AR device 1100 and/or the VR device 1110 may include micro-LED projectors that project light (e.g., using a waveguide) into display devices, such as clear combiner lenses that allow ambient light to pass through. The display devices may refract the projected light toward a user's pupil and may enable a user to simultaneously view both artificial-reality content and the real world. Artificial-reality systems may also be configured with any other suitable type or form of image projection system. As noted, some AR systems may, instead of blending an artificial reality with actual reality, substantially replace one or more of a user's sensory perceptions of the real world with a virtual experience.

While the example head-wearable devices are respectively described herein as the AR device 1100 and the VR device 1110, either or both of the example head-wearable devices described herein can be configured to present fully-immersive VR scenes presented in substantially all of a user's field of view, additionally or alternatively to, subtler augmented-reality scenes that are presented within a portion, less than all, of the user's field of view.

In some embodiments, the AR device 1100 and/or the VR device 1110 can include haptic feedback systems. The haptic feedback systems may provide various types of cutaneous feedback, including vibration, force, traction, shear, texture, and/or temperature. The haptic feedback systems may also provide various types of kinesthetic feedback, such as motion and compliance. The haptic feedback can be implemented using motors, piezoelectric actuators, fluidic systems, and/or a variety of other types of feedback mechanisms. The haptic feedback systems may be implemented independently of other artificial-reality devices, within other artificial-reality devices, and/or in conjunction with other artificial-reality devices (e.g., wrist-wearable devices which may be incorporated into headwear, gloves, body suits, handheld controllers, environmental devices (e.g., chairs or floormats), and/or any other type of device or system, such as a wrist-wearable device 1000, an HIPD 1200, etc.), and/or other devices described herein.

FIG. 11C illustrates a computing system 1120 and an optional housing 1190, each of which show components that can be included in a head-wearable device (e.g., the AR device 1100 and/or the VR device 1110). In some embodiments, more or less components can be included in the optional housing 1190 depending on practical restraints of the respective head-wearable device being described. Additionally or alternatively, the optional housing 1190 can include additional components to expand and/or augment the functionality of a head-wearable device.

In some embodiments, the computing system 1120 and/or the optional housing 1190 can include one or more peripheral interfaces 1122A and 1122B, one or more power systems 1142A and 1142B (including charger input 1143, PMIC 1144, and battery 1145), one or more controllers 1146A 1146B (including one or more haptic controllers 1147), one or more processors 1148A and 1148B (as defined above, including any of the examples provided), and memory 1150A and 1150B, which can all be in electronic communication with each other. For example, the one or more processors 1148A and/or 1148B can be configured to execute instructions stored in the memory 1150A and/or 1150B, which can cause a controller of the one or more controllers 1146A and/or 1146B to cause operations to be performed at one or more peripheral devices of the peripherals interfaces 1122A and/or 1122B. In some embodiments, each operation described can occur based on electrical power provided by the power system 1142A and/or 1142B.

In some embodiments, the peripherals interface 1122A can include one or more devices configured to be part of the computing system 1120, many of which have been defined above and/or described with respect to wrist-wearable devices shown in FIGS. 10A and 10B. For example, the peripherals interface can include one or more sensors 1123A. Some example sensors include: one or more coupling sensors 1124, one or more acoustic sensors 1125, one or more imaging sensors 1126, one or more EMG sensors 1127, one or more capacitive sensors 1128, and/or one or more IMU sensors 1129. In some embodiments, the sensors 1123A further include depth sensors 1167, light sensors 1168 and/or any other types of sensors defined above or described with respect to any other embodiments discussed herein.

In some embodiments, the peripherals interface can include one or more additional peripheral devices, including one or more NFC devices 1130, one or more GPS devices 1131, one or more LTE devices 1132, one or more WiFi and/or Bluetooth devices 1133, one or more buttons 1134 (e.g., including buttons that are slidable or otherwise adjustable), one or more displays 1135A, one or more speakers 1136A, one or more microphones 1137A, one or more cameras 1138A (e.g., including the a first camera 1139-1 through nth camera 1139-*n*, which are analogous to the left camera 1139A and/or the right camera 1139B), one or more haptic devices 1140; and/or any other types of peripheral devices defined above or described with respect to any other embodiments discussed herein.

The head-wearable devices can include a variety of types of visual feedback mechanisms (e.g., presentation devices). For example, display devices in the AR device 1100 and/or the VR device 1110 can include one or more liquid-crystal displays (LCDs), light emitting diode (LED) displays, organic LED (OLED) displays, micro-LEDs, and/or any other suitable types of display screens. The head-wearable devices can include a single display screen (e.g., configured to be seen by both eyes), and/or can provide separate display screens for each eye, which can allow for additional flexibility for varifocal adjustments and/or for correcting a refractive error associated with the user's vision. Some embodiments of the head-wearable devices also include optical subsystems having one or more lenses (e.g., conventional concave or convex lenses, Fresnel lenses, or adjustable liquid lenses) through which a user can view a display screen. For example, respective displays 1135A can be coupled to each of the lenses 1106-1 and 1106-2 of the AR device 1100. The displays 1135A coupled to each of the lenses 1106-1 and 1106-2 can act together or independently to present an image or series of images to a user. In some embodiments, the AR device 1100 and/or the VR device 1110 includes a single display 1135A (e.g., a near-eye display) or more than two displays 1135A.

In some embodiments, a first set of one or more displays 1135A can be used to present an augmented-reality environment, and a second set of one or more display devices 1135A can be used to present a virtual-reality environment. In some embodiments, one or more waveguides are used in conjunction with presenting artificial-reality content to the user of the AR device 1100 and/or the VR device 1110 (e.g., as a means of delivering light from a display projector assembly and/or one or more displays 1135A to the user's eyes). In some embodiments, one or more waveguides are fully or partially integrated into the AR device 1100 and/or the VR device 1110. Additionally, or alternatively to display screens, some artificial-reality systems include one or more projection systems. For example, display devices in the AR device 1100 and/or the VR device 1110 can include micro-LED projectors that project light (e.g., using a waveguide) into display devices, such as clear combiner lenses that allow ambient light to pass through. The display devices can refract the projected light toward a user's pupil and can enable a user to simultaneously view both artificial-reality content and the real world. The head-wearable devices can also be configured with any other suitable type or form of image projection system. In some embodiments, one or more waveguides are provided additionally or alternatively to the one or more display(s) 1135A.

In some embodiments of the head-wearable devices, ambient light and/or a real-world live view (e.g., a live feed of the surrounding environment that a user would normally see) can be passed through a display element of a respective head-wearable device presenting aspects of the AR system. In some embodiments, ambient light and/or the real-world live view can be passed through a portion less than all, of an AR environment presented within a user's field of view (e.g., a portion of the AR environment co-located with a physical object in the user's real-world environment that is within a designated boundary (e.g., a guardian boundary) configured to be used by the user while they are interacting with the AR environment). For example, a visual user interface element (e.g., a notification user interface element) can be presented at the head-wearable devices, and an amount of ambient light and/or the real-world live view (e.g., 15-50% of the ambient light and/or the real-world live view) can be passed through the user interface element, such that the user can distinguish at least a portion of the physical environment over which the user interface element is being displayed.

The head-wearable devices can include one or more external displays 1135A for presenting information to users. For example, an external display 1135A can be used to show a current battery level, network activity (e.g., connected, disconnected, etc.), current activity (e.g., playing a game, in a call, in a meeting, watching a movie, etc.), and/or other relevant information. In some embodiments, the external displays 1135A can be used to communicate with others. For example, a user of the head-wearable device can cause the external displays 1135A to present a do not disturb notification. The external displays 1135A can also be used by the user to share any information captured by the one or more components of the peripherals interface 1122A and/or generated by head-wearable device (e.g., during operation and/ or performance of one or more applications).

The memory 1150A can include instructions and/or data executable by one or more processors 1148A (and/or processors 1148B of the housing 1190) and/or a memory controller of the one or more controllers 1146A (and/or controller 1146B of the housing 1190). The memory 1150A can include one or more operating systems 1151; one or more applications 1152; one or more communication interface modules 1153A; one or more graphics modules 1154A; one or more AR processing modules 1155A (analogous to AR processing module 1092; FIG. 10B); one or more restricted-use zone modules 1156A (analogous to restricted-use zone module 1093A; FIG. 10B), and/or any other types of modules defined above or described with respect to any other embodiments discussed herein. For example, the software components stored in the memory 1150A can also include one or more modules or components configured to perform the features described above in reference to FIGS. 1A-8C.

The data 1160 stored in memory 1150A can be used in conjunction with one or more of the applications and/or programs discussed above. The data 1160 can include profile data 1161; sensor data 1162; media content data 1163; AR application data 1164; AR processing data; restricted-use zone data 1166 (analogous to restricted-use zone data 1099; FIG. 10B); and/or any other types of data defined above or described with respect to any other embodiments discussed herein.

In some embodiments, the controller 1146A of the head-wearable devices processes information generated by the sensors 1123A on the head-wearable devices and/or another component of the head-wearable devices and/or communicatively coupled with the head-wearable devices (e.g., components of the housing 1190, such as components of peripherals interface 1122B). For example, the controller 1146A can process information from the acoustic sensors 1125 and/or image sensors 1126. For each detected sound, the controller 1146A can perform a direction of arrival (DOA) estimation to estimate a direction from which the detected sound arrived at a head-wearable device. As one or more of the acoustic sensors 1125 detects sounds, the controller 1146A can populate an audio data set with the information (e.g., represented by sensor data 1162).

In some embodiments, a physical electronic connector can convey information between the head-wearable devices and another electronic device, and/or between one or more processors 1148A of the head-wearable devices and the controller 1146A. The information can be in the form of optical data, electrical data, wireless data, or any other transmittable data form. Moving the processing of information generated by the head-wearable devices to an intermediary processing device can reduce weight and heat in the eyewear device, making it more comfortable and safer for a user. In some embodiments, an optional wearable accessory device (e.g., an electronic neckband or an HIPD 1200) is coupled to the head-wearable devices via one or more connectors. The connectors can be wired or wireless connectors and can include electrical and/or non-electrical (e.g., structural) components. In some embodiments, the head-wearable devices and the wearable accessory device can operate independently without any wired or wireless connection between them.

The head-wearable devices can include various types of computer vision components and subsystems. For example, the AR device 1100 and/or the VR device 1110 can include one or more optical sensors such as two-dimensional (2D) or three-dimensional (3D) cameras, time-of-flight depth sensors, single-beam or sweeping laser rangefinders, 3D LiDAR sensors, and/or any other suitable type or form of optical sensor. A head-wearable device can process data from one or more of these sensors to identify a location of a user and/or aspects of the use's real-world physical surroundings, including the locations of real-world objects within the real-world physical surroundings. In some embodiments, the methods described herein are used to map the real world, to provide a user with context about real-world surroundings, and/or to generate interactable virtual objects (which can be replicas or digital twins of real-world objects that can be interacted with in AR environment), among a variety of other functions. For example, FIGS. 11B-1 and 11B-2 show the VR device 1110 having cameras 1139A-1139D, which can be used to provide depth information for creating a voxel field and a two-dimensional mesh to provide object information to the user to avoid collisions.

The optional housing 1190 can include analogous components to those describe above with respect to the computing system 1120. For example, the optional housing 1190 can include a respective peripherals interface 1122B including more or less components to those described above with respect to the peripherals interface 1122A. As described above, the components of the optional housing 1190 can be used augment and/or expand on the functionality of the head-wearable devices. For example, the optional housing 1190 can include respective sensors 1123B, speakers 1136B, displays 1135B, microphones 1137B, cameras 1138B, and/ or other components to capture and/or present data. Similarly, the optional housing 1190 can include one or more processors 1148B, controllers 1146B, and/or memory 1150B (including respective communication interface modules 1153B; one or more graphics modules 1154B; one or more AR processing modules 1155B, one or more restricted-use zone modules 1156B; etc.) that can be used individually and/or in conjunction with the components of the computing system 1120.

The techniques described above in FIGS. 11A-11C can be used with different head-wearable devices. In some embodiments, the head-wearable devices (e.g., the AR device 1100 and/or the VR device 1110) can be used in conjunction with one or more wearable device such as a wrist-wearable device 1000 (or components thereof). Having thus described example the head-wearable devices, attention will now be turned to example handheld intermediary processing devices, such as HIPD 1200.

Example Handheld Intermediary Processing Devices

Figure 12B:
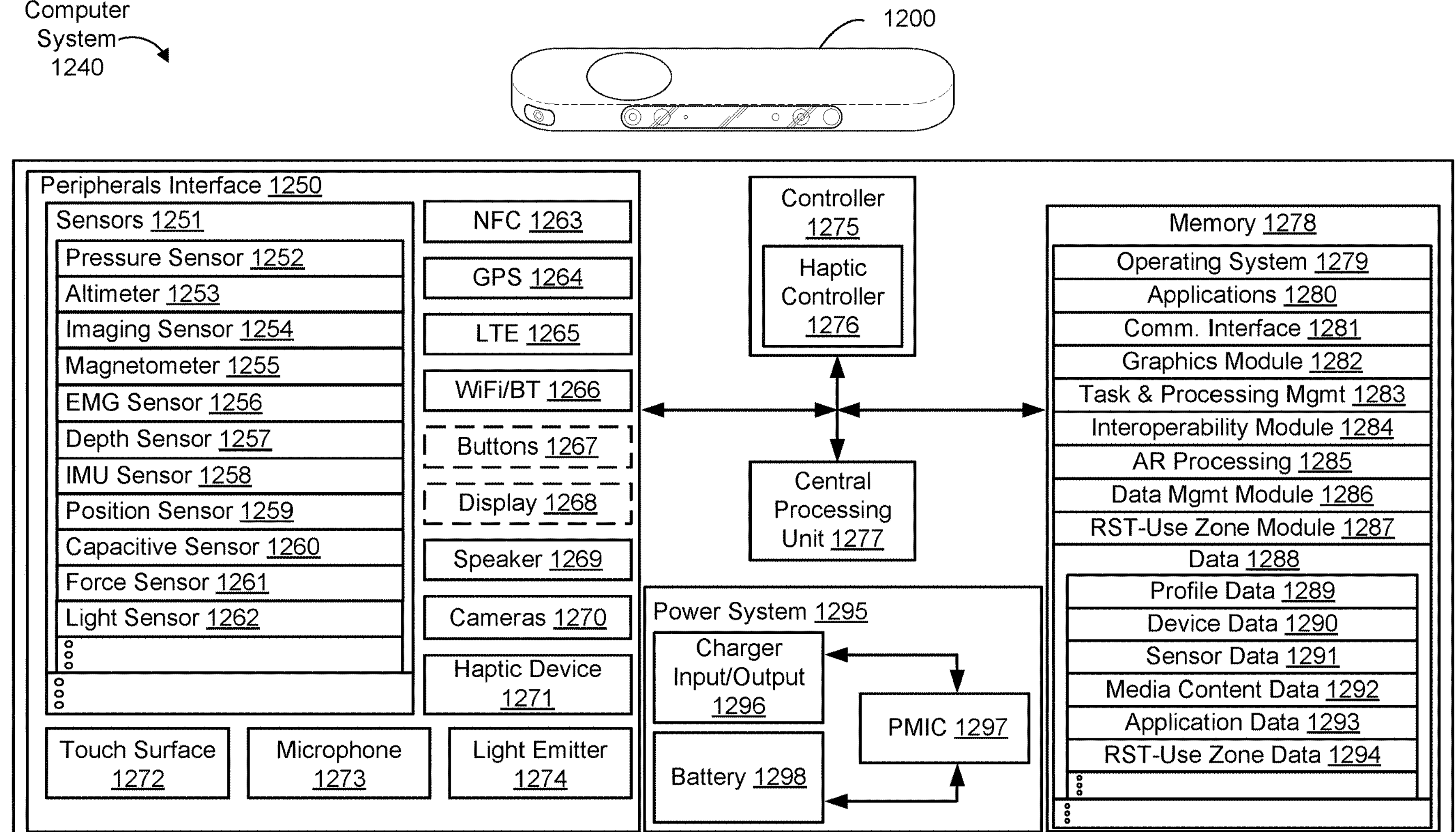

FIGS. 12A and 12B illustrate an example handheld intermediary processing device (HIPD) 1200, in accordance with some embodiments. The HIPD 1200 is an instance of the intermediary device described herein, such that the HIPD 1200 should be understood to have the features described with respect to any intermediary device defined above or otherwise described herein, and vice versa. The HIPD 1200 can perform various functions and/or operations associated with navigating through user interfaces and selectively opening applications, as well as the functions and/or operations described above with reference to FIGS. 1A-9C-2.

FIG. 12A shows a top view 1205 and a side view 1225 of the HIPD 1200. The HIPD 1200 is configured to communicatively couple with one or more wearable devices (or other electronic devices) associated with a user. For example, the HIPD 1200 is configured to communicatively couple with a user's wrist-wearable device 1000 (or components thereof, such as the watch body 1020 and the wearable band 1010), AR device 1100, and/or VR device 1110. The HIPD 1200 can be configured to be held by a user (e.g., as a handheld controller), carried on the user's person (e.g., in their pocket, in their bag, etc.), placed in proximity of the user (e.g., placed on their desk while seated at their desk, on a charging dock, etc.), and/or placed at or within a predetermined distance from a wearable device or other electronic device (e.g., where, in some embodiments, the predetermined distance is the maximum distance (e.g., 10 meters) at which the HIPD 1200 can successfully be communicatively coupled with an electronic device, such as a wearable device).

The HIPD 1200 can perform various functions independently and/or in conjunction with one or more wearable devices (e.g., wrist-wearable device 1000, AR device 1100, VR device 1110, etc.). The HIPD 1200 is configured to increase and/or improve the functionality of communicatively coupled devices, such as the wearable devices. The HIPD 1200 is configured to perform one or more functions or operations associated with interacting with user interfaces and applications of communicatively coupled devices, interacting with an AR environment, interacting with VR environment, and/or operating as a human-machine interface controller, as well as functions and/or operations described above with reference to FIGS. 1-6. Additionally, as will be described in more detail below, functionality and/or operations of the HIPD 1200 can include, without limitation, task offloading and/or handoffs; thermals offloading and/or handoffs; 6 degrees of freedom (6DoF) raycasting and/or gaming (e.g., using imaging devices or cameras 1214A and 1214B, which can be used for simultaneous localization and mapping (SLAM) and/or with other image processing techniques); portable charging; messaging; image capturing via one or more imaging devices or cameras (e.g., cameras 1222A and 1222B); sensing user input (e.g., sensing a touch on a multi-touch input surface 1202); wireless communications and/or interlining (e.g., cellular, near field, Wi-Fi, personal area network, etc.); location determination; financial transactions; providing haptic feedback; alarms; notifications; biometric authentication; health monitoring; sleep monitoring; etc. The above-example functions can be executed independently in the HIPD 1200 and/or in communication between the HIPD 1200 and another wearable device described herein. In some embodiments, functions can be executed on the HIPD 1200 in conjunction with an AR environment. As the skilled artisan will appreciate upon reading the descriptions provided herein, the novel the HIPD 1200 described herein can be used with any type of suitable AR environment.

While the HIPD 1200 is communicatively coupled with a wearable device and/or other electronic device, the HIPD 1200 is configured to perform one or more operations initiated at the wearable device and/or the other electronic device. In particular, one or more operations of the wearable device and/or the other electronic device can be offloaded to the HIPD 1200 to be performed. The HIPD 1200 performs the one or more operations of the wearable device and/or the other electronic device and provides to data corresponded to the completed operations to the wearable device and/or the other electronic device. For example, a user can initiate a video stream using AR device 1100 and back-end tasks associated with performing the video stream (e.g., video rendering) can be offloaded to the HIPD 1200, which the HIPD 1200 performs and provides corresponding data to the AR device 1100 to perform remaining front-end tasks associated with the video stream (e.g., presenting the rendered video data via a display of the AR device 1100). In this way, the HIPD 1200, which has more computational resources and greater thermal headroom than a wearable device, can perform computationally intensive tasks for the wearable device improving performance of an operation performed by the wearable device.

The HIPD 1200 includes a multi-touch input surface 1202 on a first side (e.g., a front surface) that is configured to detect one or more user inputs. In particular, the multi-touch input surface 1202 can detect single tap inputs, multi-tap inputs, swipe gestures and/or inputs, force-based and/or pressure-based touch inputs, held taps, and the like. The multi-touch input surface 1202 is configured to detect capacitive touch inputs and/or force (and/or pressure) touch inputs. The multi-touch input surface 1202 includes a first touch-input surface 1204 defined by a surface depression, and a second touch-input surface 1206 defined by a substantially planar portion. The first touch-input surface 1204 can be disposed adjacent to the second touch-input surface 1206. In some embodiments, the first touch-input surface 1204 and the second touch-input surface 1206 can be different dimensions, shapes, and/or cover different portions of the multi-touch input surface 1202. For example, the first touch-input surface 1204 can be substantially circular and the second touch-input surface 1206 is substantially rectangular. In some embodiments, the surface depression of the multi-touch input surface 1202 is configured to guide user handling of the HIPD 1200. In particular, the surface depression is configured such that the user holds the HIPD 1200 upright when held in a single hand (e.g., such that the using imaging devices or cameras 1214A and 1214B are pointed toward a ceiling or the sky). Additionally, the surface depression is configured such that the user's thumb rests within the first touch-input surface 1204.

In some embodiments, the different touch-input surfaces include a plurality of touch-input zones. For example, the second touch-input surface 1206 includes at least a first touch-input zone 1208 within a second touch-input zone 1206 and a third touch-input zone 1210 within the first touch-input zone 1208. In some embodiments, one or more of the touch-input zones are optional and/or user defined (e.g., a user can specific a touch-input zone based on their preferences). In some embodiments, each touch-input surface and/or touch-input zone is associated with a predetermined set of commands. For example, a user input detected within the first touch-input zone 1208 causes the HIPD 1200 to perform a first command and a user input detected within the second touch-input zone 1206 causes the HIPD 1200 to perform a second command, distinct from the first. In some embodiments, different touch-input surfaces and/or touch-input zones are configured to detect one or more types of user inputs. The different touch-input surfaces and/or touch-input zones can be configured to detect the same or distinct types of user inputs. For example, the first touch-input zone 1208 can be configured to detect force touch inputs (e.g., a magnitude at which the user presses down) and capacitive touch inputs, and the second touch-input zone 1206 can be configured to detect capacitive touch inputs.

The HIPD 1200 includes one or more sensors 1251 for sensing data used in the performance of one or more operations and/or functions. For example, the HIPD 1200 can include an IMU sensor that is used in conjunction with cameras 1214 for 3-dimensional object manipulation (e.g., enlarging, moving, destroying, etc. an object) in an AR or VR environment. Non-limiting examples of the sensors 1251 included in the HIPD 1200 include a light sensor, a magnetometer, a depth sensor, a pressure sensor, and a force sensor. Additional examples of the sensors 1251 are provided below in reference to FIG. 12B.

The HIPD 1200 can include one or more light indicators 1212 to provide one or more notifications to the user. In some embodiments, the light indicators are LEDs or other types of illumination devices. The light indicators 1212 can operate as a privacy light to notify the user and/or others near the user that an imaging device and/or microphone are active. In some embodiments, a light indicator is positioned adjacent to one or more touch-input surfaces. For example, a light indicator can be positioned around the first touch-input surface 1204. The light indicators can be illuminated in different colors and/or patterns to provide the user with one or more notifications and/or information about the device. For example, a light indicator positioned around the first touch-input surface 1204 can flash when the user receives a notification (e.g., a message), change red when the HIPD 1200 is out of power, operate as a progress bar (e.g., a light ring that is closed when a task is completed (e.g., 0% to 100%)), operates as a volume indicator, etc.).

In some embodiments, the HIPD 1200 includes one or more additional sensors on another surface. For example, as shown FIG. 12A, HIPD 1200 includes a set of one or more sensors (e.g., sensor set 1220) on an edge of the HIPD 1200. The sensor set 1220, when positioned on an edge of the of the HIPD 1200, can be pe positioned at a predetermined tilt angle (e.g., 26 degrees), which allows the sensor set 1220 to be angled toward the user when placed on a desk or other flat surface. Alternatively, in some embodiments, the sensor set 1220 is positioned on a surface opposite the multi-touch input surface 1202 (e.g., a back surface). The one or more sensors of the sensor set 1220 are discussed in detail below.

The side view 1225 of the of the HIPD 1200 shows the sensor set 1220 and camera 1214B. The sensor set 1220 includes one or more cameras 1222A and 1222B, a depth projector 1224, an ambient light sensor 1228, and a depth receiver 1230. In some embodiments, the sensor set 1220 includes a light indicator 1226. The light indicator 1226 can operate as a privacy indicator to let the user and/or those around them know that a camera and/or microphone is active. The sensor set 1220 is configured to capture a user's facial expression such that the user can puppet a custom avatar (e.g., showing emotions, such as smiles, laughter, etc., on the avatar or a digital representation of the user). The sensor set 1220 can be configured as a side stereo RGB system, a rear indirect Time-of-Flight (iToF) system, or a rear stereo RGB system. As the skilled artisan will appreciate upon reading the descriptions provided herein, the novel HIPD 1200 described herein can use different sensor set 1220 configurations and/or sensor set 1220 placement.

In some embodiments, the HIPD 1200 includes one or more haptic devices 1271 (FIG. 12B; e.g., a vibratory haptic actuator) that are configured to provide haptic feedback (e.g., kinesthetic sensation). The sensors 1251, and/or the haptic devices 1271 can be configured to operate in conjunction with multiple applications and/or communicatively coupled devices including, without limitation, a wearable devices, health monitoring applications, social media applications, game applications, and artificial reality applications (e.g., the applications associated with artificial reality).

The HIPD 1200 is configured to operate without a display. However, in optional embodiments, the HIPD 1200 can include a display 1268 (FIG. 12B). The HIPD 1200 can also income one or more optional peripheral buttons 1267 (FIG. 12B). For example, the peripheral buttons 1267 can be used to turn on or turn off the HIPD 1200. Further, the HIPD 1200 housing can be formed of polymers and/or elastomer elastomers. The HIPD 1200 can be configured to have a non-slip surface to allow the HIPD 1200 to be placed on a surface without requiring a user to watch over the HIPD 1200. In other words, the HIPD 1200 is designed such that it would not easily slide off a surfaces. In some embodiments, the HIPD 1200 include one or magnets to couple the HIPD 1200 to another surface. This allows the user to mount the HIPD 1200 to different surfaces and provide the user with greater flexibility in use of the HIPD 1200.

As described above, the HIPD 1200 can distribute and/or provide instructions for performing the one or more tasks at the HIPD 1200 and/or a communicatively coupled device. For example, the HIPD 1200 can identify one or more back-end tasks to be performed by the HIPD 1200 and one or more front-end tasks to be performed by a communicatively coupled device. While the HIPD 1200 is configured to offload and/or handoff tasks of a communicatively coupled device, the HIPD 1200 can perform both back-end and front-end tasks (e.g., via one or more processors, such as CPU 1277; FIG. 12B). The HIPD 1200 can, without limitation, can be used to perform augmenting calling (e.g., receiving and/or sending 3D or 2.5D live volumetric calls, live digital human representation calls, and/or avatar calls), discreet messaging, 6DoF portrait/landscape gaming, AR/VR object manipulation, AR/VR content display (e.g., presenting content via a virtual display), and/or other AR/VR interactions. The HIPD 1200 can perform the above operations alone or in conjunction with a wearable device (or other communicatively coupled electronic device).

FIG. 12B shows block diagrams of a computing system 1240 of the HIPD 1200, in accordance with some embodiments. The HIPD 1200, described in detail above, can include one or more components shown in HIPD computing system 1240. The HIPD 1200 will be understood to include the components shown and described below for the HIPD computing system 1240. In some embodiments, all, or a substantial portion of the components of the HIPD computing system 1240 are included in a single integrated circuit. Alternatively, in some embodiments, components of the HIPD computing system 1240 are included in a plurality of integrated circuits that are communicatively coupled.

The HIPD computing system 1240 can include a processor (e.g., a CPU 1277, a GPU, and/or a CPU with integrated graphics), a controller 1275, a peripherals interface 1250 that includes one or more sensors 1251 and other peripheral devices, a power source (e.g., a power system 1295), and memory (e.g., a memory 1278) that includes an operating system (e.g., an operating system 1279), data (e.g., data 1288), one or more applications (e.g., applications 1280), and one or more modules (e.g., a communications interface module 1281, a graphics module 1282, a task and processing management module 1283, an interoperability module 1284, an AR processing module 1285, a data management module 1286, etc.). The HIPD computing system 1240 further includes a power system 1295 that includes a charger input and output 1296, a PMIC 1297, and a battery 1298, all of which are defined above.

In some embodiments, the peripherals interface 1250 can include one or more sensors 1251. The sensors 1251 can include analogous sensors to those described above in reference to FIG. 10B. For example, the sensors 1251 can include imaging sensors 1254, (optional) EMG sensors 1256, IMU sensors 1258, and capacitive sensors 1260. In some embodiments, the sensors 1251 can include one or more pressure sensor 1252 for sensing pressure data, an altimeter 1253 for sensing an altitude of the HIPD 1200, a magnetometer 1255 for sensing a magnetic field, a depth sensor 1257 (or a time-of flight sensor) for determining a difference between the camera and the subject of an image, a position sensor 1259 (e.g., a flexible position sensor) for sensing a relative displacement or position change of a portion of the HIPD 1200, a force sensor 1261 for sensing a force applied to a portion of the HIPD 1200, and a light sensor 1262 (e.g., an ambient light sensor) for detecting an amount of lighting. The sensors 1251 can include one or more sensors not shown in FIG. 12B.

Analogous to the peripherals described above in reference to FIGS. 10B, the peripherals interface 1250 can also include an NFC component 1263, a GPS component 1264, an LTE component 1265, a Wi-Fi and/or Bluetooth communication component 1266, a speaker 1269, a haptic device 1271, and a microphone 1273. As described above in reference to FIG. 12A, the HIPD 1200 can optionally include a display 1268 and/or one or more buttons 1267. The peripherals interface 1250 can further include one or more cameras 1270, touch surfaces 1272, and/or one or more light emitters 1274. The multi-touch input surface 1202 described above in reference to FIG. 12A is an example of touch surface 1272. The light emitters 1274 can be one or more LEDs, lasers, etc. and can be used to project or present information to a user. For example, the light emitters 1274 can include light indicators 1212 and 1226 described above in reference to FIG. 12A. The cameras 1270 (e.g., cameras 1214A, 1214B, and 1222 described above in FIG. 12A) can include one or more wide angle cameras, fish-eye cameras, spherical cameras, compound eye cameras (e.g., stereo and multi cameras), depth cameras, RGB cameras, ToF cameras, RGB-D cameras (depth and ToF cameras), and/or other available cameras. Cameras 1270 can be used for SLAM; 6 DoF ray casting, gaming, object manipulation, and/or other rendering; facial recognition and facial expression recognition, etc.

Similar to the watch body computing system 1060 and the watch band computing system 1030 described above in reference to FIG. 10B, the HIPD computing system 1240 can include one or more haptic controllers 1276 and associated componentry (e.g., haptic devices 1271) for providing haptic events at the HIPD 1200.

Memory 1278 can include high-speed random-access memory and/or non-volatile memory, such as one or more magnetic disk storage devices, flash memory devices, or other non-volatile solid-state memory devices. Access to the memory 1278 by other components of the HIPD 1200, such as the one or more processors and the peripherals interface 1250, can be controlled by a memory controller of the controllers 1275.

In some embodiments, software components stored in the memory 1278 include one or more operating systems 1279, one or more applications 1280, one or more communication interface modules 1281, one or more graphics modules 1282, one or more data management modules 1285, one or more AR processing modules 1285, one or more restricted-use zone modules 1287, which are analogous to the software components described above in reference to FIG. 10B. The software components stored in the memory 1278 can also include one or more components and/or modules configured to perform the features described above in reference to FIGS. 1A-8C.

In some embodiments, software components stored in the memory 1278 include a task and processing management module 1283 for identifying one or more front-end and back-end tasks associated with an operation performed by the user, performing one or more front-end and/or back-end tasks, and/or providing instructions to one or more communicatively coupled devices that cause performance of the one or more front-end and/or back-end tasks. In some embodiments, the task and processing management module 1283 uses data 1288 (e.g., device data 1290) to distribute the one or more front-end and/or back-end tasks based on communicatively coupled devices' computing resources, available power, thermal headroom, ongoing operations, and/or other factors. For example, the task and processing management module 1283 can cause the performance of one or more back-end tasks (of an operation performed at communicatively coupled AR device 1100) at the HIPD 1200 in accordance with a determination that the operation is utilizing a predetermined amount (e.g., at least 70%) of computing resources available at the AR device 1100.

In some embodiments, software components stored in the memory 1278 include an interoperability module 1284 for exchanging and utilizing information received and/or provided to distinct communicatively coupled devices. The interoperability module 1284 allows for different systems, devices, and/or applications to connect and communicate in a coordinated way without user input. In some embodiments, software components stored in the memory 1278 include an AR processing module 1285 that is configured to process signals based at least on sensor data for use in an AR and/or VR environment. For example, the AR processing module 1285 can be used for 3D object manipulation, gesture recognition, facial and facial expression, recognition, etc.

The memory 1278 can also include data 1287, including structured data. In some embodiments, the data 1287 can include profile data 1289, device data 1289 (including device data of one or more devices communicatively coupled with the HIPD 1200, such as device type, hardware, software, configurations, etc.), sensor data 1291, media content data 1292, application data 1293, AR processing data, restricted-use zone data 1294 (analogous to restricted-use zone data 1099; FIG. 10B) and which store data related to the performance of the features described above in reference to FIGS. 1A-9C-2.

It should be appreciated that the HIPD computing system 1240 is an example of a computing system within the HIPD 1200, and that the HIPD 1200 can have more or fewer components than shown in the HIPD computing system 1240, combine two or more components, and/or have a different configuration and/or arrangement of the components. The various components shown in HIPD computing system 1240 are implemented in hardware, software, firmware, or a combination thereof, including one or more signal processing and/or application-specific integrated circuits.

The techniques described above in FIG. 12A-12B can be used with any device used as a human-machine interface controller. In some embodiments, an HIPD 1200 can be used in conjunction with one or more wearable device such as a head-wearable device (e.g., AR device 1100 and VR device 1110) and/or a wrist-wearable device 1000 (or components thereof).

Any data collection performed by the devices described herein and/or any devices configured to perform or cause the performance of the different embodiments described above in reference to any of the Figures, hereinafter the "devices," is done with user consent and in a manner that is consistent with all applicable privacy laws. Users are given options to allow the devices to collect data, as well as the option to limit or deny collection of data by the devices. A user is able to opt-in or opt-out of any data collection at any time. Further, users are given the option to request the removal of any collected data.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

EXAMPLE ASPECTS

A few example aspects will now be briefly described.

(A1) In accordance with some embodiments, a method of enforcing virtual restricted-use zones for imaging devices communicatively coupled with a head-wearable device is disclosed. The method includes identifying a virtual restricted-use zone based on presence of one or more restricted-use zone markers in a physical area. The virtual restricted-use zone is used to enforce a restriction on use of an imaging device within the physical area, the imaging device communicatively coupled with the head-wearable device. The method further includes, in accordance with a determination that the imaging device is within the virtual restricted-use zone, automatically without human intervention disabling the imaging device communicatively coupled with the head-wearable device (A2) In some embodiments of A1, the method further includes, in accordance with a determination that the imaging device is within a predetermined distance from the virtual restricted-use zone, causing presentation of a notification to the user that informs the user of the virtual restricted-use zone.

(A3) In some embodiments of A2, the notification presented to the user includes one or more of a haptic notification cue, an audio notification cue, and a visual notification cue displayed on a display of the head-wearable device.

(A4) In some embodiments of any of any of A1-A3, the method further includes receiving a user input configured to initiate the imaging device communicatively coupled with the head-wearable device and responsive to the user input, capturing image data using the imaging device communicatively coupled with the head-wearable device. The one or more restricted-use zone markers include a restricted-use zone visual cue, and the determination that the imaging device is within the restricted-use zone is based on detection of the restricted-use zone visual cue within the image data.

(A5) In some embodiments of any of A1-A4, the virtual restricted-use zone includes a first virtual restricted-use zone and a second virtual restricted-use zone, the second virtual restricted-use zone at least partially overlapping the first virtual restricted-use zone. And, the method further includes, in accordance with the determination that the imaging device is within a predetermined distance from and/or within the first virtual restricted-use zone, causing presentation of a notification to the user that informs the user of the first virtual restricted-use zone and, in accordance with the determination that the imaging device is within the second virtual restricted-use zone, automatically without human intervention disabling the imaging device communicatively coupled with the head-wearable device.

(A6) In some embodiments of A5, the first virtual restricted-use zone is defined by a restricted-use zone geofence marker of the one or more restricted-use zone markers in a physical area and the second virtual restricted-use zone is defined by a restricted-use zone visual cue marker of the one or more restricted-use zone markers in a physical area.

(A7) In some embodiments of A5, the first and second virtual restricted-use zones are defined by a restricted-use zone visual cue marker and a restricted-use zone geofence marker of the one or more restricted-use zone markers in a physical area.

(A8) In some embodiments of any of A1-A7, the method further includes causing presentation of another notification in conjunction with disabling the imaging device, the other notification informing the user that the imaging device is disabled.

(A9) In some embodiments of any of A1-A8, the method further includes identifying another virtual restricted-use zone based on presence of the one or more restricted-use zone markers in the physical area and, in accordance with a determination that the imaging device is within the other virtual restricted-use zone, automatically without human intervention disabling the microphone communicatively coupled with the head-wearable device. The other virtual restricted-use zone is used to enforce a restriction on use of a microphone within the physical area, the microphone communicatively coupled with the head-wearable device (A10) In some embodiments of A9, the method further includes receiving another user input configured to initiate the microphone communicatively coupled with the head-wearable device and responsive to the other user input, capturing audio data using the microphone communicatively coupled with the head-wearable device. The one or more restricted-use zone markers include a restricted-use zone audio cue, and a determination that the imaging device is within the restricted-use zone is based on detection of the restricted-use zone audio cue within the audio data.

(A11) In some embodiments of any of A1-A10, the method further includes, while the imaging device is disabled, activating an indicator coupled with the head-wearable device notifying external users that the imaging device is disabled.

(A12) In some embodiments of any of A1-A11, the method further includes receiving device positional data and, in accordance with a determination that the head-wearable device is no longer worn by the user, disabling the imaging device communicatively coupled with the head-wearable device.

(A13) In some embodiments of any of A1-A12, the one or more restricted-use zone markers include a restricted-use zone geofence defined for the physical area, a restricted-use zone visual cue present for the physical area, and a restricted-use zone audio cue present for the physical area (A14) In some embodiments of any of A1-A13, the virtual restricted-use zone is enforced based on monitoring the one or more restricted-use zone markers identified by the head-wearable device or other data received from an intermediary device communicatively coupled with the head-wearable device.

(A15) In some embodiments of any of A1-A14, the virtual restricted-use zone is user defined, and the method further includes receiving yet another user input to define a restricted-use zone marker of the one or more restricted-use zone markers and responsive to the user input, causing one or more affordances to be presented to the user for defining the restricted-use zone marker.

(A16) In some embodiments of any of A1-A15, identifying the virtual restricted-use zone includes determining, based on location information, image data, and audio data provided by the head-wearable device or a wrist-wearable device, smart phone, or other intermediary device communicatively coupled to the head-wearable device, the presence of the one or more restricted-use zone markers in a physical area.

(A17) In some embodiments of any of A1-A16, the method further includes in accordance with the determination that the imaging device is within the virtual restricted-use zone, automatically without human intervention disabling imaging devices on additional devices communicatively coupled to the head-wearable device.

(A18) In some embodiments of any of A1-A17, the method further includes identifying a third virtual restricted-use zone based on the presence of one or more restricted-use zone markers in the physical area and, in accordance with a determination that the imaging device is within the third virtual restricted-use zone, automatically without human intervention disabling video capturing functionality of the imaging device while forgoing disabling static image capturing functionality of the imaging device. The third virtual restricted-use zone is used to enforce a restriction on use of the imaging device such that the imaging device cannot capture video data while still being able to capture static image data.

(B1) In accordance with some embodiments, a wrist-wearable device configured to enforce virtual restricted-use zones for imaging devices (or microphones) communicatively coupled with the wrist-wearable device and/or head-wearable device is disclosed. The wrist-wearable device includes a display, one or more sensors, one or more processors, a communicatively coupled imaging device (and/or microphone). The wrist-wearable device is worn by a user. The one or more processors are configured to identify a virtual restricted-use zone based on presence of one or more restricted-use zone markers in a physical area. The virtual restricted-use zone is used to enforce a restriction on use of an imaging device within the physical area, the imaging device communicatively coupled with the wrist-wearable device and/or head-wearable device. The one or more processors are further configured to, in accordance with a determination that the imaging device is within the virtual restricted-use zone, automatically without human intervention disabling the imaging device communicatively coupled with the wrist-wearable device and/or head-wearable device.

(B2) In some embodiments of B1, the wrist-wearable device is further configured to perform operations of the wrist-wearable device recited in the method of any of A2-A18.

(C1) In accordance with some embodiments, a head-wearable device configured to enforce virtual restricted-use zones for imaging devices (or microphones) communicatively coupled with the head-wearable device 110 is disclosed. The head-wearable device is worn by a user and includes a display, a communicatively coupled imaging device, a communicatively coupled microphone, one or more sensors, and one or more processors. The one or more processors are configured to identify a virtual restricted-use zone based on presence of one or more restricted-use zone markers in a physical area. The virtual restricted-use zone is used to enforce a restriction on use of an imaging device within the physical area, the imaging device communicatively coupled with the head-wearable device. The one or more processors are further configured to, in accordance with a determination that the imaging device is within the virtual restricted-use zone, automatically without human intervention disabling the imaging device communicatively coupled with the head-wearable device.

(C2) In some embodiments of C1, the head-wearable device is further configured to perform operations of the head-wearable device recited in the method of any of A2-A18.

(D1) In accordance with some embodiments, a system for enforcing virtual restricted-use zones for imaging devices (or microphones) communicatively coupled with one or more devices (e.g., head-wearable device, wrist-wearable device, and/or intermediary device (e.g., smartphone)) is disclosed. The system includes a head-wearable device and/or a wrist-wearable device. The head-wearable device and wrist-wearable device are worn by a user. The wrist-wearable device includes a display, one or more sensors, and one or more processors. The head-wearable device also includes a display, one or more sensors, and one or more processors. The head-wearable device and/or wrist-wearable device are communicatively coupled with an imaging device and/or microphone. The one or more processors of the head-wearable device and/or wrist-wearable device are configured to, either alone or in conjunction, identify a virtual restricted-use zone based on presence of one or more restricted-use zone markers in a physical area. The virtual restricted-use zone is used to enforce a restriction on use of an imaging device within the physical area, the imaging device communicatively coupled with the head-wearable device. The one or more processors of the head-wearable device and/or wrist-wearable device are also configured to, either alone or in conjunction, in accordance with a determination that the imaging device is within the virtual restricted-use zone, automatically without human intervention disabling the imaging device communicatively coupled with the head-wearable device (D2) In some embodiments of D1, the system is further configured such that the wrist-wearable device performs operations of the wrist-wearable device recited in any of claims A2-A18 and the head-wearable device performs operations of the head-wearable device recited in any of claims A2-A18.

(E1) In accordance with some embodiments, a wrist-wearable device is provided, the wrist-wearable device is provided including means for causing performance of any of A1-A18.

(F1) In accordance with some embodiments, a head-wearable device is provided, the head-wearable device including means for causing performance of any of A1-A18.

(G1) In accordance with some embodiments, an intermediary device is provided. The intermediary device configured to coordinate operations of a wrist-wearable device and a head-wearable device, and the intermediary device configured to perform or cause performance of any of A1-A18.

(H1) In accordance with some embodiments, a non-transitory, computer-readable storage medium is provided. The non-transitory, computer-readable storage medium includes instructions that, when executed by a wrist-wearable device and/or head-wearable device, cause the wrist-wearable device and/or head-wearable device to perform or cause performance of the method of any of A1-A18.

It will be understood that, although the terms "first," "second," etc. may be used herein to describe various elements, these elements should not be limited by these terms. These terms are only used to distinguish one element from another.

The terminology used herein is for the purpose of describing particular embodiments only and is not intended to be limiting of the claims. As used in the description of the embodiments and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" can be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" can be construed to mean "upon determining" or "in response to determining" or "in accordance with a determination" or "upon detecting" or "in response to detecting" that the stated condition precedent is true, depending on the context.

The foregoing description, for purpose of explanation, has been described with reference to specific embodiments. However, the illustrative discussions above are not intended to be exhaustive or to limit the claims to the precise forms disclosed. Many modifications and variations are possible in view of the above teachings. The embodiments were chosen and described in order to best explain principles of operation and practical applications, to thereby enable others skilled in the art.

What is claimed is:

1. A method of enforcing virtual restricted-use zones for imaging devices communicatively coupled with a head-wearable device, the method comprising:

identifying a virtual restricted-use zone based on presence of one or more restricted-use zone markers in a physical area, wherein the virtual restricted-use zone is:

used to enforce a restriction on use of an imaging device within the physical area, the imaging device communicatively coupled with the head-wearable device, and enforced based on monitoring of the one or more restricted-use zone markers identified by the head-wearable device or other data received from an intermediary device communicatively coupled with the head-wearable device; and in accordance with a determination that the imaging device is within the virtual restricted-use zone, automatically without human intervention disabling the imaging device communicatively coupled with the head-wearable device.

2. The method of claim 1, further comprising in accordance with a determination that the imaging device is within a predetermined distance from the virtual restricted-use zone, causing presentation of a notification to a user that informs the user of the virtual restricted-use zone, wherein:

the notification includes one or more of a haptic notification cue, an audio notification cue, and a visual notification cue displayed on a display of the head-wearable device.

3. The method of claim 1, further comprising:

receiving a user input configured to initiate the imaging device communicatively coupled with the head-wearable device; and responsive to the user input, capturing image data using the imaging device communicatively coupled with the head-wearable device, wherein:

the one or more restricted-use zone markers include a restricted-use zone visual cue, and the determination that the imaging device is within the virtual restricted-use zone is based on detection of the restricted-use zone visual cue within the image data.

4. The method of claim 1, further comprising:

causing presentation of another notification in conjunction with disabling the imaging device, the other notification informing a user that the imaging device is disabled.

5. The method of claim 1, further comprising:

identifying another virtual restricted-use zone based on presence of the one or more restricted-use zone markers in the physical area, wherein the other virtual restricted-use zone is used to enforce a restriction on use of a microphone within the physical area, the microphone communicatively coupled with the head-wearable device; and in accordance with a determination that the imaging device is within the other virtual restricted-use zone, automatically without human intervention disabling the microphone communicatively coupled with the head-wearable device.

6. The method of claim 1, further comprising:

receiving device positional data; and in accordance with a determination that the head-wearable device is no longer worn by a user, disabling the imaging device communicatively coupled with the head-wearable device.

7. The method of claim 1, wherein the virtual restricted-use zone is user defined, and the method further comprises:

receiving yet another user input to define a restricted-use zone marker of the one or more restricted-use zone markers; and responsive to the user input, causing one or more affordances to be presented to the user for defining the restricted-use zone marker.

8. The method of claim 1, wherein identifying the virtual restricted-use zone includes determining, based on one or more of location information, image data, and audio data provided by the head-wearable device or a wrist-wearable device, smart phone, or other intermediary device communicatively coupled to the head-wearable device, the presence of the one or more restricted-use zone markers in a physical area.

9. The method of claim 1, further comprising:

in accordance with the determination that the imaging device is within the virtual restricted-use zone, automatically without human intervention disabling imaging devices on additional devices communicatively coupled to the head-wearable device.

10. The method of claim 1, further comprising:

identifying a third virtual restricted-use zone based on the presence of one or more restricted-use zone markers in the physical area, wherein the third virtual restricted-use zone is used to enforce a restriction on use of the imaging device such that the imaging device cannot capture video data while still being able to capture static image data; and in accordance with a determination that the imaging device is within the third virtual restricted-use zone, automatically without human intervention disabling video capturing functionality of the imaging device while forgoing disabling static image capturing functionality of the imaging device.

11. A head-wearable device configured to enforce virtual restricted-use zones for imaging devices communicatively coupled with the head-wearable device, the head-wearable device comprising:

a heads-up display;

an imaging device;

one or more sensors; and one or more processors configured to:

identify a virtual restricted-use zone based on presence of one or more restricted-use zone markers in a physical area;

wherein the virtual restricted-use zone is:

used to enforce a restriction on use of an imaging device within the physical area, the imaging device communicatively coupled with the head-wearable device, and enforced based on monitoring of the one or more restricted-use zone markers identified by the head-wearable device or other data received from an intermediary device communicatively coupled with the head-wearable device; and in accordance with a determination that the imaging device is within the virtual restricted-use zone, automatically without human intervention disable the imaging device communicatively coupled with the head-wearable device.

12. The head-wearable device of claim 11, wherein the one or more processors are further configured to:

in accordance with a determination that the imaging device is within a predetermined distance from the virtual restricted-use zone, causing presentation of a notification to a user that informs the user of the virtual restricted-use zone, wherein:

the notification includes one or more of a haptic notification cue, an audio notification cue, and a visual notification cue displayed on a display of the head-wearable device.

13. The head-wearable device of claim 11, wherein the one or more processors are further configured to:

in accordance with the determination that the imaging device is within the virtual restricted-use zone, automatically without human intervention disable imaging devices on additional devices communicatively coupled to the head-wearable device.

14. The head-wearable device of claim 11, wherein the one or more processors are further configured to:

identify a third virtual restricted-use zone based on the presence of one or more restricted-use zone markers in the physical area, wherein the third virtual restricted-use zone is used to enforce a restriction on use of the imaging device such that the imaging device cannot capture video data while still being able to capture static image data; and in accordance with a determination that the imaging device is within the third virtual restricted-use zone, automatically without human intervention disable video capturing functionality of the imaging device while forgoing disabling static image capturing functionality of the imaging device.

15. A method of enforcing virtual restricted-use zones for imaging devices communicatively coupled with a head-wearable device, the method comprising:

identifying a virtual restricted-use zone based on presence of one or more restricted-use zone markers in a physical area, wherein the virtual restricted-use zone:

includes a first virtual restricted-use zone and a second virtual restricted-use zone, the second virtual restricted-use zone at least partially overlapping the first virtual restricted-use zone, and is used to enforce a restriction on use of an imaging device within the physical area, the imaging device communicatively coupled with the head-wearable device;

in accordance with a determination that the imaging device is within a predetermined distance from and/or within the first virtual restricted-use zone, causing presentation of a notification to a user that informs the user of the first virtual restricted-use zone; and in accordance with a determination that the imaging device is within the second virtual restricted-use zone, automatically without human intervention disabling the imaging device communicatively coupled with the head-wearable device.

16. The method of claim 15, further comprising:

receiving a user input configured to initiate the imaging device communicatively coupled with the head-wearable device; and responsive to the user input, capturing image data using the imaging device communicatively coupled with the head-wearable device, wherein:

the one or more restricted-use zone markers include a restricted-use zone visual cue, and a determination that the imaging device is within the virtual restricted-use zone is based on detection of the restricted-use zone visual cue within the image data.

17. The method of claim 15, wherein:

the first virtual restricted-use zone is defined by a restricted-use zone geofence marker of the one or more restricted-use zone markers in the physical area; and the second virtual restricted-use zone is defined by a restricted-use zone visual cue marker of the one or more restricted-use zone markers in the physical area.

18. The method of claim 15, wherein:

the first and second virtual restricted-use zones are defined by a restricted-use zone visual cue marker and a restricted-use zone geofence marker of the one or more restricted-use zone markers.

19. The method of claim 15, further comprising:

receiving another user input configured to initiate a microphone communicatively coupled with the head-wearable device; and responsive to the other user input, capturing audio data using the microphone communicatively coupled with the head-wearable device, wherein:

the one or more restricted-use zone markers include a restricted-use zone audio cue, and a determination that the imaging device is within the virtual restricted-use zone is based on detection of the restricted-use zone audio cue within the audio data.

20. The method of claim 15, wherein the virtual restricted-use zone is user defined, and the method further comprises:

receiving yet another user input to define a restricted-use zone marker of the one or more restricted-use zone markers; and responsive to the user input, causing one or more affordances to be presented to the user for defining the restricted-use zone marker.

* * * * *